(12) United States Patent
Otani et al.

(10) Patent No.: US 12,459,890 B2
(45) Date of Patent: Nov. 4, 2025

(54) SALT AND CRYSTAL FORM OF COMPOUND HAVING AGONISTIC ACTIVITY TO S1P5 RECEPTOR

(71) Applicant: ONO PHARMACEUTICAL CO., LTD., Osaka (JP)

(72) Inventors: Shuhei Otani, Osaka (JP); Takayuki Fujito, Osaka (JP); Naoko Imura, Osaka (JP); Hideomi Kijima, Osaka (JP); Stephan D. Parent, Osaka (JP); Melanie Janelle Bevill, West Lafayette, IN (US); Courtney S. Johnson, West Lafayette, IN (US); Travis Lee Houston, Lafayette, IN (US)

(73) Assignee: ONO PHARMACEUTICAL CO., LTD., Osaka (JP)

( * ) Notice: Subject to any disclaimer, the term of this patent is extended or adjusted under 35 U.S.C. 154(b) by 723 days.

(21) Appl. No.: 17/634,505

(22) PCT Filed: Aug. 19, 2020

(86) PCT No.: PCT/JP2020/031326
§ 371 (c)(1),
(2) Date: Feb. 10, 2022

(87) PCT Pub. No.: WO2021/033729
PCT Pub. Date: Feb. 25, 2021

(65) Prior Publication Data
US 2022/0289675 A1 Sep. 15, 2022

Related U.S. Application Data

(60) Provisional application No. 62/889,091, filed on Aug. 20, 2019.

(51) Int. Cl.
*C07D 205/04* (2006.01)
(52) U.S. Cl.
CPC ........ *C07D 205/04* (2013.01); *C07B 2200/13* (2013.01)
(58) Field of Classification Search
CPC .................. C07D 205/04; C07B 2200/13
See application file for complete search history.

(56) References Cited

U.S. PATENT DOCUMENTS

| 8,173,710 | B2 | 5/2012 | Lynch et al. | |
| 11,198,672 | B2* | 12/2021 | Watanabe | C07C 49/577 |
| 12,049,445 | B2* | 7/2024 | Watanabe | C07C 49/252 |
| 2007/0167425 | A1 | 7/2007 | Nakade et al. | |
| 2009/0275554 | A1 | 11/2009 | Habashita et al. | |
| 2012/0190649 | A1 | 7/2012 | Thomas et al. | |
| 2014/0288034 | A1 | 9/2014 | Nakade et al. | |
| 2017/0327439 | A1 | 11/2017 | Kusumi et al. | |
| 2021/0087141 | A1 | 3/2021 | Watanabe et al. | |

FOREIGN PATENT DOCUMENTS

| JP | 2013-501074 A | 1/2013 |
| WO | 2005/020882 A2 | 3/2005 |
| WO | 2006/064757 A1 | 6/2006 |
| WO | 2011/017561 A1 | 2/2011 |
| WO | 2012/109108 A1 | 8/2012 |
| WO | 2016/088834 A1 | 6/2016 |
| WO | 2017/131149 A1 | 8/2017 |
| WO | 2019/163917 A1 | 8/2019 |

OTHER PUBLICATIONS

PubChem, 4-Hydroxybenzoic acid, NIH National Library of Medicine (online), Retrieved on Feb. 7, 2025 from https://pubchem.ncbi.nlm.nih.gov/compound/4-Hydroxybenzoic-acid. (Year: 2025).*
Agent. (Sep. 27, 2018). Merriam-Webster's Online Dictionary. Retrieved from Internet Archive website: https://web.archive.org/web/20180927123418/https://www.merriam-webster.com/dictionary/agent (Year: 2018).*
International Search Report (PCT/ISA/210) dated Oct. 13, 2020 issued by the International Searching Authority in International Application No. PCT/JP2020/031326.
Supplementary Extended European Search Report issued Jul. 27, 2017 by the European Patent Office in European Patent Application No. 15865945.8.
Richard N. Hanna, et al., "Patrolling monocytes control tumor metastasis to the lung", Science, Nov. 20, 2015, vol. 350 Issue 6263, 7 pages total.
Itoh, K. et al., "Synthesis and Biological Activities of 3-Aminomethyl-1,2-dihydronaphthalene Derivatives", Chem. Pharm. Bull., 1983, vol. 31, No. 6, pp. 2006-2015, 10 pages total.
Alexander S. Novgorodov, et al., "Activation of sphingosine-1-phosphate receptor S1P5 inhibits oligodendrocyte progenitor migration", The FASEB Journal, Research Communication, vol. 21, No. 7, 2017, pp. 1503-1514, 13 pages total.
Emilie Debien, et al., "S1PR5 is pivotal for the homeostasis of patrolling monocytes", European Journal of Immunology, Molecular immunology, 2013, 43, pp. 1667-1675, 9 pages total.
C. Jaillard, et al., "Edg8/S1P5: An Oligodendroglial Receptor with Dual Function on Process Retraction and Cell Survival", The Journal of Neuroscience, Feb. 9, 2005, 25(6), pp. 1459-1469, 11 pages total.
Thierry Walzer, et al, "Natural killer cell trafficking in vivo requires a dedicated sphingosine 1-phosphate receptor", Nature Immunology, vol. 8, No. 12, Dec. 2007, pp. 1337-1344, 8 pages total.
International Searching Authority, International Preliminary Report on Patentability (PCT/IB/373) with Written Opinion (PCT/ISA/237) issued Aug. 27, 2020 in Application No. PCT/JP2019/006637.
International Search Report (PCT/ISA/210) issued May 21, 2019 by the International Searching Authority in International Patent Application No. PCT/JP2019/006637.
International Search Report (PCT/ISA/210) dated Feb. 23, 2016 issued by the International Searching Authority in International Application No. PCT/JP2015/084019.

(Continued)

*Primary Examiner* — Amanda L. Aguirre
(74) *Attorney, Agent, or Firm* — Sughrue Mion, PLLC

(57) ABSTRACT

Compound I as defined, having high $S1P_5$ receptor-selective agonist activity on the $S1P_1$ receptor, and the crystal forms of Compound I, the salts of Compound I, and the crystal forms of salts thereof are provided as drug substances of pharmaceuticals.

34 Claims, 29 Drawing Sheets

(56) References Cited

OTHER PUBLICATIONS

Written Opinion (PCT/ISA/237) dated Feb. 23, 2016 issued by the International Searching Authority in International Application No. PCT/JP2015/084019.
Written Opinion (PCT/ISA/237) dated Oct. 13, 2020 issued by the International Searching Authority in International Application No. PCT/JP2020/031326.
Office Action issued Jan. 2, 2019 by the United States Patent and Trademark Office in U.S. Appl. No. 15/532,389.
Office Action issued Aug. 15, 2019 by the United States Patent and Trademark Office in U.S. Appl. No. 15/532,389.
Office Action issued Jun. 9, 2020 by the United States Patent and Trademark Office in U.S. Appl. No. 15/532,389.
Office Action issued Jun. 14, 2021 by the United States Patent and Trademark Office in U.S. Appl. No. 15/532,389.
Office Action issued Oct. 13, 2021 by the United States Patent and Trademark Office in U.S. Appl. No. 15/532,389.
Office Action issued Oct. 2, 2020 by the United States Patent and Trademark Office in U.S. Appl. No. 15/532,389.
Notice of Allowance issued Jun. 8, 2022 by the United States Patent and Trademark Office in U.S. Appl. No. 15/532,389.
Office Action issued Aug. 13, 2021 by the United States Patent and Trademark Office in U.S. Appl. No. 16/970,865.
International Preliminary Report on Patentability (PCT/IB/373) with Written Opinion (PCT/ISA/237) issued Feb. 17, 2022 by the International Searching Authority in International Application No. PCT/JP2020/031326.
Scott et al., "Ozanimod (RPC1063) is a potent sphingosine-1-phosphate receptor-1 (S1P1) and receptor-5 (S1P5) agonist with autoimmune disease-modifying activity", British Journal of Pharmacology, Feb. 19, 2016, vol. 173, pp. 1778-1792.
Choi et al., "Lysophospholipids and their receptors in the central nervous system", Biochimica et Biophysica Acta, available online Jul. 31, 2012, pp. 20-32.

* cited by examiner

SALT AND CRYSTAL FORM OF COMPOUND HAVING AGONISTIC ACTIVITY TO S1P5 RECEPTOR

CROSS-REFERENCE TO RELATED APPLICATIONS

This application is a National Phase Entry of PCT International Application No. PCT/JP2020/031326 filed on Aug. 19, 2020, which claims priority to U.S. Provisional Patent Application No. 62/889,091 filed on Aug. 20, 2019.

TECHNICAL FIELD

The present disclosure relates to a salt of 1-[[(3S)-3-methyl-6-(4,4,4-trifluorobutoxy)-3,4-dihydronaphthalen-2-yl]methyl]azetidine-3-carboxylic acid (hereinafter, it may be abbreviated as Compound I), crystal forms thereof, and the like.

BACKGROUND ART

It has been proposed that sphingosine-1-phosphate [(2S,3R,4E)-2-amino-3-hydroxyoctadeca-4-enyl-1-phosphoric acid; hereinafter, it may be abbreviated as S1P.] is a lipid synthesized by intracellular sphingolipid turnover or an action of secreted sphingosine kinase outside cells, and acts as an intercellular transmitter and an intracellular secondary transmitter.

Among S1P receptors, a $S1P_5$ (EDG-8) receptor is known to be highly expressed in oligodendrocyte and oligodendrocyte precursor cells, and it has been revealed that when the $S1P_5$ receptor is activated, induction of differentiation from oligodendrocyte precursor cells to oligodendrocyte is promoted (see Non Patent Literatures 1 and 2). Oligodendrocytes are a type of glial cells that bind to axons of nerve cells to form myelin sheaths (myelin). Therefore, a compound having $S1P_5$ receptor agonist activity is considered to be useful for treatment of demyelinating diseases such as multiple sclerosis and neurodegenerative diseases because it promotes regeneration of myelin that has disappeared (demyelination) in nerve cells.

In addition, it is known that the $S1P_5$ receptor is highly expressed also in natural killer (NK) cells, and it has been found that NK cell migration is induced by activation of the $S1P_5$ receptor (see Non Patent Literature 3).

Furthermore, since the $S1P_5$ receptor is highly expressed in patrolling monocytes known to be involved in tumor immunity, activation of the $S1P_5$ receptor may induce tumor immune activation (see Non Patent Literatures 4 and 5).

On the other hand, the $S1P_1$ receptor is a receptor expressed on cardiovascular system or lymphocytes. It is known that a compound having $S1P_1$ receptor agonist activity may exhibit a lymphocyte-decreasing action and a heart rate lowering action.

Meanwhile, as a dihydronaphthalene compound having S1P receptor binding ability, it is known that a compound represented by general formula (a):

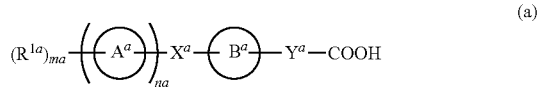

(a)

wherein ring $A^a$ represents a cyclic group, ring $B^a$ represents a cyclic group optionally further having a substituent, $X^a$ represents a bond or a spacer having 1 to 8 atoms of a main chain, $Y^a$ represents a spacer having 1 to 10 atoms of a bond or a main chain, na represents 0 or 1, when na is 0, ma represents 1, and $R^{1a}$ represents a hydrogen atom or a substituent, when na is 1, ma represents an integer of 0 or 1 to 7, and $R^{1a}$ represents a substituent (when ma is 2 or more, a plurality of $R^{1a}$ may be the same or different.) (provided that the definition of each group was extracted.)) particularly specifically binds to EDG-1 ($S1P_1$) and EDG-6 ($S1P_4$) receptors (see Patent Literature 1).

In addition, as a dihydronaphthalene compound having S1P receptor binding ability, it is known that a compound represented by general formula (b):

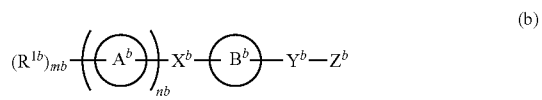

(b)

wherein ring $A^b$ represents a cyclic group, ring $B^b$ represents a cyclic group optionally further having a substituent, $X^b$ represents a bond or a spacer having 1 to 8 atoms of a main chain, $Y^b$ represents a bond or a spacer having 1 to 10 atoms of a main chain, $Z^b$ represents an acidic group optionally protected, nb represents 0 or 1, when nb is 0, mb represents 1, and $R^{1b}$ represents a hydrogen atom or a substituent, when nb is 1, mb represents an integer of 0 or 1 to 7, and $R^{1b}$ represents a substituent (when mb is 2 or more, a plurality of $R^{1b}$ may be the same or different.) (provided that the definition of each group was extracted.)) particularly binds to EDG-1 ($S1P_1$), EDG-6 ($S1P_4$) and/or EDG-8 ($S1P_5$) receptors (see Patent Literature 2).

Furthermore, WO 2019/163917 A (hereinafter, it may be abbreviated as Patent Literature 3.) describes Compound I as a compound having $S1P_5$ receptor agonist activity.

However, a salt of Compound I and crystal forms thereof disclosed in the present invention are not described in any prior art documents.

CITATIONS LIST

Patent Literatures

Patent Literature 1: WO 2005/020882 A
Patent Literature 2: WO 2006/064757 A
Patent Literature 3: WO 2019/163917 A

Non Patent Literatures

Non Patent Literature 1: The Journal of Neuroscience, vol. 25, no. 6, pp. 1459-1469, 2005
Non Patent Literature 2: The FASEB Journal, vol. 21, pp. 1503-1514, 2007
Non Patent Literature 3: Nature Immunology, vol. 8, no. 12, pp. 1337-1344, 2007
Non Patent Literature 4: European Journal of Immunology, vol. 43, pp. 1667-1675,
Non Patent Literature 5: Science, vol. 350, no. 6263, pp. 985-990, 2015

SUMMARY OF INVENTION

Technical Problems

An object of the present invention is to provide a compound with an improved balance of $S1P_5$ receptor agonist activity with respect to $S1P_1$ receptor, and a form suitable for drug substances of pharmaceuticals.

Solutions to Problems

As a result of intensive studies to solve the above problems, the present inventors have found that there exist crystal forms of Compound I, a salt of Compound I, and crystal forms of salts thereof that are suitable for drug substances of pharmaceuticals (these may be collectively abbreviated as the compound of the present invention).

That is, the present invention provides, for example, embodiments of

[1] a salt of 1-[[(3S)-3-methyl-6-(4,4,4-trifluorobutoxy)-3,4-dihydronaphthalen-2-yl]methyl]azetidine-3-carboxylic acid,

[2] a salt according to [1], which is in crystal form,

[3] a crystal of 1-[[(3S)-3-methyl-6-(4,4,4-trifluorobutoxy)-3,4-dihydronaphthalen-2-yl]methyl]azetidine-3-carboxylic acid, and the like.

Effects of Invention

Compound I has high $S1P_5$ receptor-selective agonist activity on the $S1P_1$ receptor and is therefore useful in treatment of $S1P_5$-mediated diseases, for example, neurodegenerative diseases, autoimmune diseases, infectious diseases, or cancer. In addition, the crystal forms of Compound I, the salt of Compound I, and the crystal forms of salts thereof disclosed in the present invention are excellent in chemical stability, and thus are useful as drug substances of pharmaceuticals.

DESCRIPTION OF EMBODIMENTS

Figure 1:
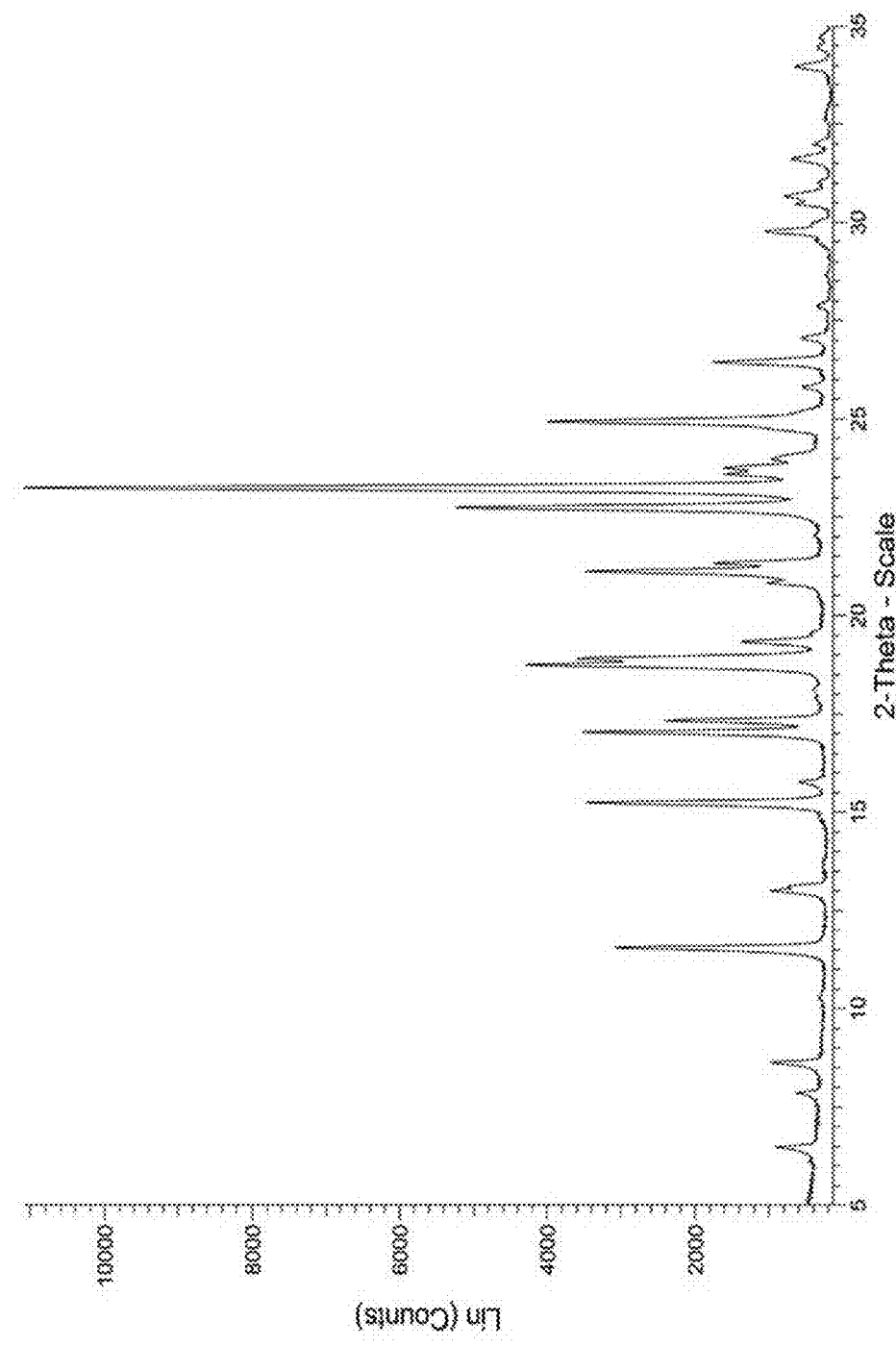
FIG. 1 represents a powder X-ray diffraction spectrum chart of crystal D of Compound I (vertical axis represents intensity (counts), and horizontal axis represents 2θ (degrees)).

Hereinafter, the present invention will be described in detail.

In the present invention, 1-[[(3S)-3-methyl-6-(4,4,4-trifluorobutoxy)-3,4-dihydronaphthalen-2-yl]methyl]azetidine-3-carboxylic acid (Compound I) means a compound represented by the following structural formula:

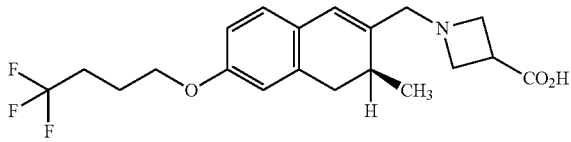 [SMILES: C[C@H]1Cc2cc(OCCCC(F)(F)F)ccc2C=C1CN1CC(C(=O)O)C1]

wherein a symbol

/ represents that it binds to the back side on the paper surface (i.e., α-configuration), and a symbol

/ represents that it binds to the front side on the paper surface (i.e., β-configuration).

In the present invention, the compound of the present invention is preferably:
  a crystal of 1-[[(3S)-3-methyl-6-(4,4,4-trifluorobutoxy)-3,4-dihydronaphthalen-2-yl]methyl]azetidine-3-carboxylic acid,
  mono(4-hydroxybenzoate) of 1-[[(3S)-3-methyl-6-(4,4,4-trifluorobutoxy)-3,4-dihydronaphthalen-2-yl]methyl]azetidine-3-carboxylic acid,
  mono(4-hydroxybenzoate) of 1-[[(3S)-3-methyl-6-(4,4,4-trifluorobutoxy)-3,4-dihydronaphthalen-2-yl]methyl]azetidine-3-carboxylic acid in crystal form,
  mono-tryptophan salt of 1-[[(3S)-3-methyl-6-(4,4,4-trifluorobutoxy)-3,4-dihydronaphthalen-2-yl]methyl]azetidine-3-carboxylic acid,
  mono-tryptophan salt of 1-[[(3S)-3-methyl-6-(4,4,4-trifluorobutoxy)-3,4-dihydronaphthalen-2-yl]methyl]azetidine-3-carboxylic acid in crystal form,
  hemisuccinate of 1-[[(3S)-3-methyl-6-(4,4,4-trifluorobutoxy)-3,4-dihydronaphthalen-2-yl]methyl]azetidine-3-carboxylic acid, or
  hemisuccinate of 1-[[(3S)-3-methyl-6-(4,4,4-trifluorobutoxy)-3,4-dihydronaphthalen-2-yl]methyl]azetidine-3-carboxylic acid in crystal form,
more preferably,
  a crystal of 1-[[(3S)-3-methyl-6-(4,4,4-trifluorobutoxy)-3,4-dihydronaphthalen-2-yl]methyl]azetidine-3-carboxylic acid,
  mono(4-hydroxybenzoate) of 1-[[(3S)-3-methyl-6-(4,4,4-trifluorobutoxy)-3,4-dihydronaphthalen-2-yl]methyl]azetidine-3-carboxylic acid in crystal form,
  mono-tryptophan salt of 1-[[(3S)-3-methyl-6-(4,4,4-trifluorobutoxy)-3,4-dihydronaphthalen-2-yl]methyl]azetidine-3-carboxylic acid in crystal form,
or
  hemisuccinate of 1-[[(3S)-3-methyl-6-(4,4,4-trifluorobutoxy)-3,4-dihydronaphthalen-2-yl]methyl]azetidine-3-carboxylic acid in crystal form,
further preferably,
  crystal D of 1-[[(3S)-3-methyl-6-(4,4,4-trifluorobutoxy)-3,4-dihydronaphthalen-2-yl]methyl]azetidine-3-carboxylic acid,
  crystal A of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid,
  crystal B of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid,
  crystal A of mono-tryptophan salt of 1-[[(3S)-3-methyl-6-(4,4,4-trifluorobutoxy)-3,4-dihydronaphthalen-2-yl]methyl]azetidine-3-carboxylic acid,
or
  crystal A of hemisuccinate of 1-[[(3S)-3-methyl-6-(4,4,4-trifluorobutoxy)-3,4-dihydronaphthalen-2-yl]methyl]azetidine-3-carboxylic acid, and
particularly preferably,
  crystal A of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid.

In the present invention, as the compound of the present invention,
  a crystal of 1-[[(3S)-3-methyl-6-(4,4,4-trifluorobutoxy)-3,4-dihydronaphthalen-2-yl]methyl]azetidine-3-carboxylic acid is also preferred, and
  crystal D of 1-[[(3S)-3-methyl-6-(4,4,4-trifluorobutoxy)-3,4-dihydronaphthalen-2-yl]methyl]azetidine-3-carboxylic acid is more preferred.

In the present invention, as the compound of the present invention,
  mono(4-hydroxybenzoate) of 1-[[(3S)-3-methyl-6-(4,4,4-trifluorobutoxy)-3,4-dihydronaphthalen-2-yl]methyl]azetidine-3-carboxylic acid is also preferred,
  mono(4-hydroxybenzoate) of 1-[[(3S)-3-methyl-6-(4,4,4-trifluorobutoxy)-3,4-dihydronaphthalen-2-yl]methyl]azetidine-3-carboxylic acid in crystal form is more preferred,
  crystal A of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid or
  crystal B of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid is further preferred, and crystal A of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid is particularly preferred.

In the present invention, as the compound of the present invention, mono-tryptophan salt of 1-[[(3S)-3-methyl-6-(4,4,4-trifluorobutoxy)-3,4-dihydronaphthalen-2-yl]methyl]azetidine-3-carboxylic acid is also preferred, mono-tryptophan salt of 1-[[(3S)-3-methyl-6-(4,4,4-trifluorobutoxy)-3,4-dihydronaphthalen-2-yl]methyl]azetidine-3-carboxylic acid in crystal form is more preferred, and crystal A of mono-tryptophan salt of 1-[[(3S)-3-methyl-6-(4,4,4-trifluorobutoxy)-3,4-dihydronaphthalen-2-yl]methyl]azetidine-3-carboxylic acid is further preferred.

In the present invention, as the compound of the present invention, hemisuccinate of 1-[[(3S)-3-methyl-6-(4,4,4-trifluorobutoxy)-3,4-dihydronaphthalen-2-yl]methyl]azetidine-3-carboxylic acid is also preferred, hemisuccinate of 1-[[(3S)-3-methyl-6-(4,4,4-trifluorobutoxy)-3,4-dihydronaphthalen-2-yl]methyl]azetidine-3-carboxylic acid in crystal form is more preferred, and crystal A of hemisuccinate of 1-[[(3S)-3-methyl-6-(4,4,4-trifluorobutoxy)-3,4-dihydronaphthalen-2-yl]methyl]azetidine-3-carboxylic acid is further preferred.

In the present invention, the compound of the present invention is preferably one excellent in chemical stability. The compound is more preferably a compound having a residual rate (%) of 95% or more, further preferably a compound having a residual rate (%) of 99% or more, and particularly preferably a compound having a residual rate (%) of 99% or more in Condition 1 or Condition 2 measured by a method described in a chemical stability test described later.

In the present invention, differences in crystal form are distinguished by powder X-ray diffraction spectrum, differential scanning calorimetry (DSC), crystallographic data and/or positional parameters (partial atomic coordinates).

Crystal D of Compound I is characterized by physicochemical data of at least one of the following (a) and (b). Preferably, it is characterized by the physicochemical data of both of the following (a) and (b).

(a) Has (i) a powder X-ray diffraction spectrum as shown in FIG. 1, (ii) a diffraction angle (2θ) of the powder X-ray diffraction spectrum as shown in FIG. 1, (iii) a powder X-ray diffraction spectrum having a diffraction angle (2θ) substantially the same as the diffraction angle (2θ) shown in Table 1, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 1, (v) a powder X-ray diffraction spectrum having at least one, two, three, four, five, or more than five peaks at a diffraction angle (2θ) selected from about 11.6, about 15.2, about 17.0, about 18.8, about 21.1, about 22.8, about 23.3, and about 24.9 degrees, or (vi) a powder X-ray diffraction spectrum having at least one, two, three, four, five, or more than five peaks at a diffraction angle (2θ) selected from about 6.5, about 7.8, about 8.6, about 11.6, about 15.2, about 17.0, about 18.8, about 21.1, about 22.8, about 23.3, and about 24.9 degrees.

Figure 2:
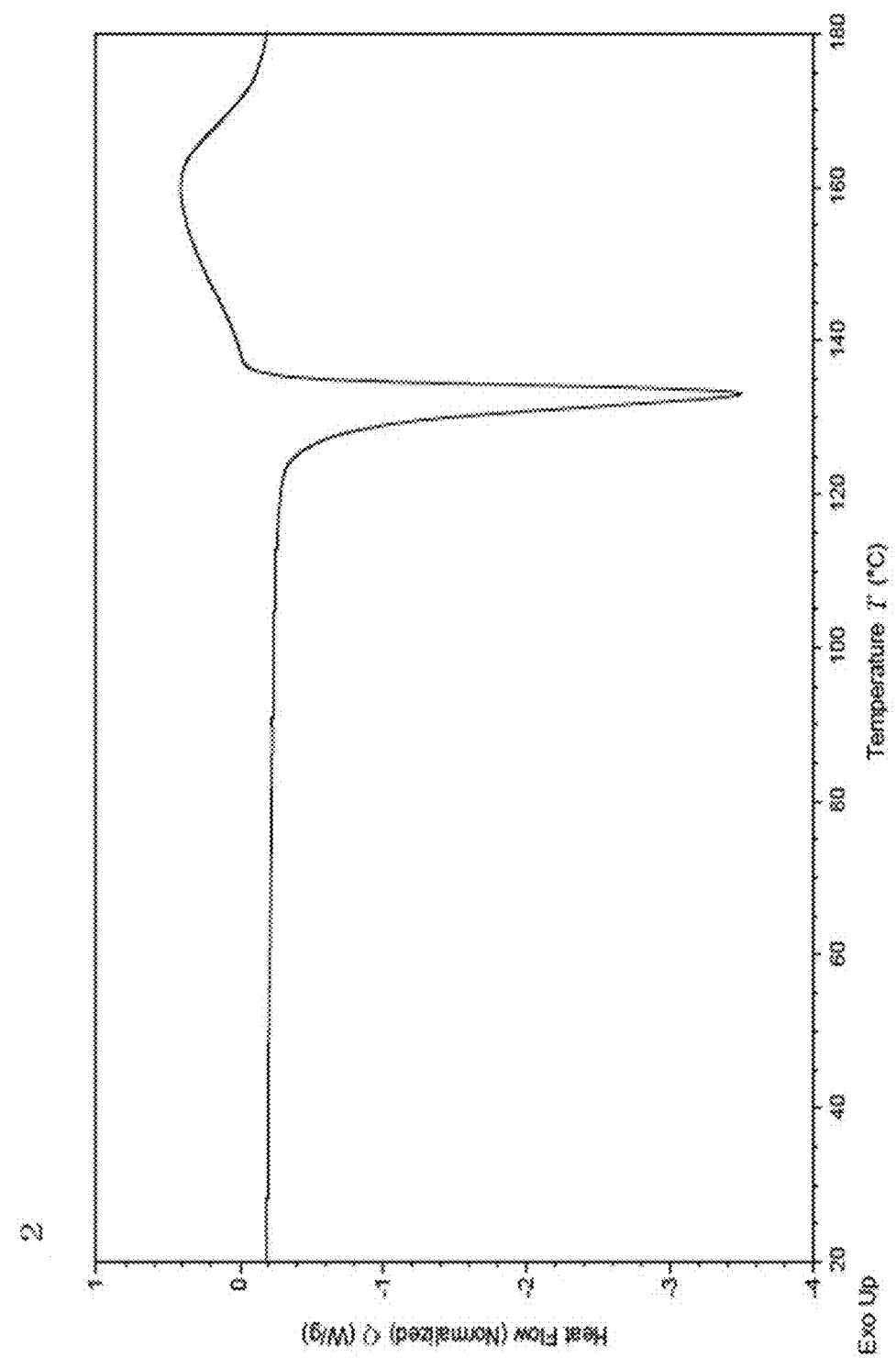
FIG. 2 represents a differential scanning calorimetry (DSC) chart of crystal D of Compound I (vertical axis represents heat flux (W/g), and horizontal axis represents temperature (° C.)).

(b) Has a DSC chart shown in FIG. 2, or an endothermic peak with an onset temperature of about 128° C. or a peak temperature of about 133° C. in the DSC.

Crystal B of hydrate of Compound I is characterized by physicochemical data of at least one of the following (c) and (d). Preferably, it is characterized by the physicochemical data of both of the following (c) and (d).

Figure 3:
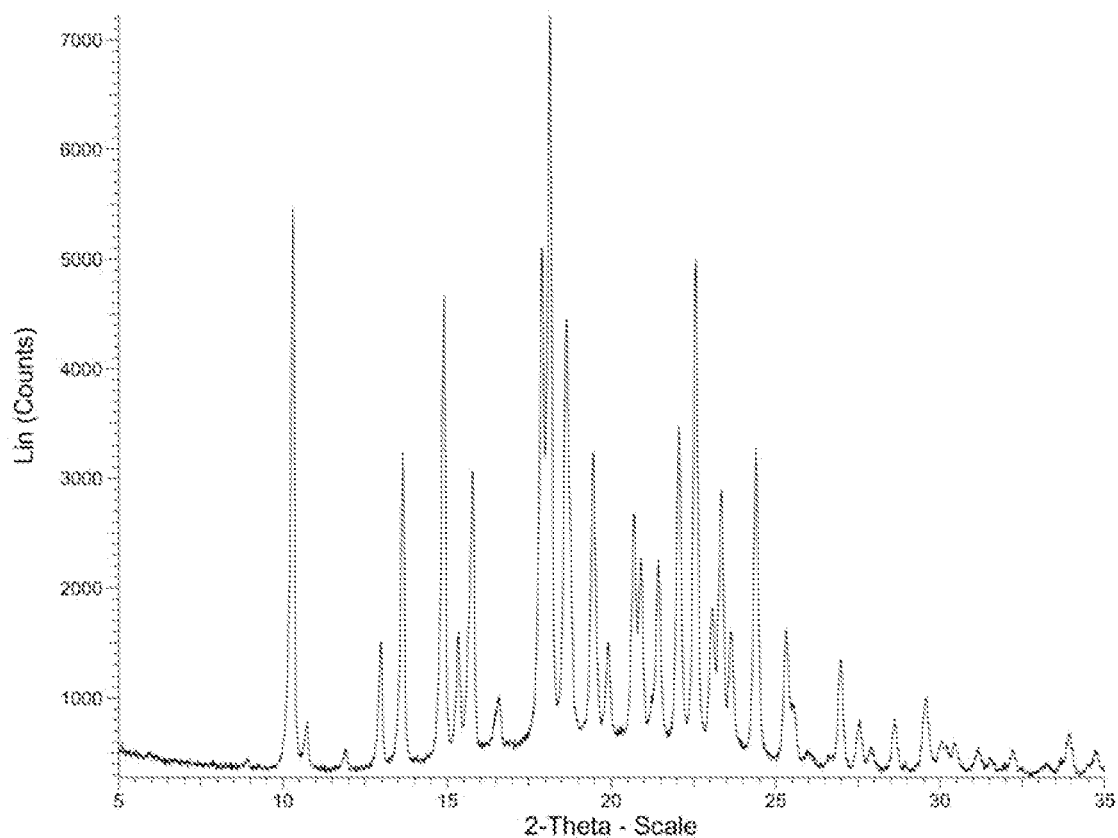
FIG. 3 represents a powder X-ray diffraction spectrum chart of crystal B of hydrate of Compound I (vertical axis represents intensity (counts), and horizontal axis represents 2θ (degrees)).

(c) Has (i) a powder X-ray diffraction spectrum as shown in FIG. 3, (ii) a diffraction angle (2θ) of the powder X-ray diffraction spectrum as shown in FIG. 3, (iii) a powder X-ray diffraction spectrum having a diffraction angle (2θ) substantially the same as the diffraction angle (2θ) shown in Table 2, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 2, or (v) a powder X-ray diffraction spectrum having at least one, two, three, four, five, or more than five peaks at a diffraction angle (2θ) selected from about 10.3, about 14.9, about 17.9, about 18.1, about 18.6, about 22.6, about 23.4, and about 24.4 degrees.

Figure 4:
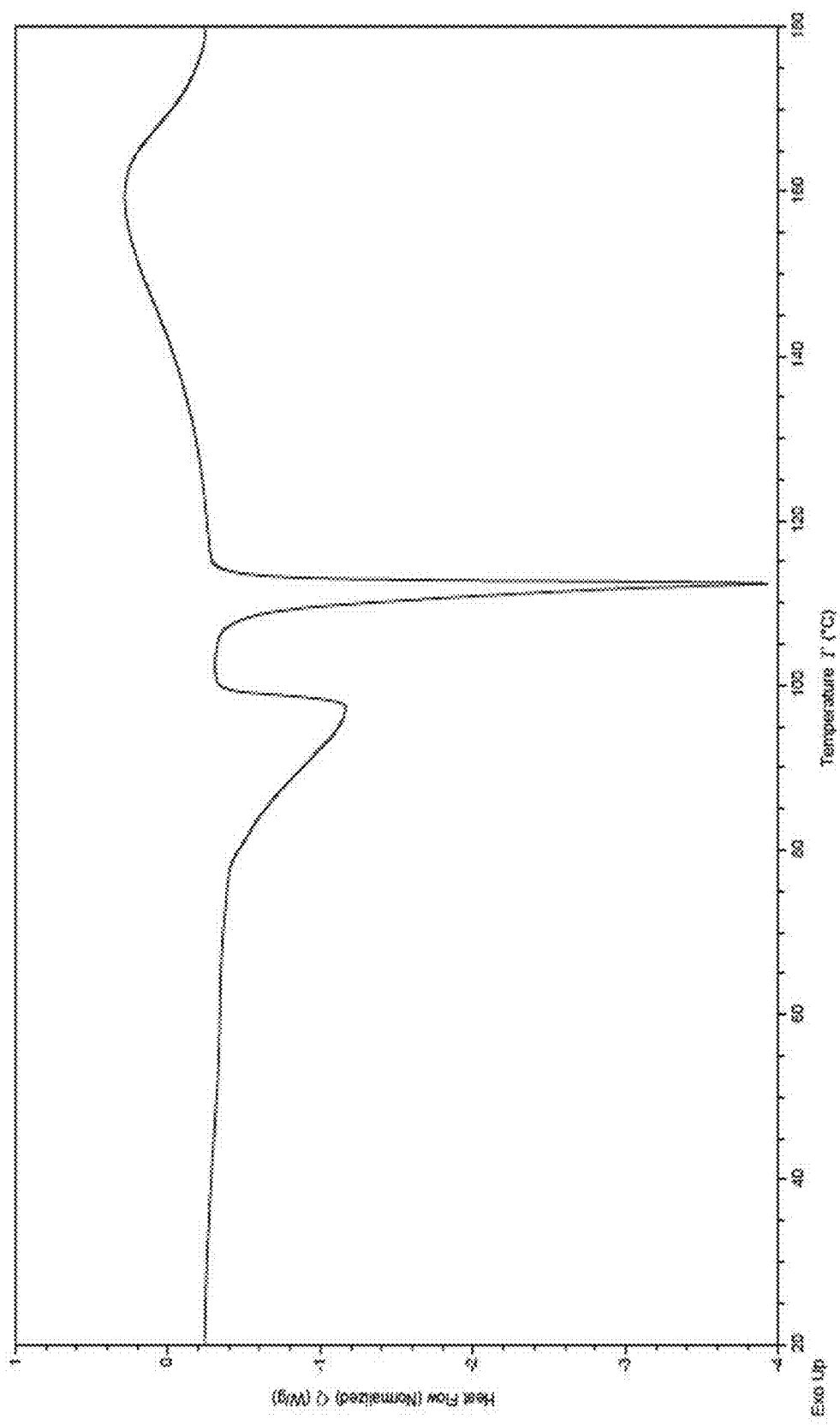
FIG. 4 represents a differential scanning calorimetry (DSC) chart of crystal B of hydrate of Compound I (vertical axis represents heat flux (W/g), and horizontal axis represents temperature (° C.)).

(d) Has a DSC chart shown in FIG. 4, or (i) an endothermic peak with an onset temperature of about 80° C. or a peak temperature of about 97° C., and/or (ii) an endothermic peak with an onset temperature of about 110° C. or a peak temperature of about 112° C. in the DSC.

Crystal A of monobenzoate of Compound I is characterized by physicochemical data of at least one of the following (e) and (f). Preferably, it is characterized by the physicochemical data of both of the following (e) and (f).

Figure 5:
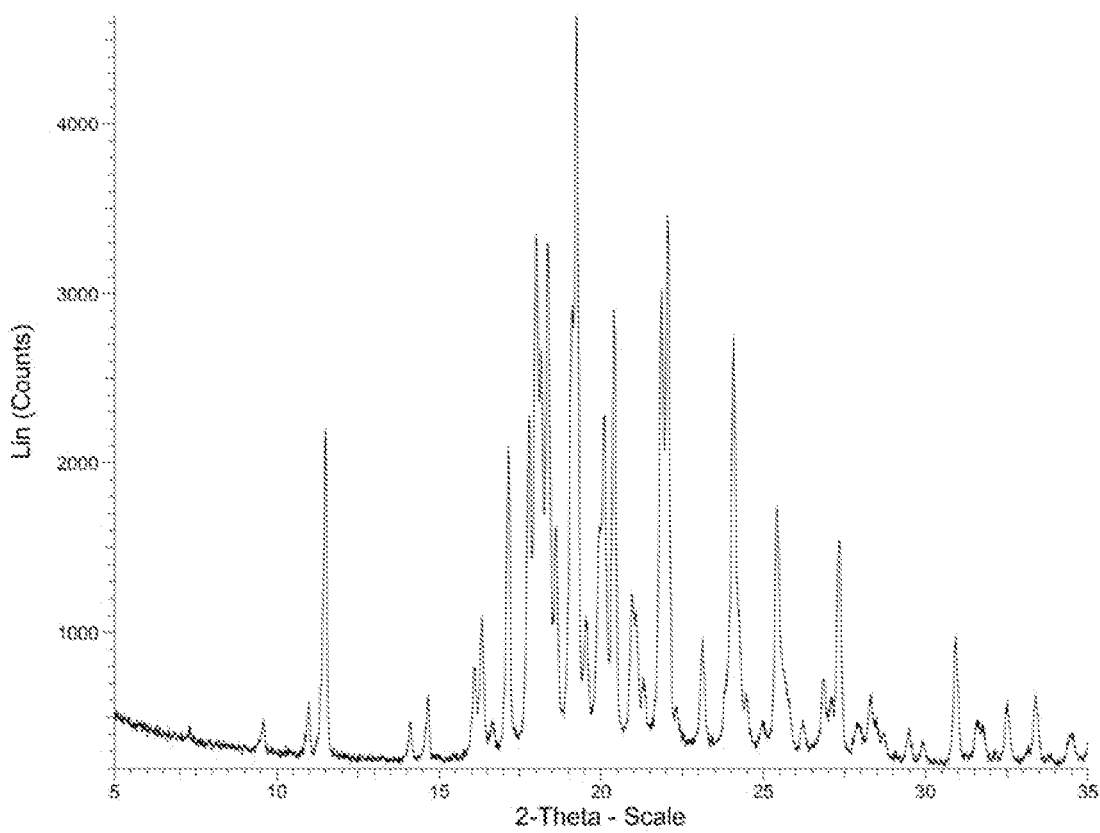
FIG. 5 represents a powder X-ray diffraction spectrum chart of crystal A of monobenzoate of Compound I (vertical axis represents intensity (counts), and horizontal axis represents 2θ (degrees)).

(e) Has (i) a powder X-ray diffraction spectrum as shown in FIG. 5, (ii) a diffraction angle (2θ) of the powder X-ray diffraction spectrum as shown in FIG. 5, (iii) a powder X-ray diffraction spectrum having a diffraction angle (2θ) substantially the same as the diffraction angle (2θ) shown in Table 3, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 3, or (v) a powder X-ray diffraction spectrum having at least one, two, three, four, five, or more than five peaks at a diffraction angle (2θ) selected from about 11.5, about 17.1, about 18.0, about 18.4, about 19.3, about 20.4, about 21.9, about 22.1, and about 24.1 degrees.

Figure 6:
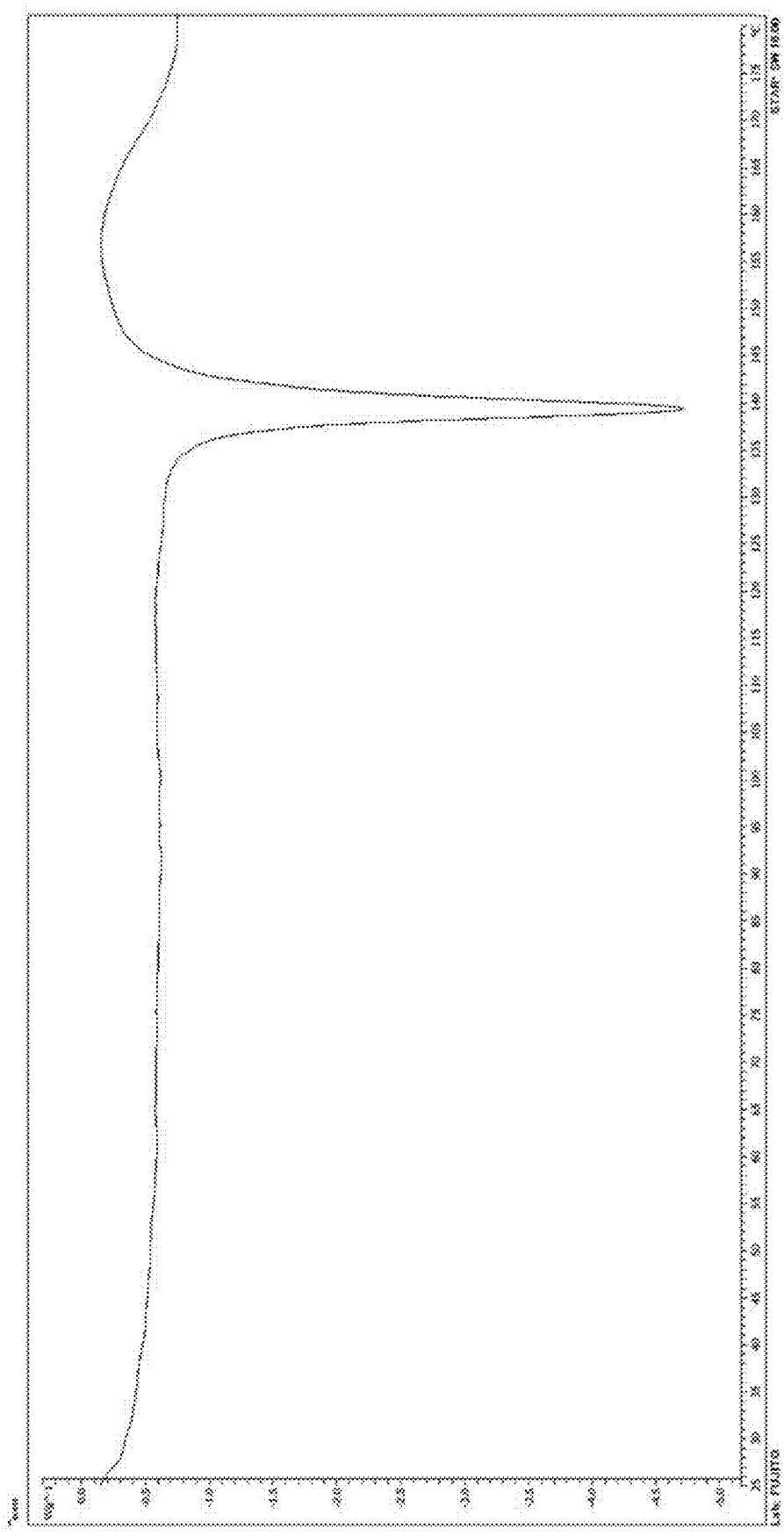
FIG. 6 represents a differential scanning calorimetry (DSC) chart of crystal A of monobenzoate of Compound I (vertical axis represents heat flux (W/g), and horizontal axis represents temperature (° C.)).

(f) Has a DSC chart shown in FIG. 6, or an endothermic peak with an onset temperature of about 137° C. or a peak temperature of about 139° C. in the DSC.

Crystal A of mono(4-hydroxybenzoate) of Compound I is characterized by physicochemical data of at least one of the following (g) and (h). Preferably, it is characterized by the physicochemical data of both of the following (g) and (h).

Figure 7:
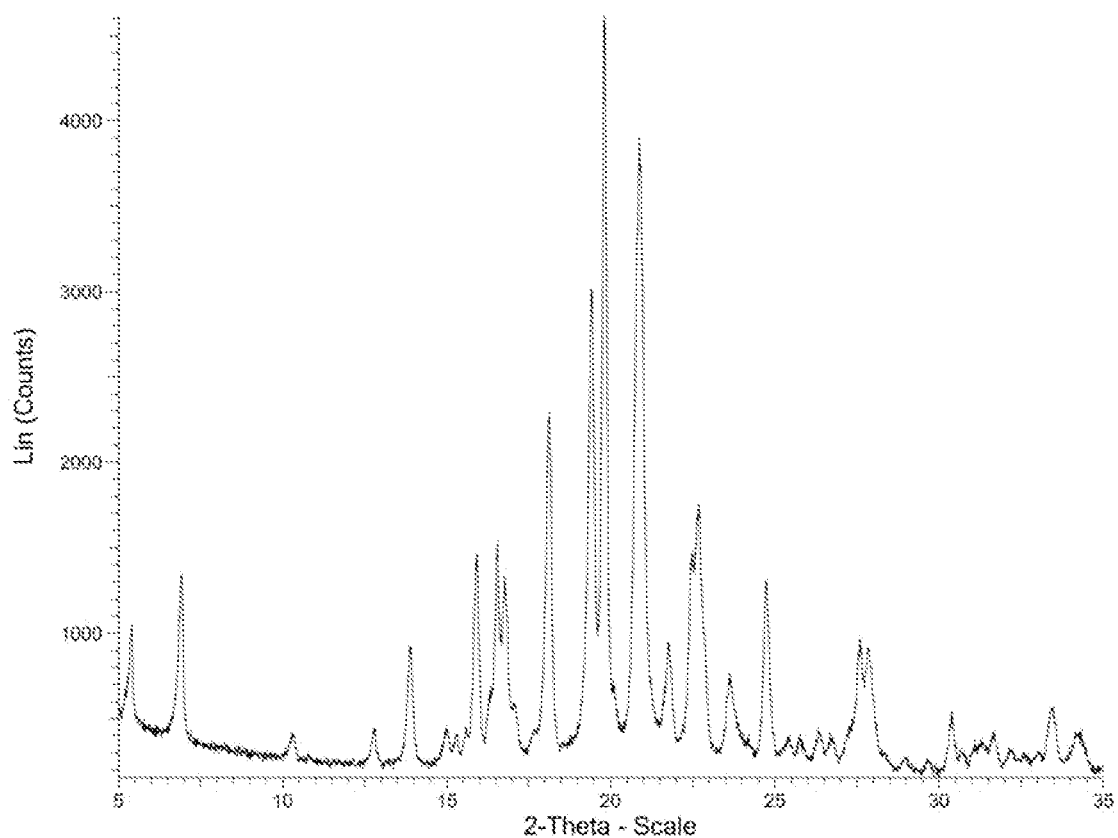
FIG. 7 represents a powder X-ray diffraction spectrum chart of crystal A of mono(4-hydroxybenzoate) of Compound I (vertical axis represents intensity (counts), and horizontal axis represents 2θ (degrees)).

(g) Has (i) a powder X-ray diffraction spectrum as shown in FIG. 7, (ii) a diffraction angle (2θ) of the powder X-ray diffraction spectrum as shown in FIG. 7, (iii) a powder X-ray diffraction spectrum having a diffraction angle (2θ) substantially the same as the diffraction angle (2θ) shown in Table 4, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 4, (v) a powder X-ray diffraction spectrum having at least one, two, three, four, five, or more than five peaks at a diffraction angle (2θ) selected from about 5.4, about 6.9, about 13.9, about 18.1, about 19.4, about 19.8, about 20.9, and about 24.7 degrees, or (vi) a powder X-ray diffraction spectrum having at least one, two, three, four, five, or more than five peaks at a diffraction angle (2θ) selected from about 5.4, about 6.9, about 12.8, about 13.9, about 18.1, about 19.4, about 19.8, about 20.9, and about 24.7 degrees.

Figure 8:
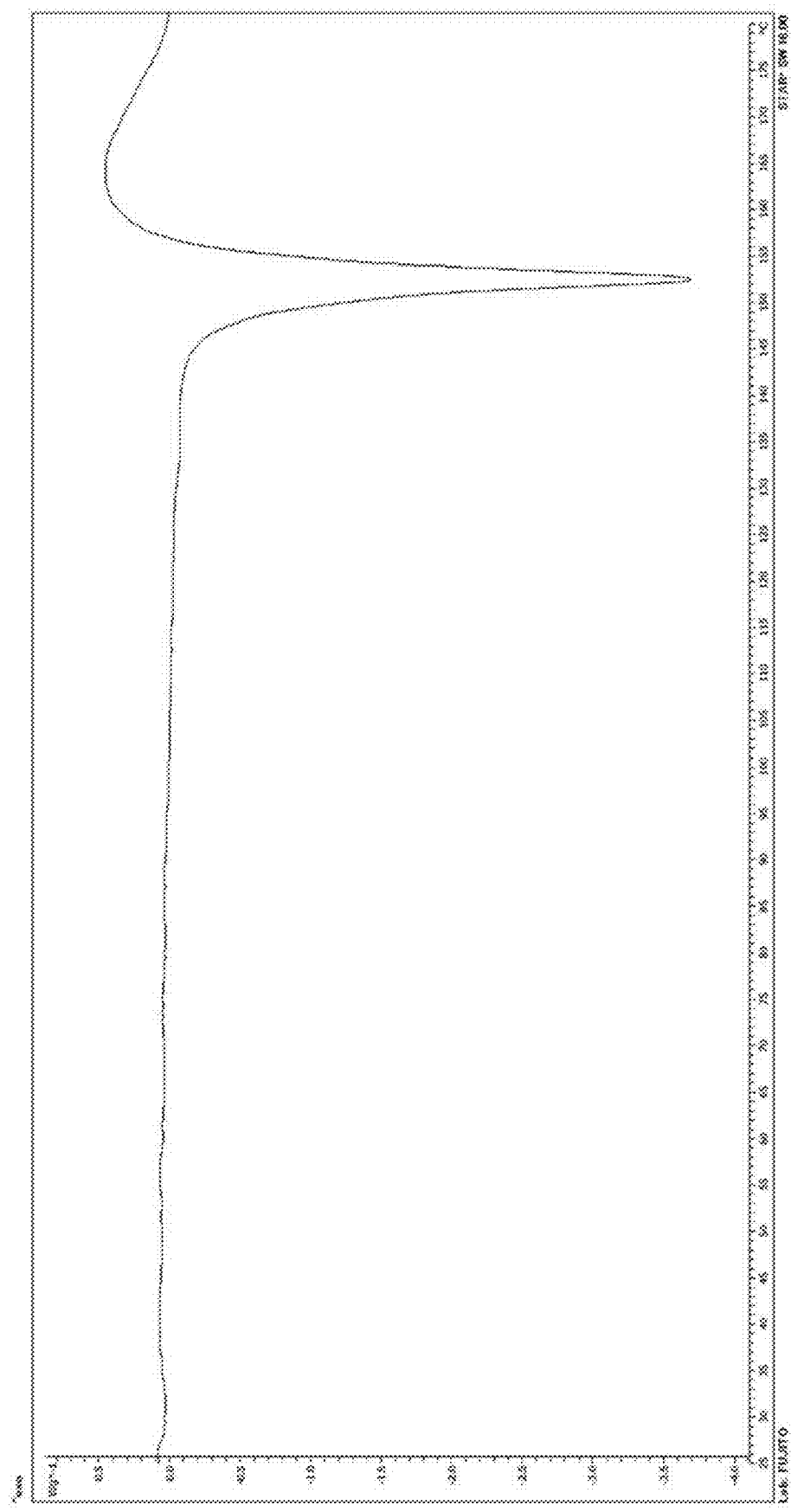
FIG. 8 represents a differential scanning calorimetry (DSC) chart of crystal A of mono(4-hydroxybenzoate) of Compound I (vertical axis represents heat flux (W/g), and horizontal axis represents temperature (° C.)).

(h) Has a DSC chart shown in FIG. 8, or an endothermic peak with an onset temperature of about 150° C. or a peak temperature of about 153° C. in the DSC.

Crystal B of mono(4-hydroxy benzoate) of Compound I is characterized by physicochemical data of at least one of the following (k) and (l). Preferably, it is characterized by the physicochemical data of both of the following (k) and (l).

Figure 9:
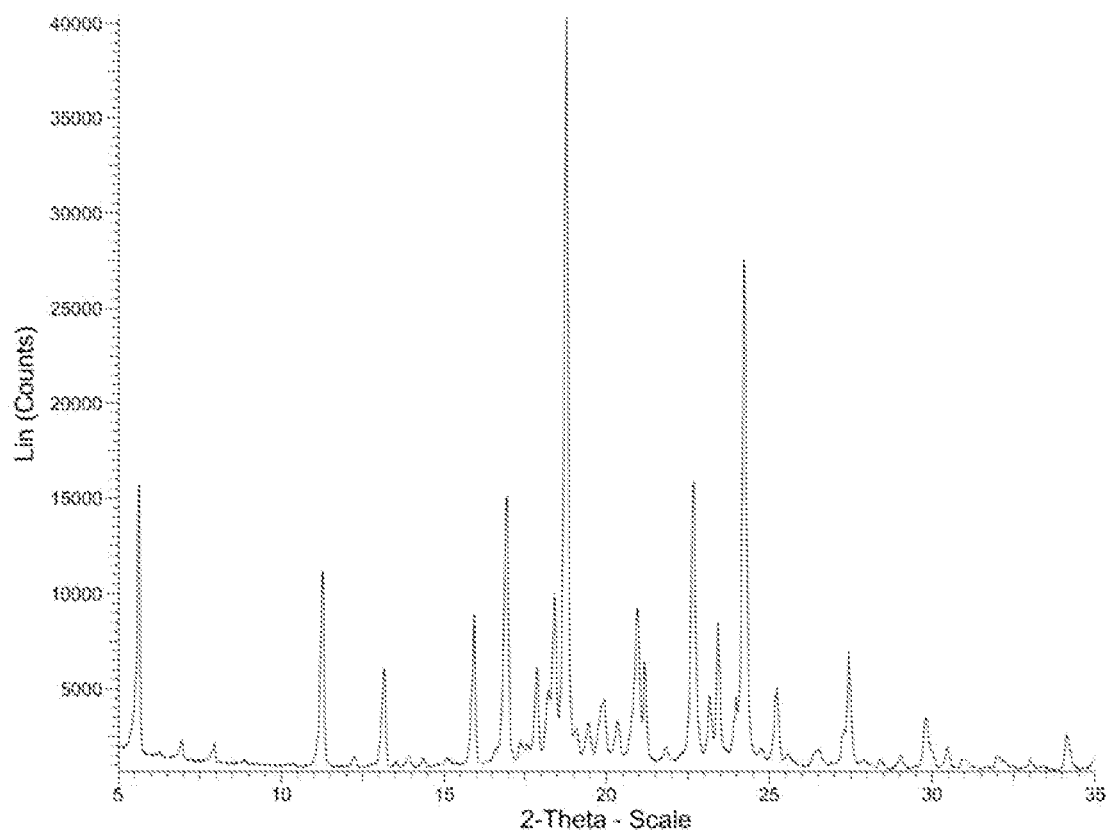
FIG. 9 represents a powder X-ray diffraction spectrum chart of crystal B of mono(4-hydroxybenzoate) of Compound I (vertical axis represents intensity (counts), and horizontal axis represents 2θ (degrees)).

(k) Has (i) a powder X-ray diffraction spectrum as shown in FIG. 9, (ii) a diffraction angle (2θ) of the powder X-ray diffraction spectrum as shown in FIG. 9, (iii) a powder X-ray diffraction spectrum having a diffraction angle (2θ) substantially the same as the diffraction angle (2θ) shown in Table 5, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 5, or (v) a powder X-ray diffraction spectrum having at least one, two, three, four, five, or more than five peaks at a diffraction angle (2θ) selected from about 5.6, about 11.3, about 13.2, about 15.9, about 16.9, about 18.8, about 22.7, and about 24.2 degrees.

Figure 10:
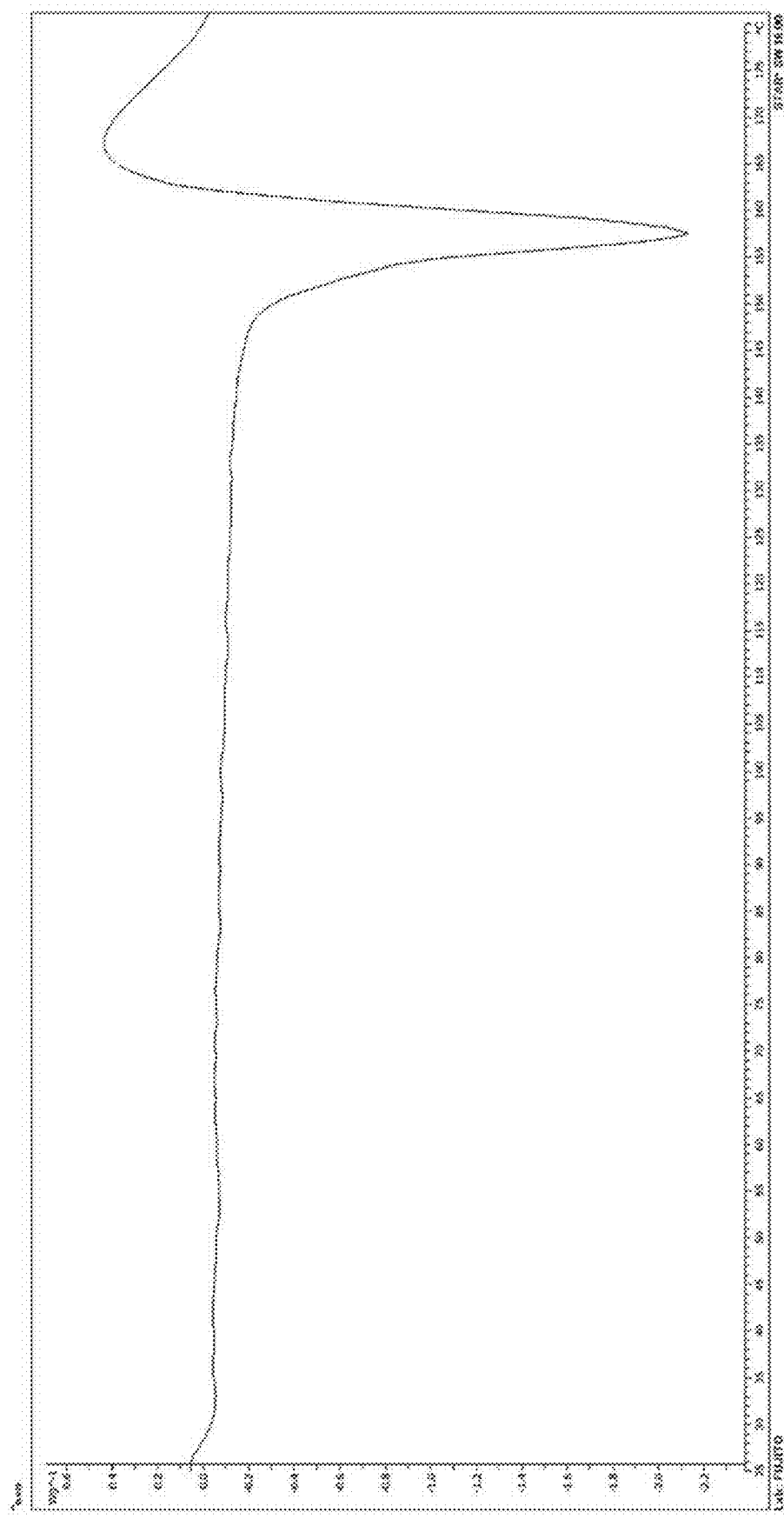
FIG. 10 represents a differential scanning calorimetry (DSC) chart of crystal B of mono(4-hydroxybenzoate) of Compound I (vertical axis represents heat flux (W/g), and horizontal axis represents temperature (° C.)).

(l) Has a DSC chart shown in FIG. 10, or an endothermic peak with an onset temperature of about 154° C. or a peak temperature of about 158° C. in the DSC.

Crystal C of hydrate of mono(4-hydroxybenzoate) of Compound I is characterized by physicochemical data of at least one of the following (m) and (n). Preferably, it is characterized by the physicochemical data of both of the following (m) and (n).

Figure 11:
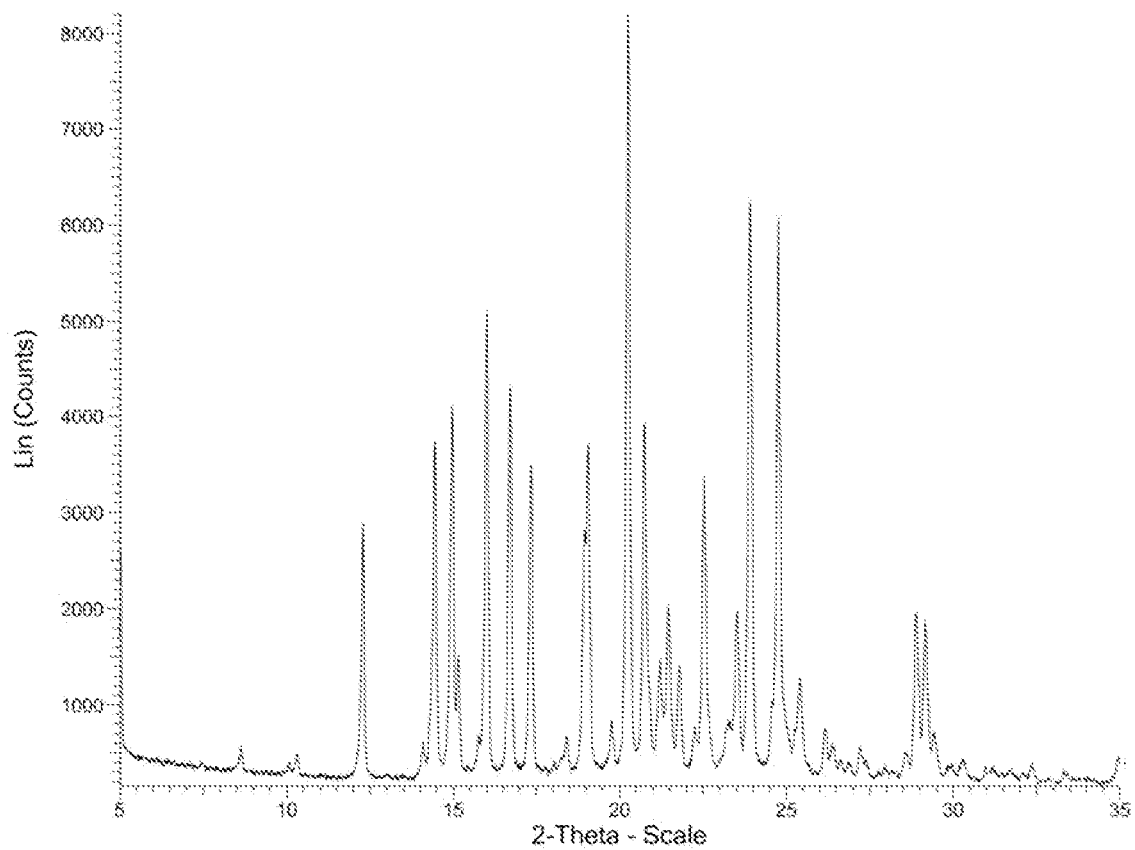
FIG. 11 represents a powder X-ray diffraction spectrum chart of crystal C of hydrate of mono(4-hydroxybenzoate) of Compound I (vertical axis represents intensity (counts), and horizontal axis represents 2θ (degrees)).

(m) Has (i) a powder X-ray diffraction spectrum as shown in FIG. 11, (ii) a diffraction angle (2θ) of the powder X-ray diffraction spectrum as shown in FIG. 11, (iii) a powder X-ray diffraction spectrum having a diffraction angle (2θ) substantially the same as the diffraction angle (2θ) shown in Table 6, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 6, or (v) a powder X-ray diffraction spectrum having at least one, two, three, four, five, or more than five peaks at a diffraction angle (2θ) selected from about 12.3, about 14.4, about 15.0, about 16.0, about 16.7, about 20.3, about 23.9, and about 24.8 degrees.

Figure 12:
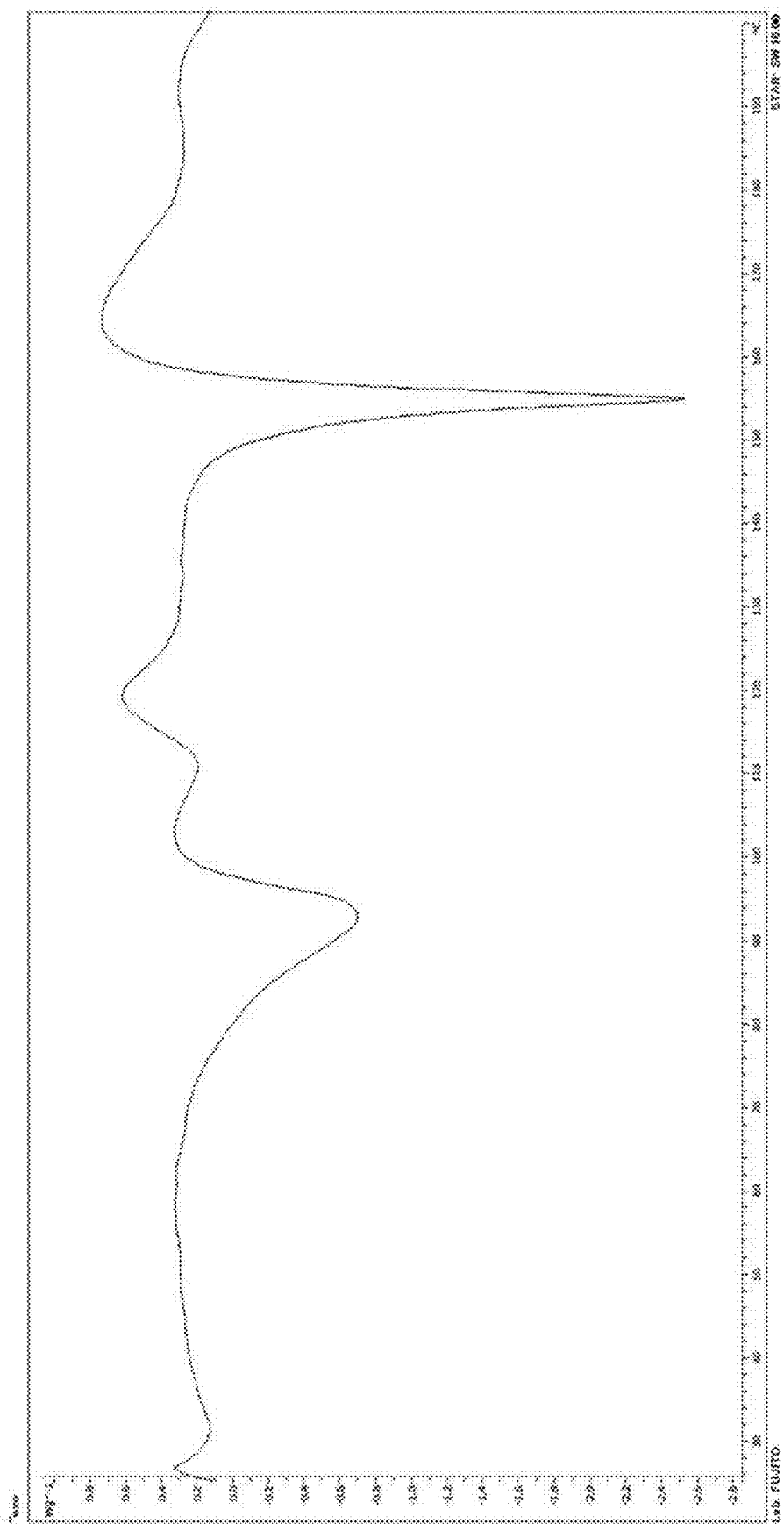
FIG. 12 represents a differential scanning calorimetry (DSC) chart of crystal C of hydrate of mono(4-hydroxybenzoate) of Compound I (vertical axis represents heat flux (W/g), and horizontal axis represents temperature (° C.)).

(n) Has a DSC chart shown in FIG. 12, or (i) an endothermic peak with an onset temperature of about 78° C. or a peak temperature of about 93° C., (ii) an endothermic peak with an onset temperature of about 105° C. or a peak temperature of about 114° C., (iii) an endothermic peak with an onset temperature of about 152° C. or a peak temperature of about 155° C., (iv) an exothermic peak with an onset temperature of about 114° C. or a peak temperature of about 120° C., and/or (v) an exothermic peak at an onset temperature of about 159° C. or a peak temperature of about 165° C. in the DSC.

Crystal B of hemisulfate of Compound I is characterized by physicochemical data of at least one of the following (o) and (p). Preferably, it is characterized by the physicochemical data of both of the following (o) and (p).

Figure 13:
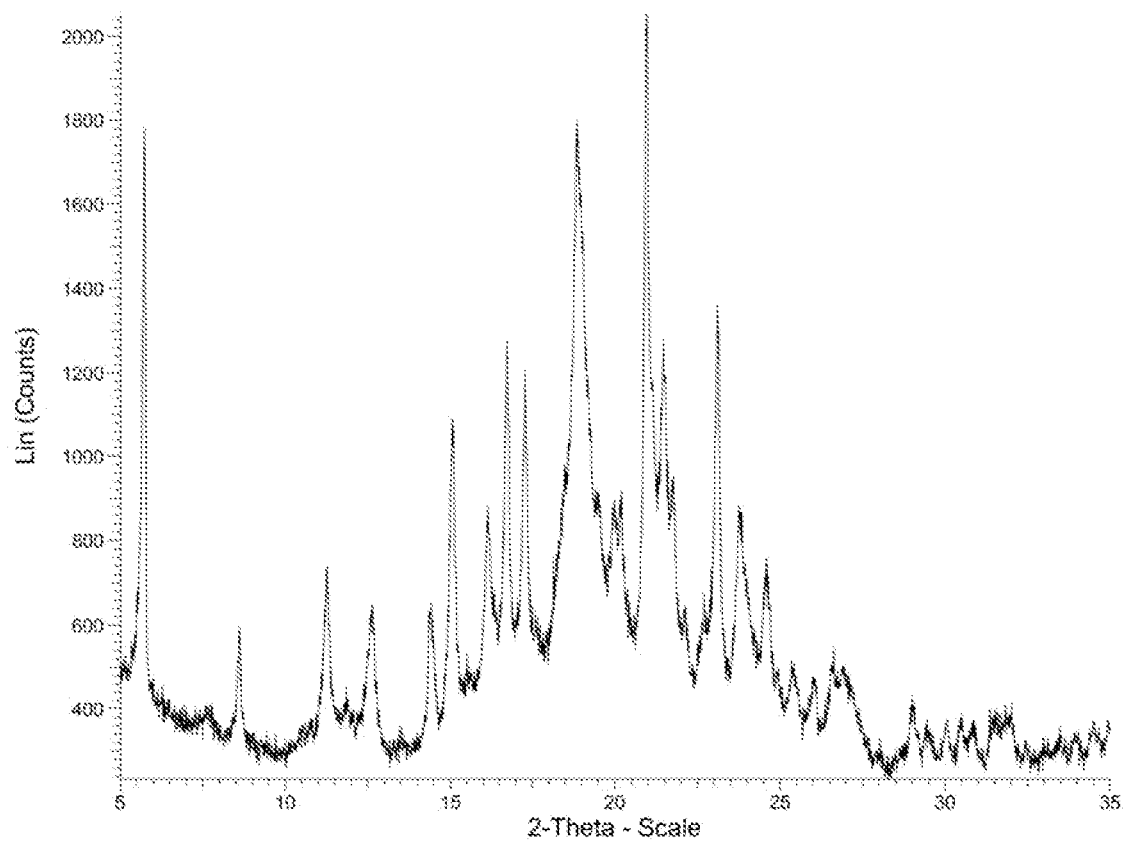
FIG. 13 represents a powder X-ray diffraction spectrum chart of crystal B of hemisulfate of Compound I (vertical axis represents intensity (counts), and horizontal axis represents 2θ (degrees)).

(o) Has (i) a powder X-ray diffraction spectrum as shown in FIG. 13, (ii) a diffraction angle (2θ) of the powder X-ray diffraction spectrum as shown in FIG. 13, (iii) a powder X-ray diffraction spectrum having a diffraction angle (2θ) substantially the same as the diffraction angle (2θ) shown in Table 7, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 7, or (v) a powder X-ray diffraction spectrum having at least one, two, three, four, five, or more than five peaks at a diffraction angle (2θ) selected from about 5.7, about 15.1, about 16.7, about 17.3, about 18.9, about 21.0, about 21.5, and about 23.1 degrees.

Figure 14:
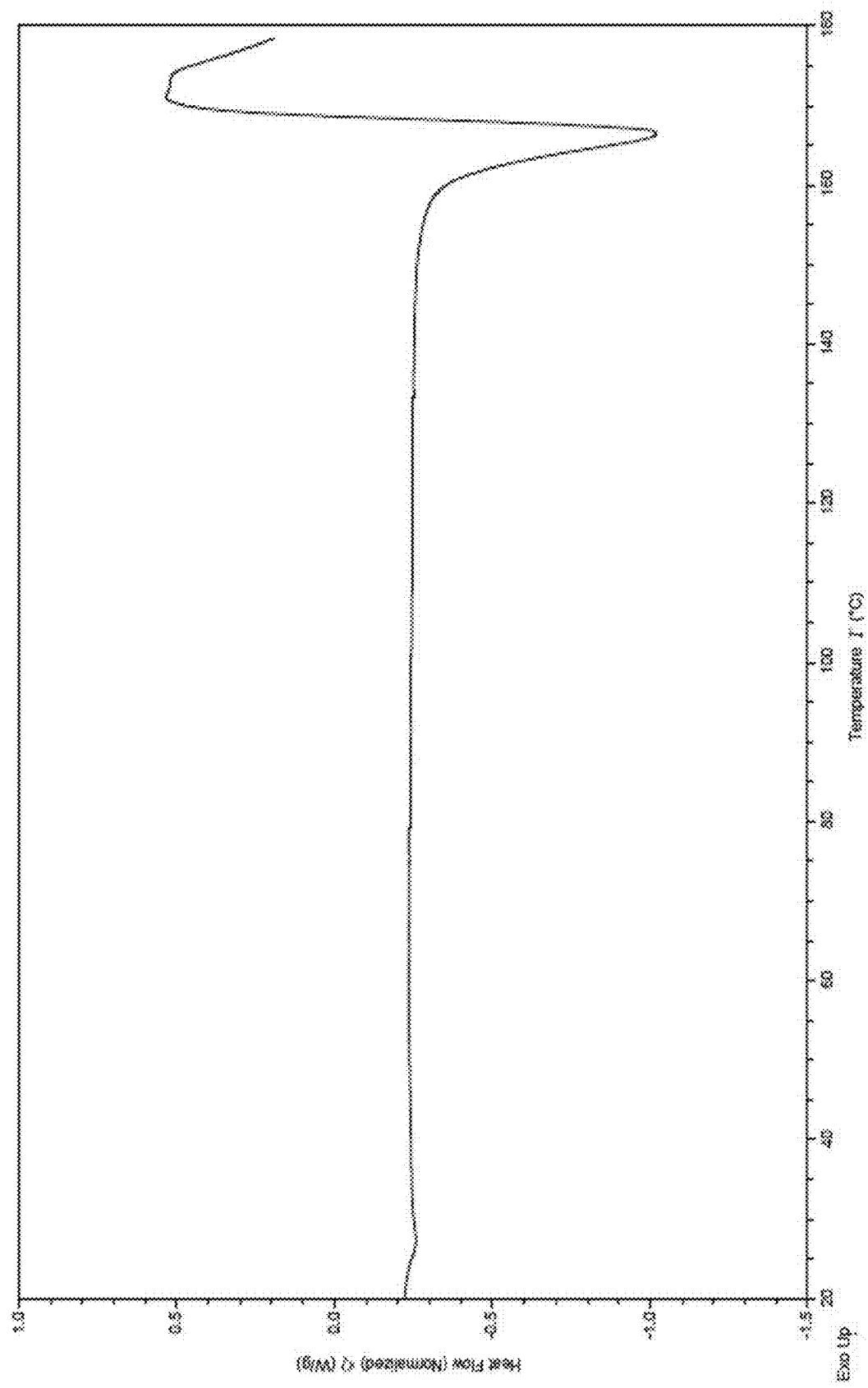
FIG. 14 represents a differential scanning calorimetry (DSC) chart of crystal B of hemisulfate of Compound I (vertical axis represents heat flux (W/g), and horizontal axis represents temperature (° C.)).

(p) Has a DSC chart shown in FIG. 14, or an endothermic peak with an onset temperature of about 161° C. or a peak temperature of about 166° C. in the DSC.

Crystal A of mono-tryptophan salt of Compound I is characterized by physicochemical data of at least one of the following (q) and (r). Preferably, it is characterized by the physicochemical data of both of the following (q) and (r).

Figure 15:
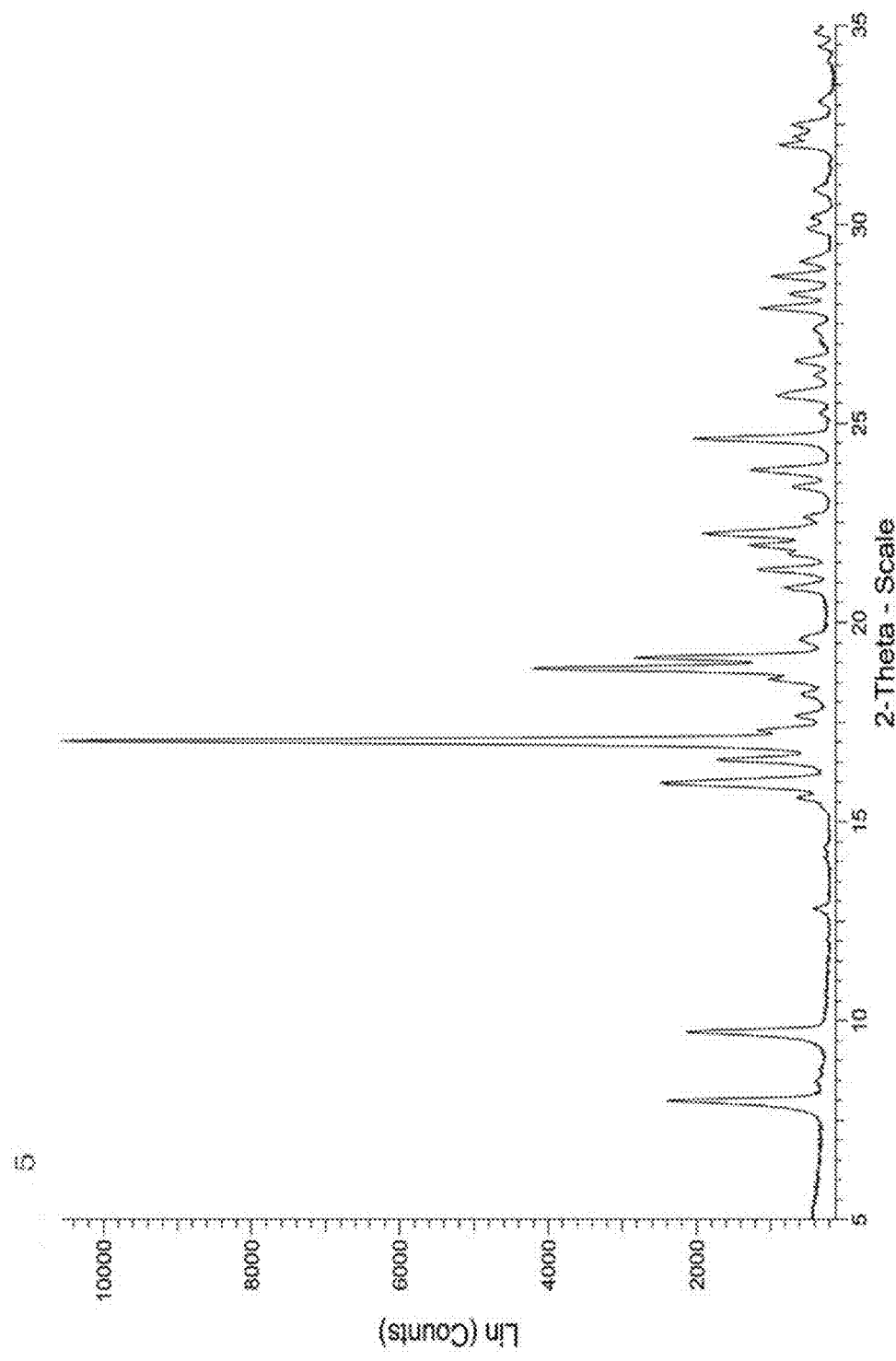
FIG. 15 represents a powder X-ray diffraction spectrum chart of crystal A of mono-tryptophan salt of Compound I (vertical axis represents intensity (counts), and horizontal axis represents 2θ (degrees)).

(q) Has (i) a powder X-ray diffraction spectrum as shown in FIG. 15, (ii) a diffraction angle (2θ) of the powder X-ray diffraction spectrum as shown in FIG. 15, (iii) a powder X-ray diffraction spectrum having a diffraction angle (2θ) substantially the same as the diffraction angle (2θ) shown in Table 8, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 8, or (v) a powder X-ray diffraction spectrum having at least one, two, three, four, five, or more than five peaks at a diffraction angle (2θ) selected from about 8.0, about 9.7, about 16.0, about 17.0, about 18.9, about 19.1, about 22.2, and about 24.6 degrees.

Figure 16:
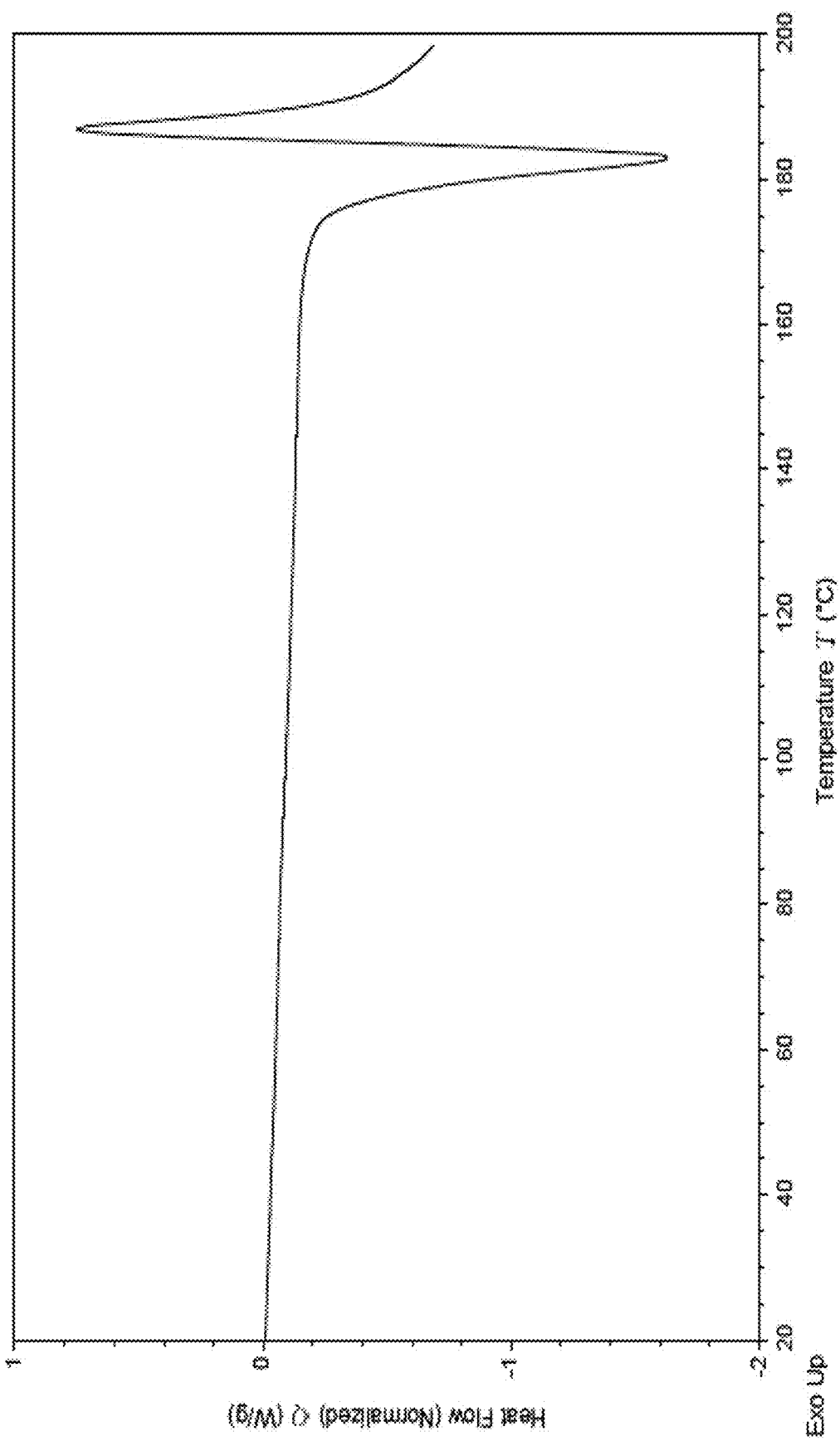
FIG. 16 represents a differential scanning calorimetry (DSC) chart of crystal A of mono-tryptophan salt of Compound I (vertical axis represents heat flux (W/g), and horizontal axis represents temperature (° C.)).

(r) Has a DSC chart shown in FIG. 16, or (i) an endothermic peak with an onset temperature of about 178° C. or a peak temperature of about 183° C. and/or (ii) an exothermic peak at an onset temperature of about 185° C. or a peak temperature of about 187° C. in the DSC.

Crystal A of hemisuccinate of Compound I is characterized by physicochemical data of at least one of the following(s) and (t). Preferably, it is characterized by the physicochemical data of both of the following(s) and (t).

Figure 17:
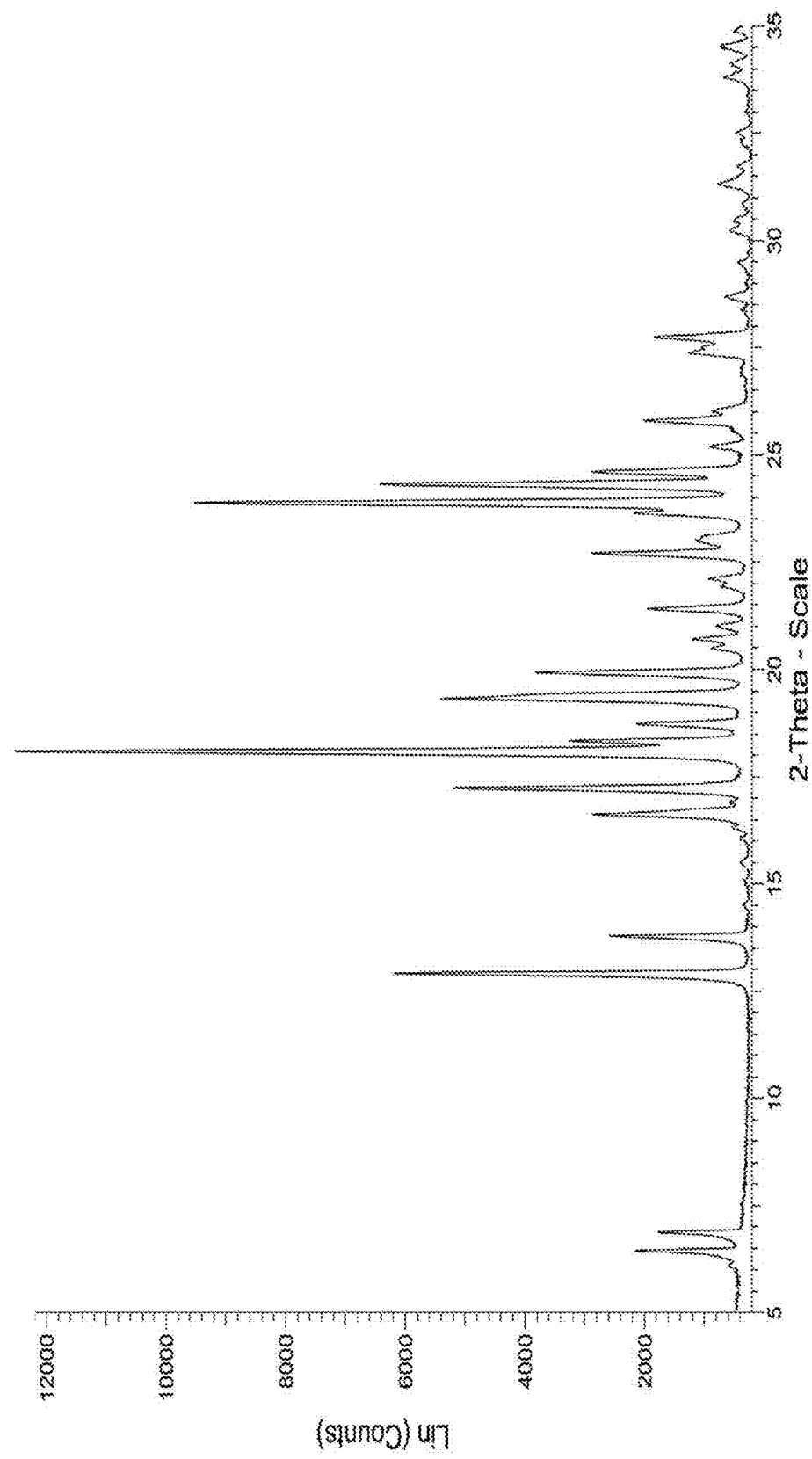
FIG. 17 represents a powder X-ray diffraction spectrum chart of crystal A of hemisuccinate of Compound I (vertical axis represents intensity (counts), and horizontal axis represents 2θ (degrees)).

(s) Has (i) a powder X-ray diffraction spectrum as shown in FIG. 17, (ii) a diffraction angle (2θ) of the powder X-ray diffraction spectrum as shown in FIG. 17, (iii) a powder X-ray diffraction spectrum having a diffraction angle (2θ) substantially the same as the diffraction angle (2θ) shown in Table 9, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 9, or (v) a powder X-ray diffraction spectrum having at least one, two, three, four, five, or more than five peaks at a diffraction angle (2θ) selected from about 6.4, about 6.9, about 12.9, about 13.8, about 17.2, about 18.1, about 19.3, about 23.9, and about 24.3 degrees.

Figure 18:
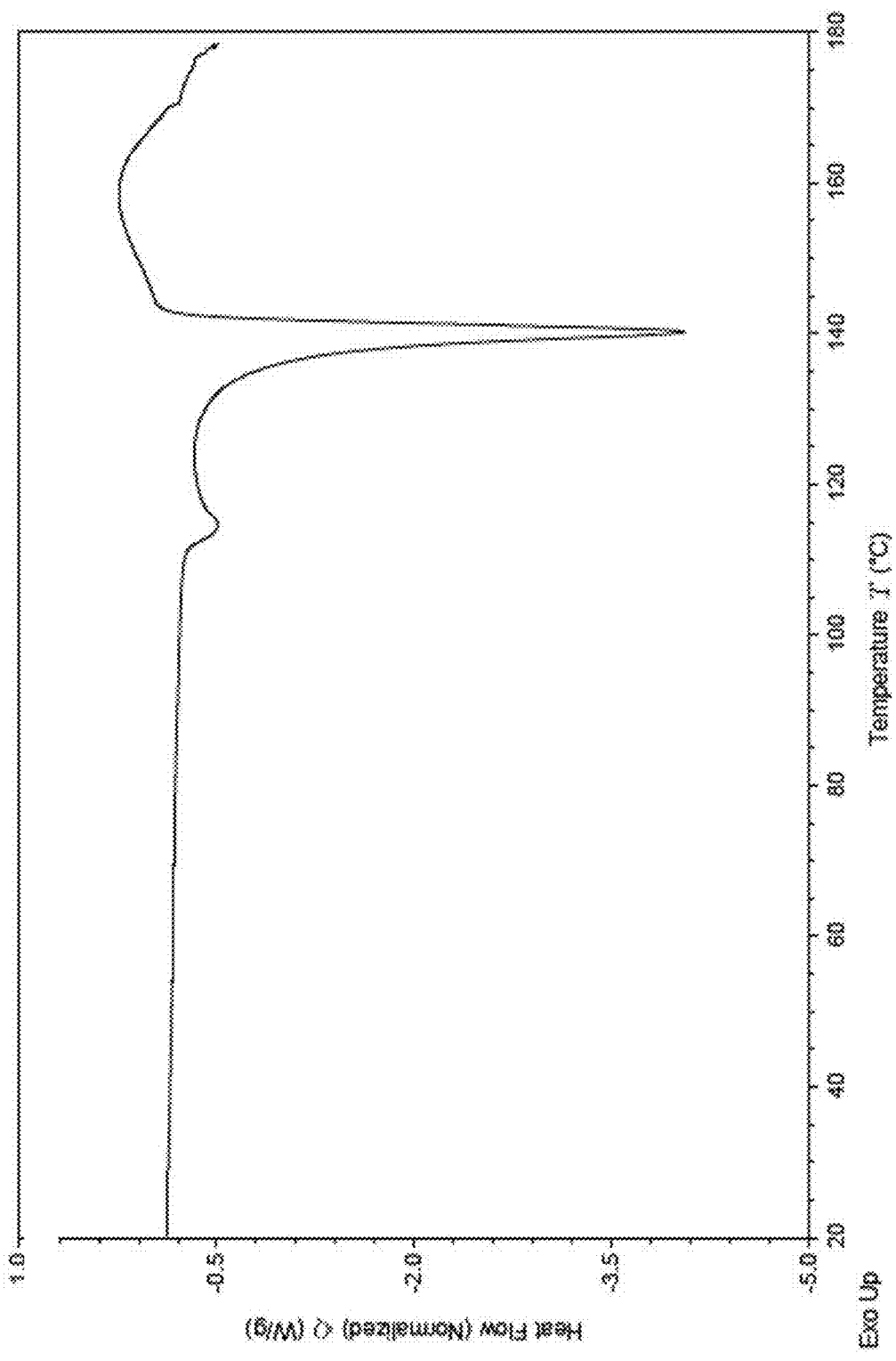
FIG. 18 represents a differential scanning calorimetry (DSC) chart of crystal A of hemisuccinate of Compound I (vertical axis represents heat flux (W/g), and horizontal axis represents temperature (° C.)).

(t) Has a DSC chart shown in FIG. 18, or (i) an endothermic peak with an onset temperature of about 111° C. or a peak temperature of about 114° C., and/or (ii) an endothermic peak with an onset temperature of about 137° C. or a peak temperature of about 140° C. in the DSC.

Crystal B of hemiadipate of Compound I is characterized by physicochemical data of at least one of the following (u) and (w). Preferably, it is characterized by the physicochemical data of both of the following (u) and (w).

Figure 19:
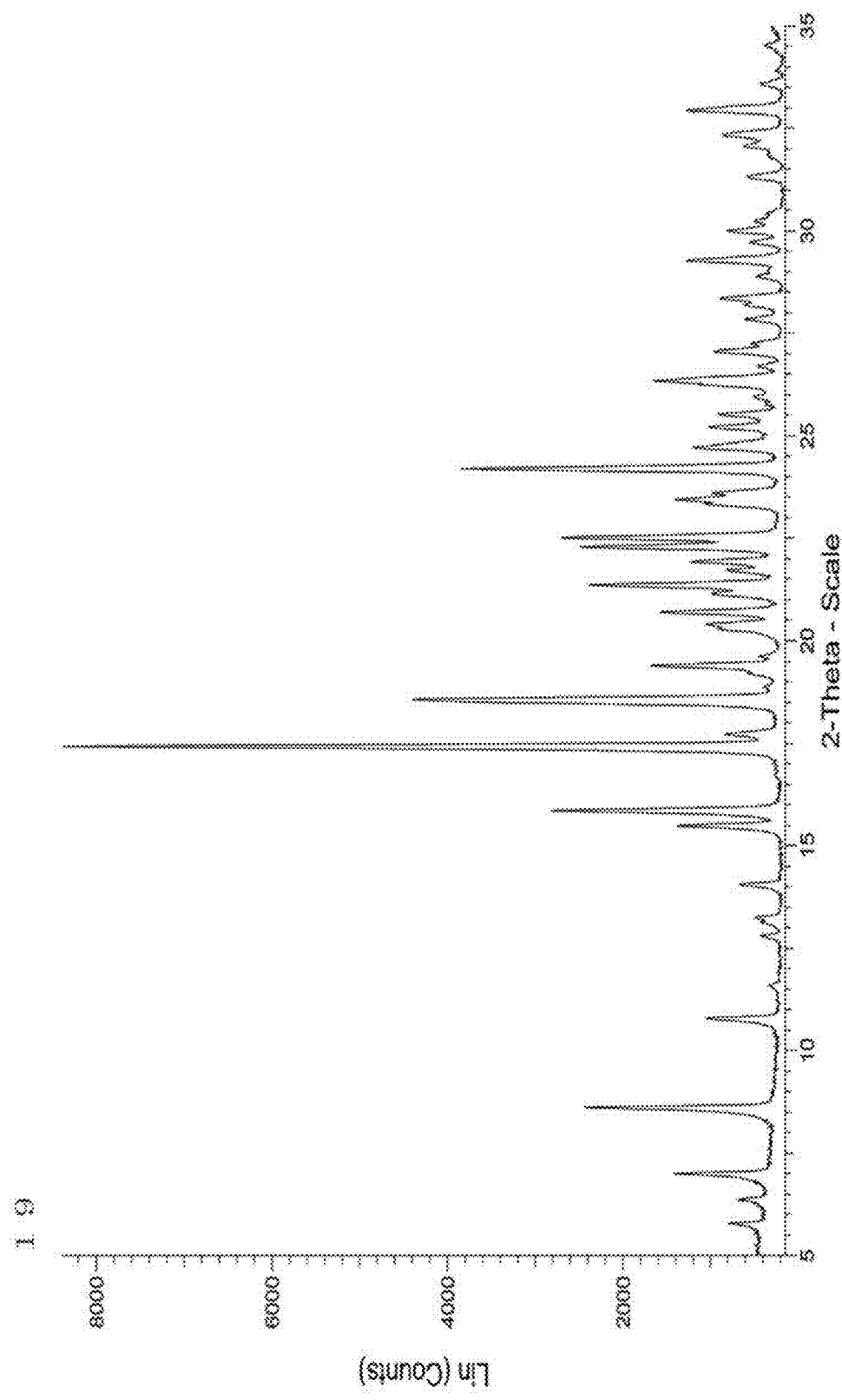
FIG. 19 represents a powder X-ray diffraction spectrum chart of crystal B of hemiadipate of Compound I (vertical axis represents intensity (counts), and horizontal axis represents 2θ (degrees)).

(u) Has (i) a powder X-ray diffraction spectrum as shown in FIG. 19, (ii) a diffraction angle (2θ) of the powder X-ray diffraction spectrum as shown in FIG. 19, (iii) a powder X-ray diffraction spectrum having a diffraction angle (2θ) substantially the same as the diffraction angle (2θ) shown in Table 10, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 10, or (v) a powder X-ray diffraction spectrum having at least one, two, three, four, five, or more than five peaks at a diffraction angle (2θ) selected from about 7.0, about 8.6, about 10.8, about 15.9, about 17.4, about 18.6, and about 24.2 degrees.

Figure 20:
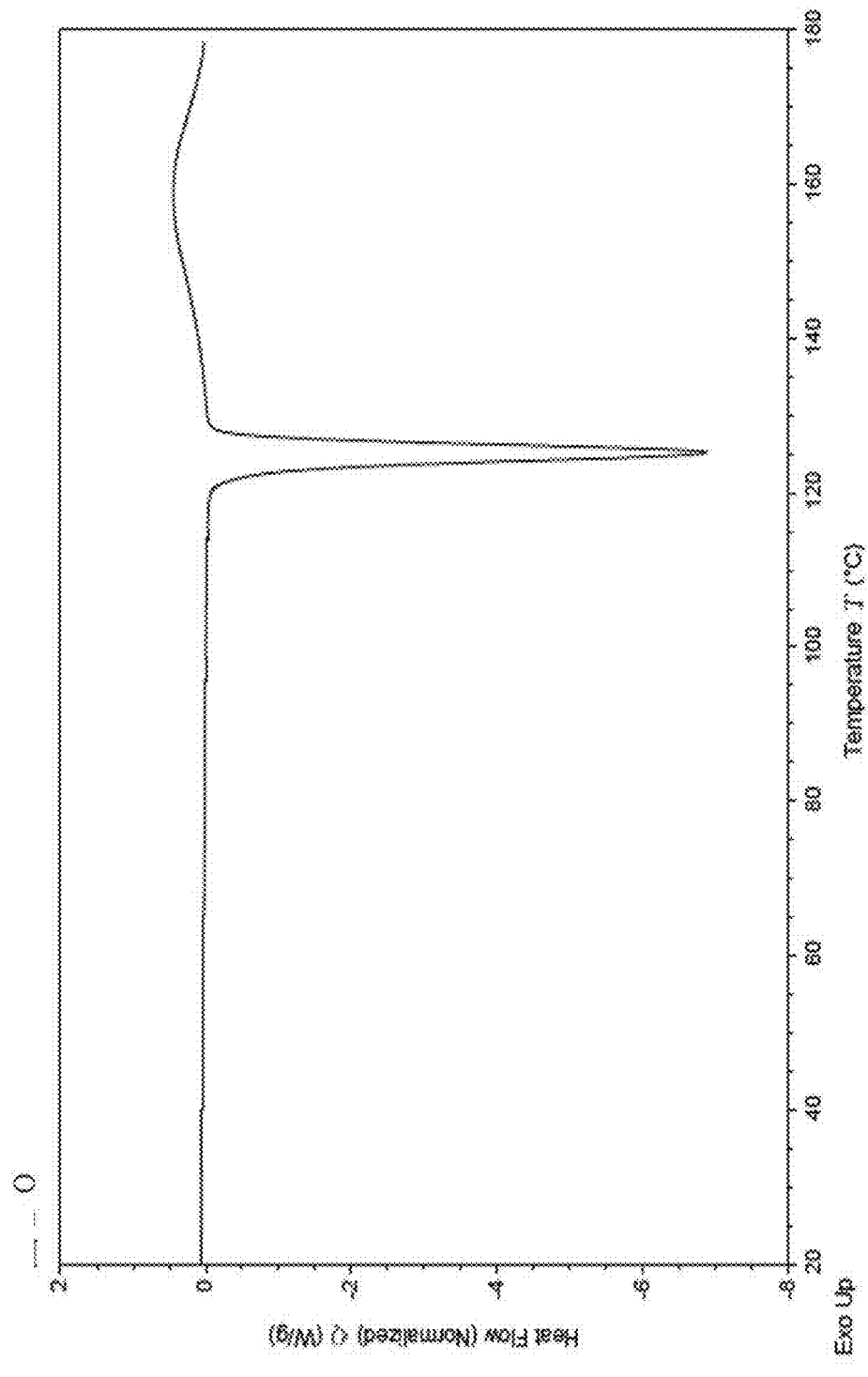
FIG. 20 represents a differential scanning calorimetry (DSC) chart of crystal B of hemiadipate of Compound I (vertical axis represents heat flux (W/g), and horizontal axis represents temperature (° C.)).

(w) Has a DSC chart shown in FIG. 20, or an endothermic peak with an onset temperature of about 123° C. or a peak temperature of about 125° C. in the DSC.

Crystal A of Compound I is characterized by physicochemical data of at least one of the following (aa) and (bb). Preferably, it is characterized by the physicochemical data of both of the following (aa) and (bb).

Figure 23:
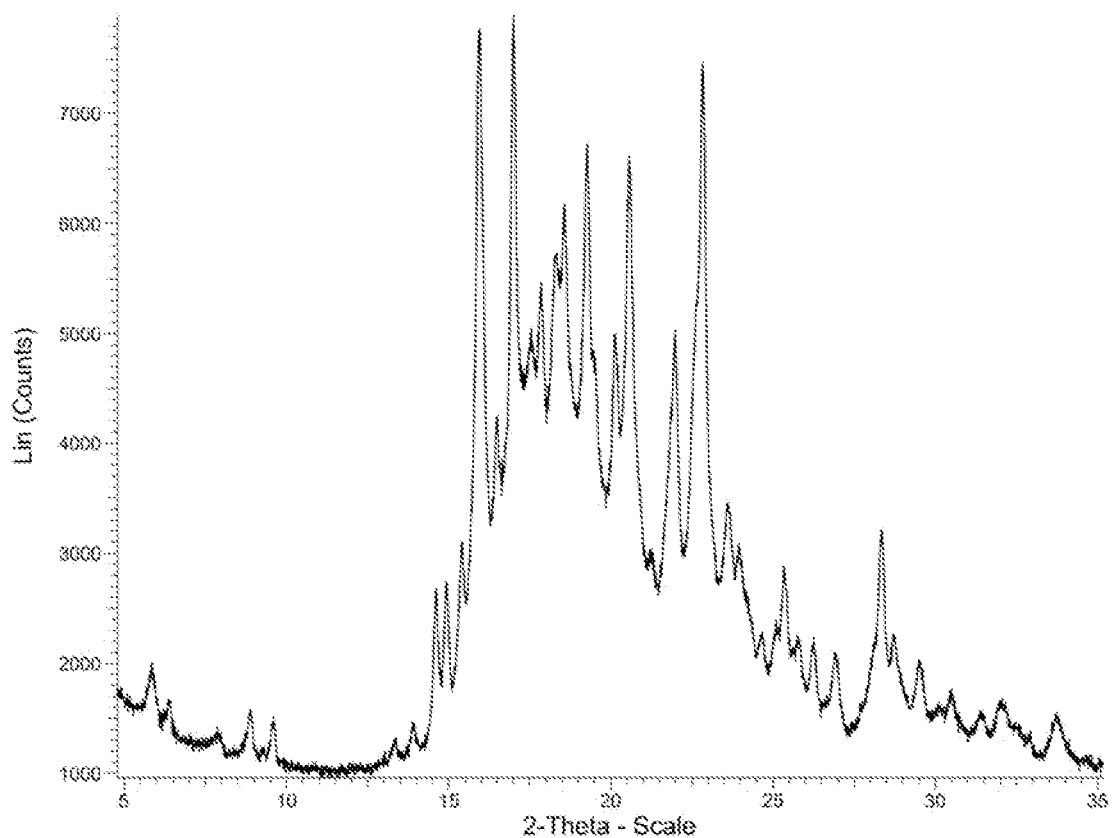
FIG. 23 represents a powder X-ray diffraction spectrum chart of crystal A of Compound I (vertical axis represents intensity (counts), and horizontal axis represents 20 (degrees)).

(aa) Has (i) a powder X-ray diffraction spectrum as shown in FIG. 23, (ii) a diffraction angle (2θ) of the powder X-ray diffraction spectrum as shown in FIG. 23, (iii) a powder X-ray diffraction spectrum having a diffraction angle (2θ) substantially the same as the diffraction angle (2θ) shown in Table 14, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 14, or (v) a powder X-ray diffraction spectrum having at least one, two, three, four, five, or more than five peaks at a diffraction angle (2θ) selected from about 15.9, about 17.0, about 19.3, about 20.1, about 20.6, about 22.8, and about 28.4 degrees.

Figure 24:
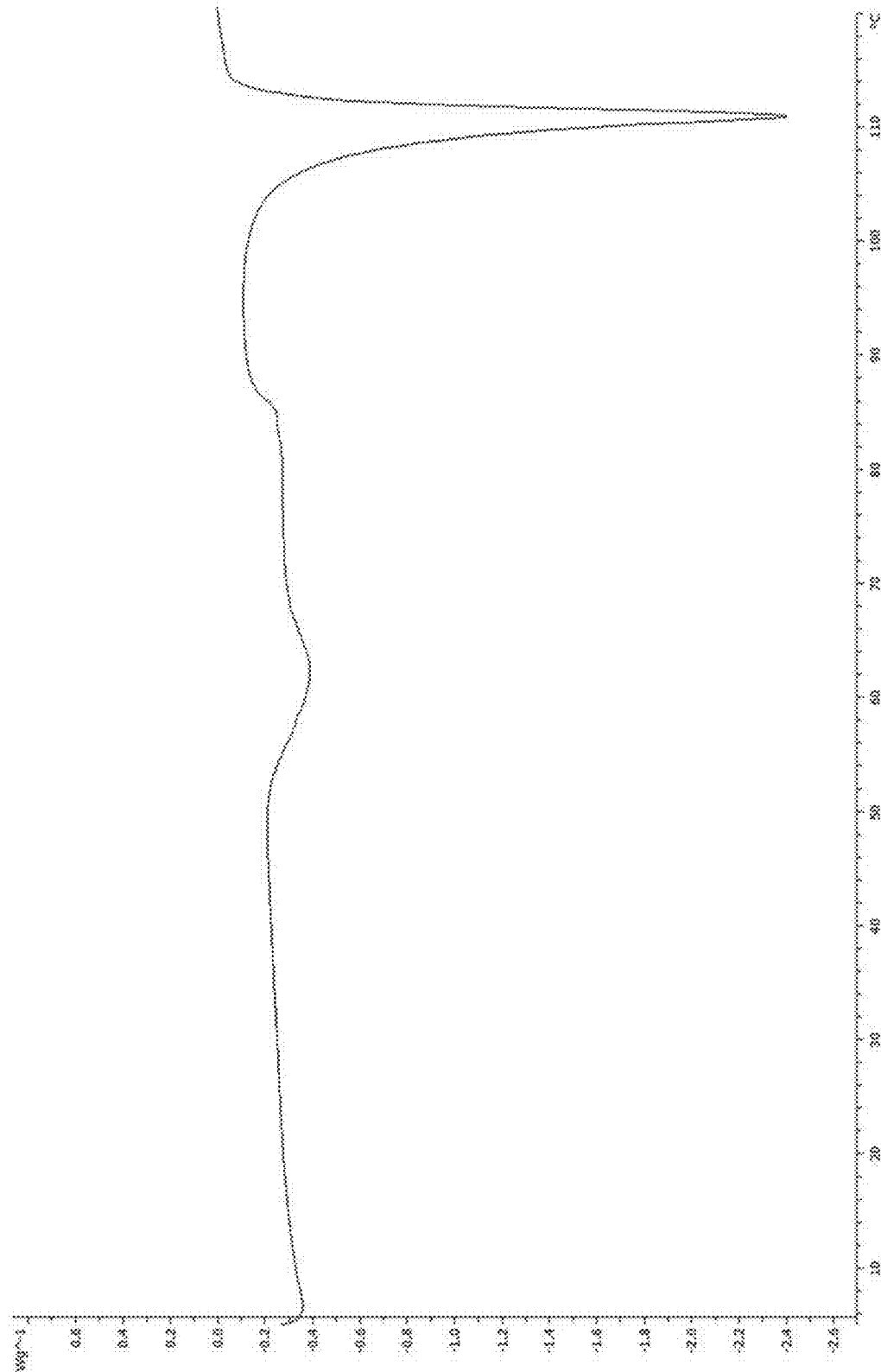
FIG. 24 represents a differential scanning calorimetry (DSC) chart of crystal A of Compound I (vertical axis represents heat flux (W/g), and horizontal axis represents temperature (° C.)).

(bb) Has a DSC chart shown in FIG. 24, or (i) a broad endothermic peak from an onset temperature of about 53° C. to an endset temperature of about 87° C. and/or (ii) an endothermic peak with an onset temperature of about 108° C. or a peak temperature of about 111° C. in the DSC.

Crystal D of hemi (4-hydroxybenzoate) of Compound I is characterized by physicochemical data of the following (cc).

Figure 25:
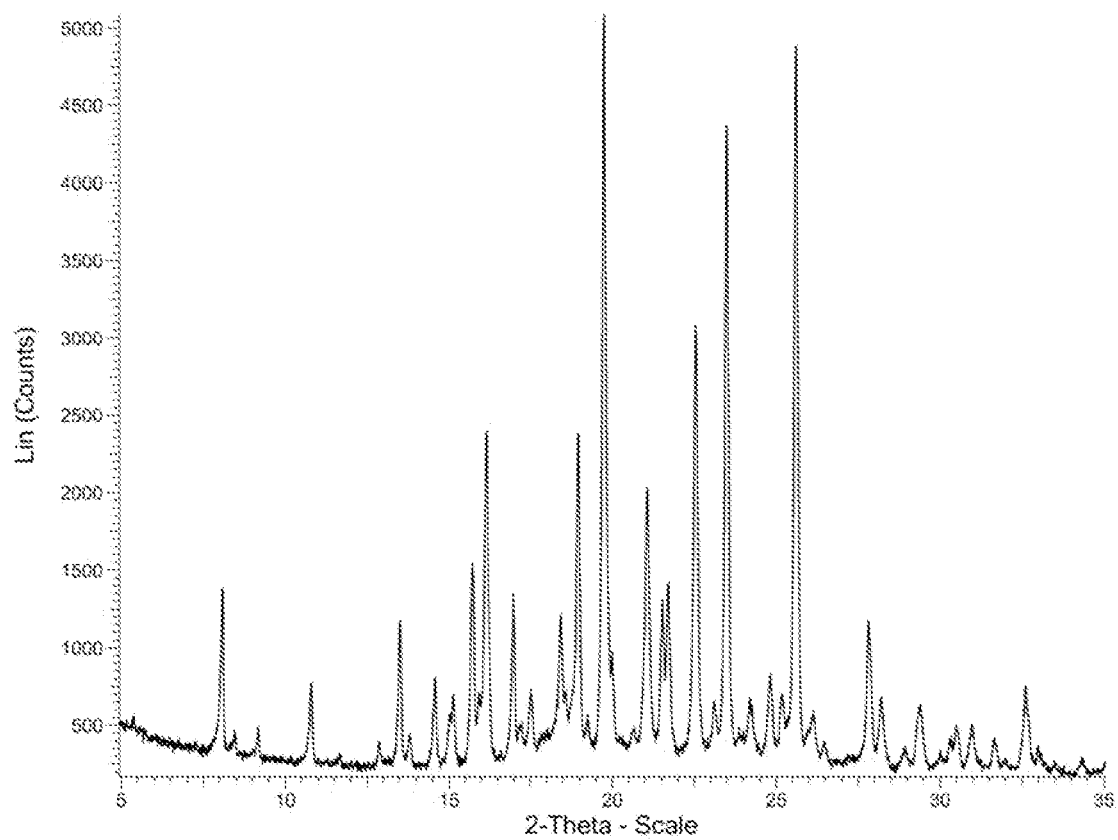
FIG. 25 represents a powder X-ray diffraction spectrum chart of crystal D of hemi (4-hydroxybenzoate) of Compound I (vertical axis represents intensity (counts), and horizontal axis represents 2θ (degrees)).

(cc) Has (i) a powder X-ray diffraction spectrum as shown in FIG. 25, (ii) a diffraction angle (2θ) of the powder X-ray diffraction spectrum as shown in FIG. 25, (iii) a powder X-ray diffraction spectrum having a diffraction angle (2θ) substantially the same as the diffraction angle (2θ) shown in Table 15, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 15, or (v) a powder X-ray diffraction spectrum having at least one, two, three, four, five, or more than five peaks at a diffraction angle (2θ) selected from about 8.1, about 10.8, about 13.5, about 16.1, about 19.8, about 22.5, about 23.5, and about 25.6 degrees.

Crystal E of mono(4-hydroxy benzoate) of Compound I is characterized by physicochemical data of at least one of the following (dd) and (ee). Preferably, it is characterized by the physicochemical data of both of the following (dd) and (ee).

Figure 26:
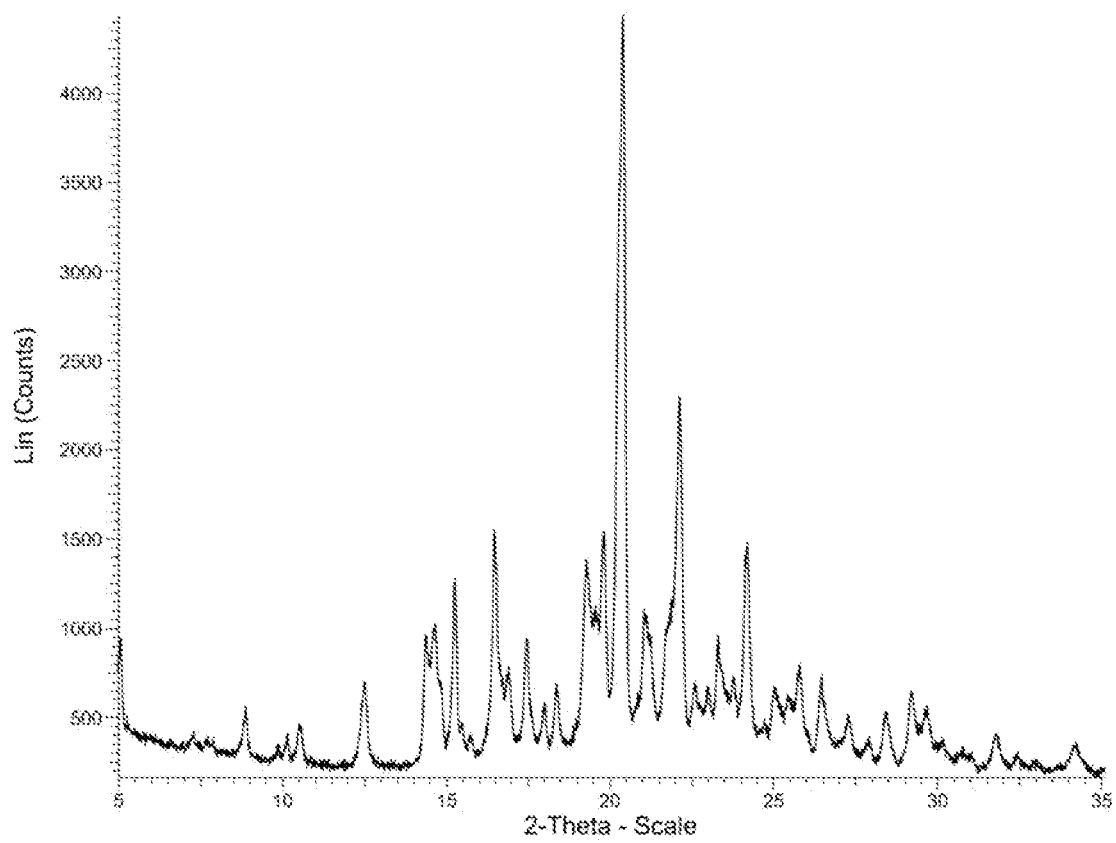
FIG. 26 represents a powder X-ray diffraction spectrum chart of crystal E of mono(4-hydroxybenzoate) of Compound I (vertical axis represents intensity (counts), and horizontal axis represents 2θ (degrees)).

(dd) Has (i) a powder X-ray diffraction spectrum as shown in FIG. 26, (ii) a diffraction angle (2θ) of the powder X-ray diffraction spectrum as shown in FIG. 26, (iii) a powder X-ray diffraction spectrum having a diffraction angle (2θ) substantially the same as the diffraction angle (2θ) shown in Table 16, (iv) a powder X-ray diffraction spectrum having at least one, two, three, four, five, or more than five peaks at a diffraction angle (2θ) selected from substantially the same diffraction angle (2θ) as the diffraction angle (2θ) shown in Table 16, or (v) a powder X-ray diffraction spectrum having at least one, two, three, four, five, or more than five peaks at a diffraction angle (2θ) selected from about 8.9, about 12.5, about 15.3, about 16.5, about 17.5, about 20.4, and about 22.1 degrees.

Figure 27:
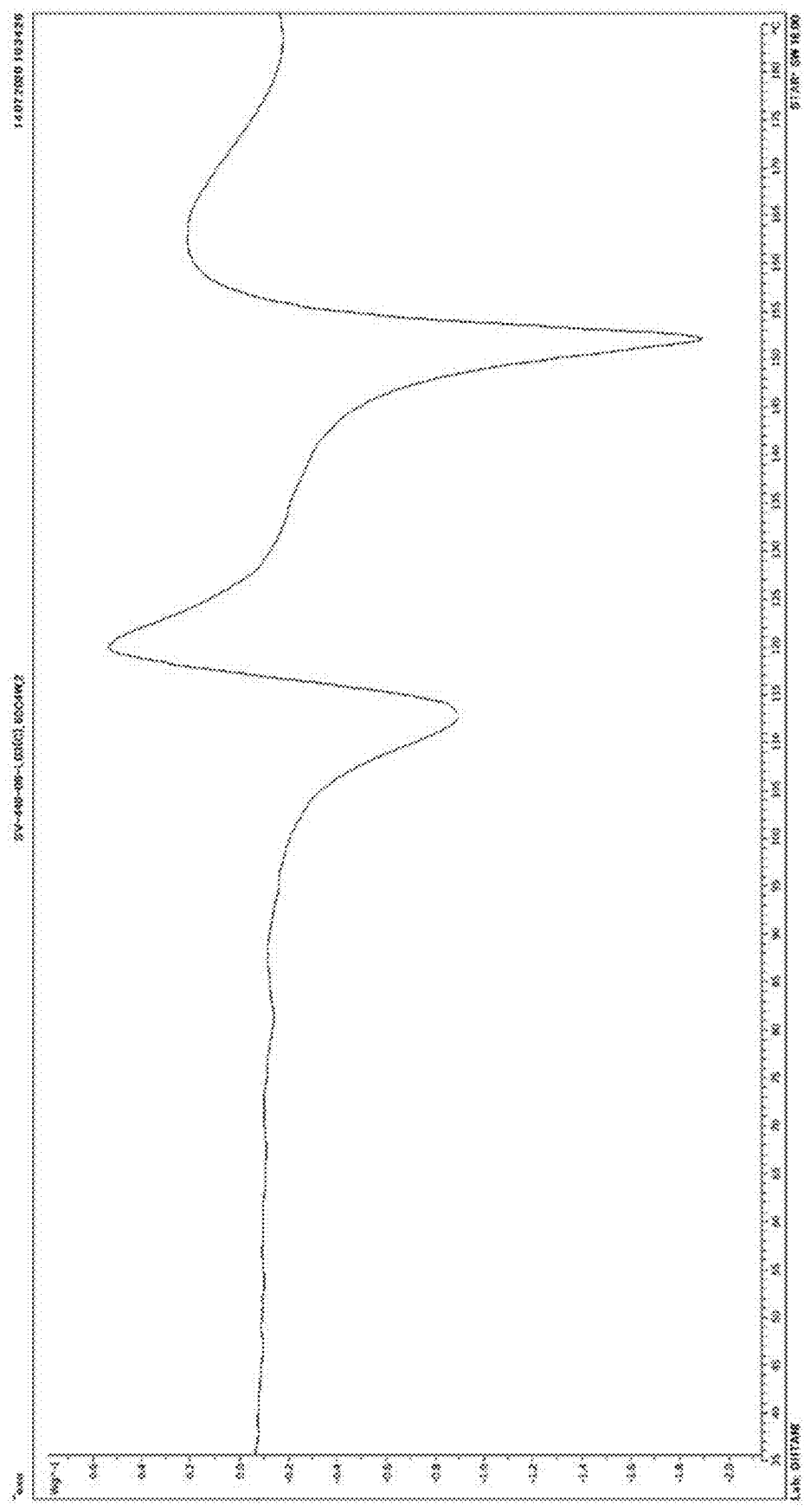
FIG. 27 represents a differential scanning calorimetry (DSC) chart of crystal E of mono(4-hydroxybenzoate) of Compound I (vertical axis represents heat flux (W/g), and horizontal axis represents temperature (° C.)).

(ee) Has a DSC chart shown in FIG. 27, or (i) an endothermic peak with an onset temperature of about 104° C. or a peak temperature of about 113° C., (ii) an endothermic peak with an onset temperature of about 147° C. or a peak temperature of about 153° C. in the DSC and/or (iii) an exothermic peak at an onset temperature of about 117° C. or a peak temperature of about 121° C. in the DSC.

Hydrate of cocrystal of Compound I and 4-hydroxybenzoic acid (crystal I) is characterized by physicochemical data of at least one of the following (ff), (gg), (hh), (kk), (mm), and (nn). Preferably, it is characterized by at least two physicochemical data of the following (ff), (gg), (hh), (kk), (mm), and (nn).

Figure 28:
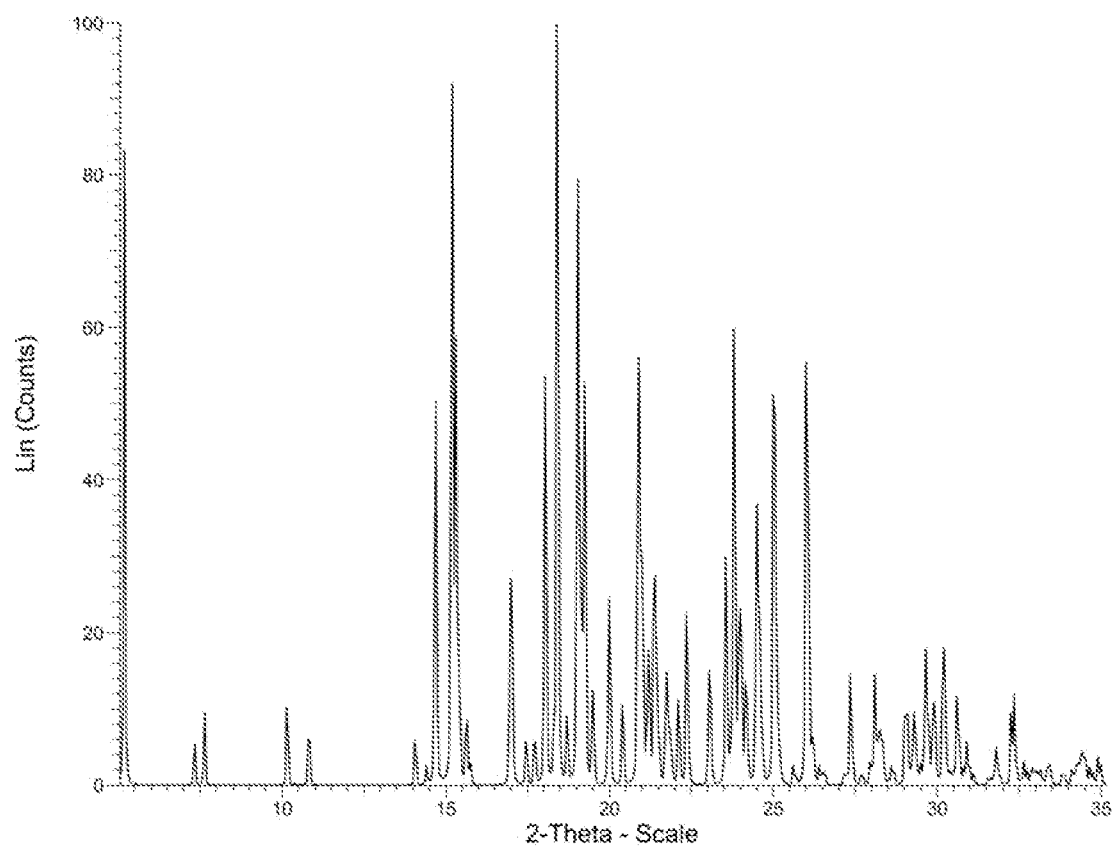
FIG. 28 represents a calculated powder X-ray diffraction spectrum chart (Condition 1) of hydrate of cocrystal of Compound I and 4-hydroxybenzoic acid (crystal I) (vertical axis represents intensity (counts), and horizontal axis represents 2θ (degrees)).

(ff) Has (i) a calculated powder X-ray diffraction spectrum shown in FIG. 28 and (ii) a diffraction angle (2θ) of the calculated powder X-ray diffraction spectrum shown in FIG. 28.

Figure 29:
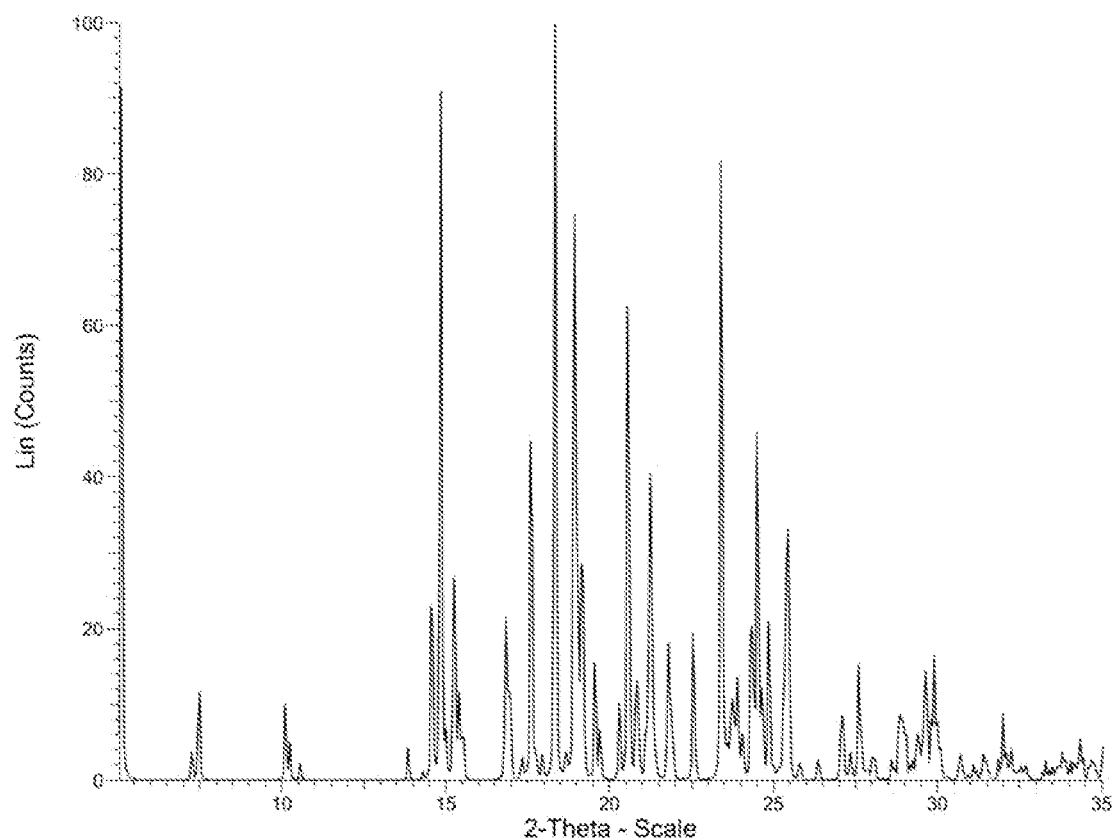
FIG. 29 represents a calculated powder X-ray diffraction spectrum chart (Condition 2) of hydrate of cocrystal of Compound I and 4-hydroxybenzoic acid (crystal I) (vertical axis represents intensity (counts), and horizontal axis represents 2θ (degrees)).

(gg) Has (i) a calculated powder X-ray diffraction spectrum shown in FIG. 29 and (ii) a diffraction angle (2θ) of the calculated powder X-ray diffraction spectrum shown in FIG. 29.

(hh) Has crystallographic data equivalent to the following.
Lattice constant: a=6.1374 (2) Å
b=12.8245 (3) Å
c=17.8596 (5) Å
α=72.297 (2)°
β=85.002 (3)°
γ=79.591 (3)°
V=1316.35 (7) Å³
Space group: P1 (#1)
Factor R: 0.0475
Flack value: −0.04 (7)

(kk) Has crystallographic data equivalent to the following.
Lattice constant: a=6.1599 (2) Å
b=12.9850 (6) Å
c=18.1997 (10) Å
α=71.547 (5)°
β=86.306 (4)°
γ=80.124 (4)°)
V=1360.33 (12) Å3
Space group: P1 (#1)
Factor R: 0.0760
Flack value: 0.09 (14)

(mm) Has positional parameters (partial atomic coordinates) shown in Table 17.

(nn) Has positional parameters (partial atomic coordinates) shown in Table 18.

In the present invention, each crystal form of Compound I is specified by physicochemical data described in the present specification, but each spectral data can slightly vary due to its nature, so it should not be understood exactly. For example, in powder X-ray diffraction spectrum data, due to its nature, diffraction angle (2θ) and overall pattern are important in determination of crystal identity, and relative intensity can slightly vary depending on the direction of crystal growth, particle size, and measurement conditions. Also in DSC data, overall pattern is important in the determination of crystal identity, and it can slightly vary depending on the measurement conditions. Therefore, in the compound of the present invention, a compound having an overall similar pattern to the powder X-ray diffraction spectrum or DSC is included in the compound of the present invention.

In the present specification, the description of the diffraction angle (2θ (degrees)) in the powder X-ray diffraction pattern and the onset temperature (° C.) and the peak temperature (° C.) of the endothermic peak in the DSC analysis means that an error range usually allowed in the data measurement method is included, and means to be approximately the diffraction angle and the onset temperature and the peak temperature of the endothermic peak. For example, the "about" of diffraction angle (2θ (degrees)) in powder X-ray diffraction is +0.2 degrees in one embodiment and +0.1 degrees in yet another embodiment. The "about" of onset temperature (° C.) or peak temperature (° C.) of the endothermic peak in DSC analysis is +2° C. in one embodiment, and +1° C. in yet another embodiment.

In one embodiment of the present invention, each crystal form of Compound I is substantially pure. The reference to "is substantially pure" means that a particular crystal form accounts for at least 50% of Compound I present. Further, in another embodiment, each crystal form accounts for at least 75%, at least 85%, at least 90%, at least 95%, or about 94% to 98% of Compound I present.

In one embodiment of the present invention, the crystal of Compound I is a crystal of a free form of Compound I.

In the present invention, the crystal of a free form is a crystal composed of a single component.

In the present invention, examples of the crystal of hydrate of Compound I and/or the crystal of hydrate of mono(4-hydroxybenzoate) of Compound I include 0.5 hydrate to 5 hydrate. In one embodiment of the present invention, the hydrate is 0.5 hydrate, 1 hydrate, 1.5 hydrate, 2 hydrate, or 2.5 hydrate. In one embodiment of the present invention, the hydrate is 0.5 hydrate to 1.0 hydrate, and in certain embodiments, the hydrate is 0.5, 0.6, 0.7, 0.8, 0.9, or 1 hydrate.

In the present invention, the hydrate is not particularly limited as long as it is a crystal that stably retains a considerable amount of water under environment (temperature, relative humidity, and the like) where a pharmaceutical is usually stored and used. For example, here, the monohydrate is a crystal that stably retains 1 equivalent of water under environment (temperature, relative humidity, and the like) where a pharmaceutical is usually stored and used.

For notation of the compound name, a hyphen (-) between Compound I and 4-hydroxybenzoic acid may be represented by a full-width dash (em Dash) or a double hyphen (--).

In the present invention, the compound of the present invention can be produced, for example, according to the following method, a method equivalent thereto, or a method described in Examples. When recrystallizing, seed crystal may or may not be used.

In the present invention, what is described as a salt may be a cocrystal.

[Toxicity]

The compound of the present invention has sufficiently low toxicity and can be safely used as a pharmaceutical.

[Application to Pharmaceuticals]

The compound of the present invention is suitable for prevention and/or treatment of $S1P_5$-mediated diseases.

The compound of the present invention may be used to prevent and/or treat $S1P_5$-mediated diseases. Examples of such diseases include neurodegenerative disease, autoimmune disease, infection, cancer, and the like.

Examples of the neurodegenerative disease include anxiety-related diseases (for example, social anxiety disorder, anxiety neurosis, obsessive-compulsive disorder, Post-Traumatic Stress Disorder (PTSD), and the like), polyglutamine disease, retinitis pigmentosa, neurosis, convulsion, panic disorder, sleep disorder, depression, reactive depression, epilepsy, Parkinson's disease, parkinsonian syndrome, Down's syndrome, schizophrenia, autonomic ataxia, Huntington's disease, Alzheimer-type dementia, affective disorder (including depressive or bipolar disorder), cognitive impairment, migraine, tension-type headache, cluster headache, dissociative disorder, amyotrophic lateral sclerosis, neuromyelitis optica, optic neuritis, acute disseminated encephalomyelitis, allergic encephalomyelitis, Marchiafava-Bignami disease, Binswanger's disease, progressive multifocal leukoencephalopathy, postinfectious encephalitis, central pontine myelinolysis, adrenoleukodystrophy, multiple system atrophy, Krabbe disease, metachromatic leukodystrophy, Alexander's disease, Canavan disease, Cockayne syndrome, Pelizaeus-Merzbacher disease, Hurler's syndrome, Hunter syndrome, Pompe disease, Fabry disease, Farber disease, GM1 gangliosidosis, Lowe syndrome, spinal cord injury, transverse myelitis, spinocerebellar degeneration, chronic inflammatory demyelinating polyradiculoneuropathy (CIDP), Guillain-Barre syndrome, phenylketonuria, Refsum's disease, Charcot-Marie-Tooth disease, Gaucher's disease, Niemann-Pick disease, Tay-sachs disease, Sandhoff disease, multiple sclerosis, fragile X syndrome, autism, insomnia, nervous cough, psychogenic convulsive seizure, psychogenic syncopal attack, writer's cramp, spasmodic torticollis, neuropathy, neurodegeneration with brain iron accumulation, Lewy body dementia, and the like.

Examples of the autoimmune disease include inflammatory bowel disease, arthritis, lupus, rheumatism, psoriatic arthritis, osteoarthritis, Still's disease, juvenile arthritis, type 1 diabetes mellitus, myasthenia gravis, Hashimoto's thyroiditis, iodine thyroiditis, Basedow's disease, Sjogren's syndrome, Addison disease, opsoclonus-myoclonus syndrome, ankylosing spondylitis, antiphospholipid syndrome, aplastic anemia, autoimmune hepatitis, celiac disease, Goodpasture's syndrome, idiopathic thrombocytopeniarpura, scleroderma, primary biliary cirrhosis, Reiter's disease, Takayasu's arteritis, temporal arteritis, warm autoimmune hemolytic anemia, Wegener's granulomatosis, psoriasis, alopecia universalis, Behcet's disease, chronic fatigue syndrome, autonomic neuropathy, endometriosis, interstitial cystitis, myotonia, vulvodynia, systemic lupus erythematosus, and the like.

Examples of the infection include symptoms which are developed by infection of a normal cell in vivo with one or more kinds of pathogenic microorganisms typified by viruses, bacteria, fungi and the like and proliferation of the pathogenic microorganisms, and the like. The above-described pathogenic microorganisms also includes *Rickettsia*, *Chlamydia*, protozoa, parasites, and the like.

Examples of the viruses which cause infections include human hepatitis viruses (for example, hepatitis B virus, hepatitis C virus, hepatitis A virus and hepatitis E virus, and the like), human retroviruses, human immunodeficiency viruses (for example, HIV1 and HIV2, and the like), human T-cell leukemia viruses or human T-lymphotropic viruses (for example, HTLV1 and HTLV2, and the like), herpes simplex virus type 1 or type 2, Epstein-Barr (EB) virus, cytomegalovirus, varicella-zoster virus, human herpesviruses (for example, human herpesvirus 6 and the like), poliovirus, measles virus, rubella virus, Japanese encephalitis virus, mumps virus, influenza virus, common cold viruses (for example, adenovirus, enterovirus, rhinovirus, and the like), virus which causes severe acute respiratory syndrome (SARS), Ebola virus, West Nile virus, flavivirus, echovirus, Coxsackie virus, coronavirus, respiratory syncytial virus, rotavirus, norovirus, sapovirus, parvovirus, vaccinia virus, HTL virus, dengue virus, papilloma virus, molluscum contagiosum virus, rabies virus, JC virus, arbovirus, encephalitis virus, hantavirus, Ebola virus, and the like.

Examples of the bacteria which cause infection include *Vibrio cholerae, Salmonella enterica, Escherichia coli, Legionella, Bacillus anthracis, Helicobacter pylori, Listeria monocytogenes, Mycobacterium tuberculosis*, nontuberculous mycobacteria, *Staphylococcus, Streptococcus, Streptococcus pneumoniae, Neisseria meningitidis, Klebsiella pneumoniae, Serratia, Corynebacterium diphtheriae, Brucella, Bartonella henselae, Erysipelothrix rhusiopathiae, Actinomyces, Borrelia burgdorferi, Clostridium perfringens, Shigella dysenteriae, Yersinia pestis, Clostridium tetani, Enterobacter*, and the like.

Examples of the fungi which cause infection include *Candida, Aspergillus, Cryptococcus, Blastomyces, Coccidioides, Histoplasma, Paracoccidioides, Sporothrix*, and the like.

Examples of the protozoa which cause infection include *Plasmodium, Toxoplasma gondii*, and the like.

Examples of the parasites which cause infection include *Entamoeba histolytica, Ascaris lumbricoides, Babesia, Cryptosporidium, Giardia lamblia, Ancylostoma, Enterobius vermicularis, Schistosoma, Cestoda, Trichinella spiralis, Trichuris trichiura*, and the like.

Examples of other microorganisms which cause infection include *Mycoplasma, Spirochaeta*, and the like.

The cancer includes all malignant tumors, and examples thereof include cancers associated with cerebral nerve (for example, pediatric brain tumors (e.g., neuroblastoma, medulloblastoma, astrocytoma (juvenile pilocytic astrocytoma), ependymoma, craniopharyngioma, germ cell tumors, optic nerve glioma, choroid plexus papilloma, and pontine glioma), adult brain tumors (e.g., adult astrocytoma, adult malignant astrocytoma, adult glioblastoma, adult ependymoma, adult malignant ependymoma, adult malignant oligodendroglioma, adult medulloblastoma, adult meningioma, and adult malignant meningioma), glioma (e.g., astrocytoma, oligodendroglioma, ependymoma, and brain stem glioma), pituitary adenoma, acoustic schwannoma, retinoblastoma, uveal malignant melanoma, and the like), respiratory tract cancers (for example, pharyngeal cancers (e.g., nasopharyngeal cancer, oropharyngeal cancer, and hypopharyngeal cancer), laryngeal cancer, nasal sinus cancer, lung cancers (e.g., small cell cancer and non-small-cell cancer), thymoma, mesothelioma, and the like), gastrointestinal cancers (for example, esophageal cancer, gastric cancer, duodenal cancer, colorectal cancers (e.g., colon cancer, rectal cancer, and anal cancer), and the like), oral cancers (for example, gingival cancer, tongue cancer, salivary gland cancer, and the like), urinary system cancers (for example, penile cancer, renal pelvis ureter cancer, renal cell cancer, testicular tumor, prostate cancer, bladder cancer, and the like), cancers that affect women (vulvar cancer, uterine cancers (e.g., cervical cancer and endometrial cancer), uterine sarcoma, trophoblastic diseases (e.g., hydatidiform mole, choriocarcinoma, placental-site trophoblastic tumor, and persistent trophoblastic disease), vaginal cancer, breast cancer, breast sarcoma, ovarian cancer, ovarian germ cell tumor, and the like), skin cancers (for example, melanoma (malignant melanoma) (e.g., malignant lentiginous melanoma, superficial spreading melanoma, nodular melanoma, acral lentiginous melanoma, and erosive melanoma), mycosis fungoides, squamous cell carcinoma, basal cell carcinoma, premonitory signs of skin cancer intraepidermal carcinoma (e.g., actinic keratosis. Bowen's disease, and Paget's disease), lymphomatoid papulosis, cutaneous CD30 positive anaplastic large cell lymphoma, Sezary syndrome, cutaneous B-cell lymphoma, and the like), bone and muscle cancers (for example, osteosarcoma, soft tissue sarcoma, rhabdomyosarcoma, synovial sarcoma, liposarcomar, and the like), thyroid cancer, carcinoid, liver cancer (hepatoma), hepatoblastoma, bile duct cancer, gallbladder cancer, pancreatic cancer, pancreatic endocrine tumors (for example, insulinoma, gastrinoma, VIPomar, and the like), carcinoma of unknown primary: hereditary tumors familial tumors (for example, hereditary nonpolyposis colorectal cancer, familial adenomatous polyposis, hereditary breast cancer, ovarian cancer syndrome, Li-Fraumeni syndrome, hereditary melanoma, Wilms' tumor, hereditary papillary renal cell carcinoma, von Hippel-Lindau syndrome, multiple endocrine neoplasiar, and the like), leukemia (for example, acute myeloid leukemia, acute lymphoblastic leukemia, myelodysplastic syndrome, chronic myeloid leukemia•chronic myeloproliferative disorder, adult T-cell leukemia-lymphoma, chronic lymphocytic leukemia, small lymphocytic lymphoma, and the like), multiple myeloma, primary macroglobulinemia, malignant lymphoma (for example, Hodgkin's lymphoma, non-Hodgkin's lymphoma (intermediate- and high-grade lymphomas, Burkitt's lymphoma, lymphoblastic lymphoma, follicular lymphoma, mantle-cell lymphoma, MALT (Mucosa-Associated Lymphoid Tissue) lymphoma, NK (natural killer) cell lymphoma, and the like)), and the like.

The compound of the present invention is preferably suitable for prevention and/or treatment of neurodegenerative diseases.

The compound of the present invention is more preferably suitable for prevention and/or treatment of multiple system atrophy or Parkinson's disease.

The compound of the present invention may be administered as a combined drug, in combination with other drug, for:

1) complementing and/or enhancing the preventive and/or therapeutic effect of the compound,
2) improving dynamics and absorption of the compound, reducing a dose, and/or
3) reducing side effects of the compound.

The combined drug of the compound of the present invention and other drug may be administered in the form of a combined agent containing both components in one preparation or may be administered in the form of separate preparations. When administered as separate preparations, simultaneous administration and staggered administration are included. Further, for staggered administration, the compound of the present invention may be administered first and other drug may be administered later, or other drug may be administered first and the compound of the present invention may be administered later. Each administration method may be the same or different.

The disease on which a preventive and/or therapeutic effect is exerted by the combined drug is not particularly limited, and any disease that complements and/or enhances the preventive and/or therapeutic effect of the compound of the present invention may be used.

In addition, the combined drug to be combined with the compound of the present invention includes not only those found so far but also those found in the future.

Examples of the other drug for complementing and/or enhancing the preventive and/or therapeutic effect of the compound of the present invention on neurodegenerative disease include acetylcholinesterase inhibitors, nicotinic receptor modulators, suppressors of production, secretion, accumulation, agglutination and/or deposition of β amyloid protein (for example, a β secretase inhibitor, a γ secretase inhibitor, a drug having β amyloid protein agglutination inhibitory action, a β amyloid vaccine, a β amyloid degrading enzyme, and the like), activators of brain function (for example, an activator of brain metabolism, a cerebral circulation improving drug, and the like), dopamine receptor agonists (dopamine receptor stimulants), dopamine release accelerating drugs (dopamine secretion accelerating drugs or dopamine release accelerating drugs), dopamine uptake inhibitors, dopamine agonists, dopamine antagonists, lithium carbonate, serotonergic agonists, serotonin antagonists (for example, a 5-HT$_{2A}$ antagonist, a 5-HT$_3$ antagonist, a 5-HT$_4$ antagonist, a 5-HT$_7$ antagonist, and the like), monoamine oxidase (MAO) inhibitors, aromatic L-amino acid decarboxylase inhibitors (DCI), norepinephrine (noradrenaline) supplements, anticholinergic drugs, catechol-O-methyltransferase (COMT) inhibitors, therapeutic drugs for amyotrophic lateral sclerosis, therapeutic drugs for hyperlipidemia, apoptosis inhibitors, nerve regeneration differentiation accelerating drugs, antihypertensive drugs, therapeutic drugs for diabetes, therapeutic drugs for diabetic complication, antidepressants (for example, a tricyclic antidepressant, a tetracyclic antidepressant, and the like), anti-anxiety drugs, antiepileptic drugs, anticonvulsant drugs, antispasmodic drugs, nonsteroidal anti-inflammatory drugs, anti-cytokine drugs (for example, a TNF inhibitor, an MAP kinase inhibitor, and the like), steroids, sex hormones or derivatives thereof (for example, progesterone, estradiol, estradiol benzoate, and the like), thyroid hormones, parathyroid hormones (for example, PTH and the like), calcium channel blockers (calcium antagonists), calcium receptor antagonists, opioid receptor agonists, N-methyl-D-2-amino-5-D-aspartate (NMDA) receptor antagonists, VR-1 receptor agonists, neuromuscular junction blocking drugs, cannabinoid-2 receptor agonists, GABAA receptor modulators (for example, a GABAA receptor agonist and the like), GABAB receptor modulators, prostaglandins, cholecystokinin antagonists, nitric oxide synthase (NOS) inhibitors, local anesthetics, neurotrophic factors (for example, neurotrophin, TGF-β superfamily, a neurokine family, a growth factor, and the like), sympathomimetic drugs, parasympathomimetic drugs, sympatholytic drugs, prostaglandin receptor antagonists, prostaglandin receptor agonists, carbonic anhydrase inhibitors, hyperosmotic drugs, vasodilator drugs, metabolic activators, diuretic drugs (for example, a thiazide diuretic drug, a loop diuretic drug, a potassium-sparing diuretic drug, and the like), peripheral blood flow improving drugs, immunosuppressive drugs (for example, dimethyl fumarate, glatiramer acetate, interferon beta-1a, interferon beta-1b, fingolimod), immunoglobulins, α-amino-3-hydroxy-5-methyl-4-isoxazolepropionic acid (AMPA)/kainic acid receptor antagonists, Rho-kinase inhibitors, vitamins (for example, vitamin B6, vitamin B12, and the like), cyclooxygenase (COX)-2 inhibitors, anti-dizziness drugs, therapeutic drugs for anemia, therapeutic drugs for heavy metal poisoning, muscarinic receptor agonists, aldose reductase inhibitors, nerve regeneration accelerating drugs, protein kinase C (PKC) inhibitors, advanced glycation end product (AGE) inhibitors, reactive oxygen species scavengers, muscle relaxants and the like.

The dose of the other drug can be appropriately selected on the basis of a clinically used dose. In addition, the compounded ratio of Compound I and the other agent can be appropriately selected according to the age and body weight of the subject of administration, the method for administration, the duration of administration, the target disease, the symptom, the combination, and the like. For example, 0.01 to 100 parts by mass of other agent may be used with respect to 1 part by mass of Compound I. Any two or more of the other agents may be administered in combination at an appropriate ratio.

In order to use the compound of the present invention or the combined agent of the compound of the present invention and other agent for the above purpose, it is usually formulated as an appropriate pharmaceutical composition together with a pharmaceutically acceptable carrier, and then administered systemically or topically in an oral or parenteral form.

The compound of the present invention is administered to a mammal (preferably human, more preferably patient) in a pharmaceutically effective amount.

A dose of the compound of the present invention varies depending on an age, a weight, symptom, a therapeutic effect, an administration method, a treatment time, and the like. However, the compound of the present invention or a concomitant drug of the compound of the present invention and another drug is administered orally, usually, in a range of 1 ng to 1000 mg per once per adult, once to several times a day, or is administered parenterally, in a range of 0.1 ng to 10 mg per once per adult, once to several times a day, or continuously administered intravenously, in a range of 1 to 24 hours a day. As described above, since the dose varies depending on various conditions, a dose smaller than the above dose may be sufficient, or administration beyond the range may be necessary.

When the compound of the present invention or a combined agent of the compound of the present invention and other agent is administered, it is used as an internal solid preparation or an internal liquid preparation for oral administration, a sustained release preparation or a controlled release preparation for oral administration, an injection, an external preparation, an inhalant or a suppository for parenteral administration, or the like.

The compound of the present invention is used as a drug substance of the above pharmaceuticals.

The present disclosure provides, for example, the following embodiments.

[1] A salt of 1-[[(3S)-3-methyl-6-(4,4,4-trifluorobutoxy)-3,4-dihydronaphthalen-2-yl]methyl]azetidine-3-carboxylic acid;

[2] the compound according to [1] above, wherein the salt is mono(4-hydroxybenzoate);

[3] the compound according to [2] above, which is in crystal form;

[4] the crystal according to [3] above, having, in a powder X-ray diffraction spectrum, at least two or more diffraction peaks at diffraction angles (2θ) selected from about 5.4, about 6.9, about 12.8, about 13.9, about 18.1, about 19.4, about 19.8, about 20.9, and about 24.7 degrees;

[5] the crystal according to [3] or [4] above, having, in a powder X-ray diffraction spectrum, diffraction peaks at diffraction angles (2θ) of at least about 6.9, about 12.8, about 13.9, and about 24.7 degrees;

[6] the crystal according to any one of [3] to [5] above, having, in a powder X-ray diffraction spectrum, diffraction peaks at diffraction angles (2θ) of at least about 5.4, about 6.9, about 13.9, about 18.1, about 19.4, about 19.8, about 20.9, and about 24.7 degrees;

[7] the crystal according to any one of [4] to [6] above, having, in a powder X-ray diffraction spectrum, no diffraction peak at diffraction angles (2θ) of about 11.3 and about 14.4 degrees;

[8] the crystal according to any one of [4] to [7] above, having, in a powder X-ray diffraction spectrum, no diffraction peak at diffraction angles (2θ) of about 7.5, about 8.1, and about 8.9 degrees;

[9] the crystal according to any one of [3] to [8] above, having, in a powder X-ray diffraction spectrum, diffraction peaks at diffraction angles (2θ) of about 5.4, about 6.9, about 10.3, about 12.8, about 13.9, about 15.0, about 15.3, about 15.9, about 16.6, about 16.8, about 18.1, about 19.4, about 19.8, about 20.9, about 21.8, about 22.7, about 23.6, about 24.7, about 25.4, about 25.8, about 26.3, about 26.7, about 27.6, about 27.8, about 30.3, about 33.4, and about 34.2 degrees;

[10] the crystal according to any one of [3] to [9] above, characterized by a powder X-ray diffraction spectrum chart shown in FIG. 7;

[11] the crystal according to any one of [3] to [10] above, having an endothermic peak with an onset temperature of about 150° C. or a peak temperature of about 153° C. in differential scanning calorimetry;

[12] the crystal according to any one of [3] to [11] above, characterized by a differential scanning calorimetry chart shown in FIG. 8;

[13] the crystal according to [3] above, having, in a powder X-ray diffraction spectrum, a diffraction peak at a diffraction angle (2θ) of at least about 11.3 degrees;

[14] the crystal according to [3] above, having, in a powder X-ray diffraction spectrum, at least two or more diffraction peaks at diffraction angles (2θ) selected from about 5.6, about 11.3, about 13.2, about 15.9, about 16.9, about 18.8, about 22.7, and about 24.2 degrees;

[15] the crystal according to any one of [3], [13] or [14] above, having, in a powder X-ray diffraction spectrum, diffraction peaks at diffraction angles (2θ) of at least about 5.6, about 11.3, about 13.2, about 15.9, about 16.9, about 18.8, about 22.7, and about 24.2 degrees;

[16] the crystal according to any one of [3] or [13] to [15] above, having, in a powder X-ray diffraction spectrum, diffraction peaks at diffraction angles (2θ) of about 5.6, about 7.0, about 7.9, about 11.3, about 12.3, about 13.2, about 13.9, about 15.9, about 16.9, about 17.4, about 17.9, about 18.4, about 18.8, about 19.4, about 19.9, about 20.4, about 21.0, about 21.2, about 21.9, about 22.7, about 23.2, about 23.4, about 24.2, about 25.2, about 26.5, about 27.5, about 29.1, about 29.8, about 30.5, and about 34.1 degrees;

[17] the crystal according to any one of [3] or [13] to [16] above, characterized by a powder X-ray diffraction spectrum chart shown in FIG. 9;

[18] the crystal according to any one of [3] or [13] to [17] above, having an endothermic peak with an onset temperature of about 154° C. or a peak temperature of about 158° C. in differential scanning calorimetry;

[19] the crystal according to any one of [3] or [13] to [18] above, characterized by a differential scanning calorimetry chart shown in FIG. 10;

[20] the compound according to [1] above, wherein the salt is a mono-tryptophan salt;

[21] the compound according to [20] above, which is in crystal form;

[22] the crystal according to [21] above, having, in a powder X-ray diffraction spectrum, at least two or more diffraction peaks at diffraction angles (2θ) selected from about 8.0, about 9.7, about 16.0, about 17.0, about 18.9, about 19.1, about 22.2, and about 24.6 degrees;

[23] the crystal according to [21] or [22] above, having, in a powder X-ray diffraction spectrum, diffraction peaks at diffraction angles (2θ) of at least about 8.0, about 9.7, about 16.0, about 17.0, about 18.9, about 19.1, about 22.2, and about 24.6 degrees;

[24] the crystal according to any one of [21] to [23] above, having, in a powder X-ray diffraction spectrum, diffraction peaks at diffraction angles (2θ) of about 8.0, about 9.7, about 12.8, about 15.6, about 16.0, about 16.6, about 17.0, about 17.3, about 17.6, about 18.2, about 18.6, about 18.9, about 19.1, about 19.6, about 20.9, about 21.3, about 21.7, about 21.9, about 22.2, about 22.6, about 23.4, about 23.8, about 24.6, about 25.3, about 25.7, about 26.2, about 26.6, about 27.1, about 27.4, about 27.9, about 28.2, about 28.7, about 29.1, about 29.9, about 30.2, about 30.9, about 32.0, about 32.2, about 32.5, about 33.1, about 34.1, about 34.5, and about 34.8 degrees;

[25] the crystal according to any one of [21] to [24] above, characterized by a powder X-ray diffraction spectrum chart shown in FIG. 15;

[26] the crystal according to any one of [21] to [25] above, having an endothermic peak with an onset temperature of about 178° C. or a peak temperature of about 183° C. in differential scanning calorimetry;

[27] the crystal according to any one of [21] to [26] above, having an exothermic peak with an onset temperature of about 185° C. or a peak temperature of about 187° C. in differential scanning calorimetry;

[28] the crystal according to any one of [21] to [27] above, characterized by a differential scanning calorimetry chart shown in FIG. 16;

[29] the compound according to [1] above, wherein the salt is a hemisuccinate;

[30] the compound according to [29] above, which is in crystal form;

[31] the crystal according to [30] above, having, in a powder X-ray diffraction spectrum, at least two or more diffraction peaks at diffraction angles (2θ) selected from about 6.4, about 6.9, about 12.9, about 13.8, about 17.2, about 18.1, about 19.3, about 23.9, and about 24.3 degrees;

[32] the crystal according to [30] or [31] above, having, in a powder X-ray diffraction spectrum, diffraction peaks at diffraction angles (2θ) of at least about 6.4, about 6.9, about 12.9, about 13.8, about 17.2, about 18.1, about 19.3, about 23.9, and about 24.3 degrees;

[33] the crystal according to any one of [30] to [32] above, having, in a powder X-ray diffraction spectrum, diffraction peaks at diffraction angles (2θ) of about 6.1, about 6.4, about 6.9, about 12.9, about 13.8, about 16.6, about 17.2, about 18.1, about 18.3, about 18.7, about 19.3, about 19.9, about 20.5, about 20.7, about 21.0, about 21.4, about 21.9, about 22.1, about 22.7, about 23.0, about 23.6, about 23.9, about 24.3, about 24.6, about 25.2, about 25.8, about 26.0, about 27.4, about 27.5, about 27.8, about 28.7, about 29.5, about 30.2, about 30.5, about 30.8, about 31.3, about 31.7, about 32.3, about 32.5, about 33.8, about 34.1, about 34.5, and about 34.9 degrees;

[34] the crystal according to any one of [30] to [33] above, characterized by a powder X-ray diffraction spectrum chart shown in FIG. 17;

[35] the crystal according to any one of [30] to [34] above, having an endothermic peak with an onset temperature of about 111° C. or a peak temperature of about 114° C. in differential scanning calorimetry;

[36] the crystal according to any one of [30] to [35] above, having an endothermic peak with an onset temperature of about 137° C. or a peak temperature of about 140° C. in differential scanning calorimetry;

[37] the crystal according to any one of [30] to [36] above, characterized by a differential scanning calorimetry chart shown in FIG. 18;

[38] a crystal of 1-[[(3S)-3-methyl-6-(4,4,4-trifluorobutoxy)-3,4-dihydronaphthalen-2-yl]methyl]azetidine-3-carboxylic acid,

[39] the crystal according to [38] above, having, in a powder X-ray diffraction spectrum, at least two or more diffraction peaks at diffraction angles (2θ) selected from about 6.5, about 7.8, about 8.6, about 11.6, about 15.2, about 17.0, about 18.8, about 21.1, about 22.8, about 23.3, and about 24.9 degrees;

[40] the crystal according to [38] or [39] above, having, in a powder X-ray diffraction spectrum, diffraction peaks at diffraction angles (2θ) of at least about 6.5, about 7.8, about 8.6, and about 11.6 degrees;

[41] the crystal according to any one of [38] to [40] above, having, in a powder X-ray diffraction spectrum, diffraction peaks at diffraction angles (2θ) of at least about 11.6, about 15.2, about 17.0, about 18.8, about 21.1, about 22.8, about 23.3, and about 24.9 degrees;

[42] the crystal according to any one of [39] to [41] above, having, in a powder X-ray diffraction spectrum, no diffraction peak at diffraction angles (2θ) of about 5.8 degrees and about 19.9 degrees;

[43] the crystal according to any one of [38] to [42] above, having, in a powder X-ray diffraction spectrum, diffraction peaks at diffraction angles (2θ) of about 6.5, about 7.8, about 8.6, about 11.6, about 13.0, about 13.1, about 15.2, about 15.8, about 17.0, about 17.3, about 18.8, about 18.9, about 19.3, about 20.9, about 21.1, about 21.3, about 22.8, about 23.3, about 23.6, about 23.8, about 24.0, about 24.9, about 25.8, about 26.4, about 27.1, about 27.9, about 29.8, about 30.4, about 30.7, about 31.6, about 32.0, and about 34.0 degrees;

[44] the crystal according to any one of [38] to [43] above, characterized by a powder X-ray diffraction spectrum chart shown in FIG. 1;

[45] the crystal according to any one of [38] to [44] above, having an endothermic peak with an onset temperature of about 128° C. or a peak temperature of about 133° C. in differential scanning calorimetry;

[46] the crystal according to any one of [38] to [45] above, characterized by a differential scanning calorimetry chart shown in FIG. 2;

[47] a pharmaceutical composition containing the compound according to any one of [1] to [46] above and a pharmaceutically acceptable carrier;

[48] the pharmaceutical composition according to [47] above, which is a preventive and/or therapeutic agent for a $S1P_5$-mediated disease;

[49] the pharmaceutical composition according to [48] above, wherein the $S1P_5$-mediated disease is a neurodegenerative disease;

[50] the pharmaceutical composition according to [49] above, wherein the neurodegenerative disease is multiple system atrophy or Parkinson's disease;

[51] a preventive and/or therapeutic agent for a $S1P_5$-mediated disease, containing the compound according to any one of [1] to [46] above;

[52] a method for preventing and/or treating a $S1P_5$-mediated disease, comprising administering an effective amount of the compound according to any one of [1] to [46] above to a mammal;

[53] a compound according to any one of [1] to [46] above for use in prevention and/or treatment of $S1P_5$-mediated diseases; and

[54] use of the compound according to any one of [1] to [46] above for producing a preventive and/or therapeutic agent for a $S1P_5$-mediated disease.

EXAMPLES

Hereinafter, the present invention will be described in detail with reference to Examples, but the present invention is not limited thereto.

Solvents in parentheses shown in chromatographic separation part and TLC indicate used elution solvents or development solvents, and the proportion represents a volume ratio.

A solvent in parentheses shown in NMR part indicates a solvent used in measurement.

Compound names used in the present specification are generally given using a computer program ACD/Name (registered trademark) of Advanced Chemistry Development, Lexichem Toolkit 1.4.2 of OpenEye Scientific Software, or ChemDraw (registered trademark) Ultra of PerkinElmer, which performs naming according to the IUPAC rules, or named according to the IUPAC nomenclature.

LCMS was carried out using Waters i-class system under the following conditions.
  Column: YMC Triart $C_{18}$ 2.0 mm×30 mm, 1.9 μm;
  Flow rate: 1.0 mL/min;
  Temperature: 30° C.;
  Mobile phase A: 0.1% trifluoroacetic acid (TFA) aqueous solution;
  Mobile phase B: 0.10% TFA acetonitrile solution:
  Gradient (the ratio of the mobile phase (A) and the mobile phase (B) is described):
    0 to 0.10 minutes: (95%:5%); 0.10 to 1.20 minutes: from (95%:5%) to (5%:95%); 1.20 to 1.50 minutes: (5%:95%).

Powder X-ray diffraction spectrum was measured under any of the following conditions.
Condition 1
  Device: SmartLab manufactured by Rigaku Corporation
  Target: Cu
  Voltage: 45 kV
  Current: 200 mA
  Scanning speed: 30 degree/min
Condition 2
  Device: SmartLab manufactured by Rigaku Corporation
  Target: Cu
  Voltage: 45 kV
  Current: 200 mA
  Scanning speed: 10 degree/min Differential scanning calorimetry (DSC) was performed under any of the following conditions.
Condition 1
  Device: Discovery DSC manufactured by TA Instruments
  Sample cell: aluminum pan
  Nitrogen gas flow rate: 40 mL/min
Condition 2
  Device: TGA/DSC 3+ manufactured by Mettler Toledo
  Sample cell: aluminum pan
  Nitrogen gas flow rate: 40 mL/min
Condition 3
  Device: DSC822e manufactured by Mettler Toledo
  Sample cell: aluminum pan
  Nitrogen gas flow rate: 40 mL/min Single crystal X-ray diffraction was measured under the following conditions.
Condition 1
Device: SuperNova manufactured by Rigaku Corporation
Target: CuKα (λ=1.54184 A)
Voltage: 50 kV
Current: 0.8 mA
Scan width: 1°
Temperature: 100 K
Condition 2
Device: SuperNova manufactured by Rigaku Corporation
Target: CuKα (λ=1.54184 A)
Voltage: 50 kV
Current: 0.8 mA
Scan width: 1°
Temperature: 297 K Example 1: 6-Methoxy-3-methyl-3,4-dihydronaphthalene-2-carbaldehyde To a solution of 6-methoxy-3-methyl-3,4-dihydronaphthalen-1(2H)-one (CAS registry number: 5563-21-3) (1 g) in methanol (100 mL), sodium borohydride (398 mg) was added at 0° C. The reaction solution was heated to room temperature and stirred for 2 hours, then an aqueous ammonium chloride solution was added thereto, and the mixture was extracted with ethyl acetate. The organic layer was washed with saturated saline, and dried over anhydrous sodium sulfate, and then the solvent was distilled off. The obtained residue was roughly purified by silica gel column chromatography (hexane:ethyl acetate=10:1), and used as it was for the next reaction. Phosphorus oxychloride (2.2 g) was added to an N,N-dimethylformamide (DMF) (100 mL) solution of the obtained crude purified product. The reaction solution was heated to 60° C. and stirred for 8 hours. Thereafter, the reaction solution was poured into ice water and stirred for 5 minutes, and then the organic layer was separated. The organic layer was washed with saturated saline and dried over anhydrous sodium sulfate, and the solvent was distilled off. The obtained residue was purified by silica gel column chromatography (hexane:ethyl acetate=10:1→5:1) to obtain a title compound (299 mg) having the following physical property values.
$^1$H-NMR (CDCl$_3$): δ 9.57, 7.30-7.24, 6.82-6.78, 3.85, 3.08, 2.65, 0.92.

Example 2: 6-Hydroxy-3-methyl-3,4-dihydronaphthalene-2-carbaldehyde

To a solution of the compound (299 mg) produced in Example 1 in dichloromethane (DCM) (100 mL), boron tribromide (815 mg) was added dropwise at 0° C. After stirring the mixture at 0° C. for 3 hours, the reaction solution was poured into ice water and stirred for 5 minutes, and then the organic layer was separated. The organic layer was washed with saturated saline and dried over anhydrous sodium sulfate, and the solvent was distilled off. The obtained residue was purified by silica gel column chromatography (hexane:ethyl acetate=5:1) to obtain a title compound (200 mg) having the following physical property values.
$^1$H-NMR (CDCl$_3$): δ 9.57, 7.18, 6.72, 3.08, 2.60, 0.94.

Example 3: (R)-6-Hydroxy-3-methyl-3,4-dihydronaphthalene-2-carbaldehyde

The compound produced in Example 2 was subjected to optical resolution using HPLC (column used: Daicel Corporation CHIRALCEL OJ-H (4.6 mm I.D.×250 mmL), mobile phase: normal hexane:2-propanol=80:20, flow rate: 1 mL/min, temperature: 40° C., wavelength: 245 nm), whereby the title compound was obtained in the first peak (retention time: about 6.9 minutes).

Example 3(1): (S)-6-Hydroxy-3-methyl-3,4-dihydronaphthalene-2-carbaldehyde

By the optical resolution in Example 3, the title compound was obtained in the second peak (retention time: about 8.1 minutes).

Example 4: (S)-Methyl 1-((6-hydroxy-3-methyl-3,4-dihydronaphthalen-2-yl)methyl)azetidine-3-carboxylate To a solution of the compound (5.00 g) produced in Example 3(1) in DCM (265 mL), methyl azetidine-3-carboxylate hydrochloride (5.24 g) (CAS registry number: 100202-39-9) and diisopropylethylamine (6.00 mL) were added, and the mixture was stirred at room temperature for 30 minutes. After ice cooling, sodium triacetoxyborohydride (7.32 g) was added to the reaction liquid, and the mixture was stirred at room temperature for 16 hours. The reaction liquid was concentrated under reduced pressure, and the obtained residue was purified by silica gel column chromatography (Amino silica gel, hexane:ethyl acetate=50:50→0:100) to obtain a title compound (6.00 g) having the following physical property values.
$^1$H-NMR (CDCl$_3$): δ 6.88, 6.63-6.56, 6.21, 3.71, 3.64-3.51, 3.42-3.22, 3.03, 2.94, 2.49, 2.37, 0.92;
LCMS: retention time 0.61 min.

Example 5: Methyl 1-[[(3S)-3-methyl-6-(4,4,4-trifluorobutoxy)-3,4-dihydronaphthalen-2-yl]methyl]azetidine-3-carboxylate To a tetrahydrofuran (THF) (5.0 mL) solution of the compound (511 mg) produced in Example 4, a toluene solution (0.97 mL) of 4,4,4-trifluorobutanol (273 mg), triphenylphosphine (559 mg) and 2.2 mol/L diethyl azodicarboxylate was added, and the mixture was stirred at room temperature for 16 hours. The reaction liquid was concentrated, and the obtained residue was purified by silica gel column chromatography (Amino silica gel, hexane:ethyl acetate=90:10→80:20) to obtain a title compound (312 mg) having the following physical property values.
$^1$H-NMR (CDCl$_3$): δ 6.93, 6.69-6.61, 6.22, 3.99, 3.71, 3.65-3.50, 3.42-3.21, 3.02, 2.96, 2.52, 2.44-2.21, 2.10-1.96, 0.92;
LCMS: retention time 0.90 min.

Example 6: 1-[[(3S)-3-Methyl-6-(4,4,4-trifluorobutoxy)-3,4-dihydronaphthalen-2-yl]methyl]azetidine-3-carboxylic acid

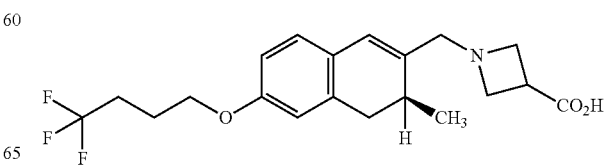

A 2 N aqueous sodium hydroxide solution (4.5 mL) was added to a methanol (3.0 mL) solution of the compound (1.20 g) produced in Example 5, and the reaction liquid was stirred at room temperature for 16 hours. A 1 N aqueous hydrochloric acid solution (9.0 mL) was added thereto, and the mixture was concentrated under reduced pressure, then the obtained residue was purified by silica gel column chromatography (Diol silica gel, DCM:MeOH=10:0→5:5), and further purified by silica gel column chromatography (ODS, H$_2$O:CH$_3$CN=10:0→50:50) to obtain a title compound (846 mg) having the following physical property values.

$^1$H-NMR (DMSO-d$_6$): δ 6.95, 6.71, 6.68, 6.20, 3.98, 3.46-3.36, 3.24-3.12, 2.96, 2.82, 2.49, 2.39, 2.31, 1.89, 0.83;

LCMS: retention time 0.85 min.

Incidentally, Example 6 of the present invention is the same compound as Example 15 (34) of Patent Literature 3, and the compound of Example 6 of the present invention obtained by the method described in Patent Literature 3 or the method described in Examples 1 to 6 of the present invention is amorphous.

Example 7: Crystal of 1-[[(3S)-3-methyl-6-(4,4,4-trifluorobutoxy)-3,4-dihydronaphthalen-2-yl]methyl] azetidine-3-carboxylic acid (Crystal D)

The compound (250 mg) produced in Example 6 was dissolved by adding methanol at room temperature, and the volume was adjusted to a constant volume of 5 mL. 200 μL of this solution was dispensed into a test tube, and concentrated under reduced pressure at 35° C., then acetone (50 μL) was added thereto, and the mixture was stirred at room temperature for 2 weeks. A precipitate in the test tube was dried under reduced pressure at room temperature for 1 hour to obtain the title compound as a crystalline white solid having the following physical property values.

Diffraction Angle (2θ) (Degree)

A powder X-ray diffraction spectrum chart and a DSC chart of the crystal measured under the following conditions are shown in FIG. 1 and FIG. 2, respectively.

(1) Powder X-Ray Diffraction Spectrum

Measurement condition: Condition 1

Results of diffraction angles (2θ) (degree) and relative intensities (%) obtained by a powder X-ray diffraction spectrum method using Cu—Kα rays are shown in Table 1.

TABLE 1

| Diffraction angle (2θ) (degree) | Relative intensity (%) |
|---|---|
| 6.5 | 8 |
| 7.8 | 5 |
| 8.6 | 9 |
| 11.6 | 27 |
| 13.0 | 8 |
| 13.1 | 7 |
| 15.2 | 31 |
| 15.8 | 5 |
| 17.0 | 31 |
| 17.3 | 21 |
| 18.8 | 39 |
| 18.9 | 30 |
| 19.3 | 12 |
| 20.9 | 9 |
| 21.1 | 31 |
| 21.3 | 16 |
| 22.8 | 47 |
| 23.3 | 100 |
| 23.6 | 13 |
| 23.8 | 15 |

TABLE 1-continued

| Diffraction angle (2θ) (degree) | Relative intensity (%) |
|---|---|
| 24.0 | 9 |
| 24.9 | 36 |
| 25.8 | 5 |
| 26.4 | 15 |
| 27.1 | 5 |
| 27.9 | 3 |
| 29.8 | 9 |
| 30.4 | 4 |
| 30.7 | 7 |
| 31.6 | 6 |
| 32.0 | 4 |
| 34.0 | 6 |

(2) Differential Scanning Calorimetry (DSC)

Measurement condition: Condition 1

Sample amount: 1.2 mg

Heating rate: 10° C./min (20 to 180° C.)

Endothermic peak: onset temperature of about 128° C., peak temperature of about 133° C.

Example 8: Crystal of hydrate of 1-[[(3S)-3-methyl-6-(4,4,4-trifluorobutoxy)-3,4-dihydronaphthalen-2-yl]methyl]azetidine-3-carboxylic acid (Crystal B)

The compound (250 mg) produced in Example 6 was dissolved by adding methanol at room temperature, and the volume was adjusted to a constant volume of 5 mL. 200 μL of this solution was dispensed into a test tube, and concentrated under reduced pressure at 35° C., then a 97% acetone aqueous solution (20 μL) was added thereto, and the mixture was stirred at room temperature for 1 day. A precipitate in the test tube was dried under reduced pressure at room temperature for 1 hour to obtain the title compound as a crystalline white solid having the following physical property values.

Figure 21:
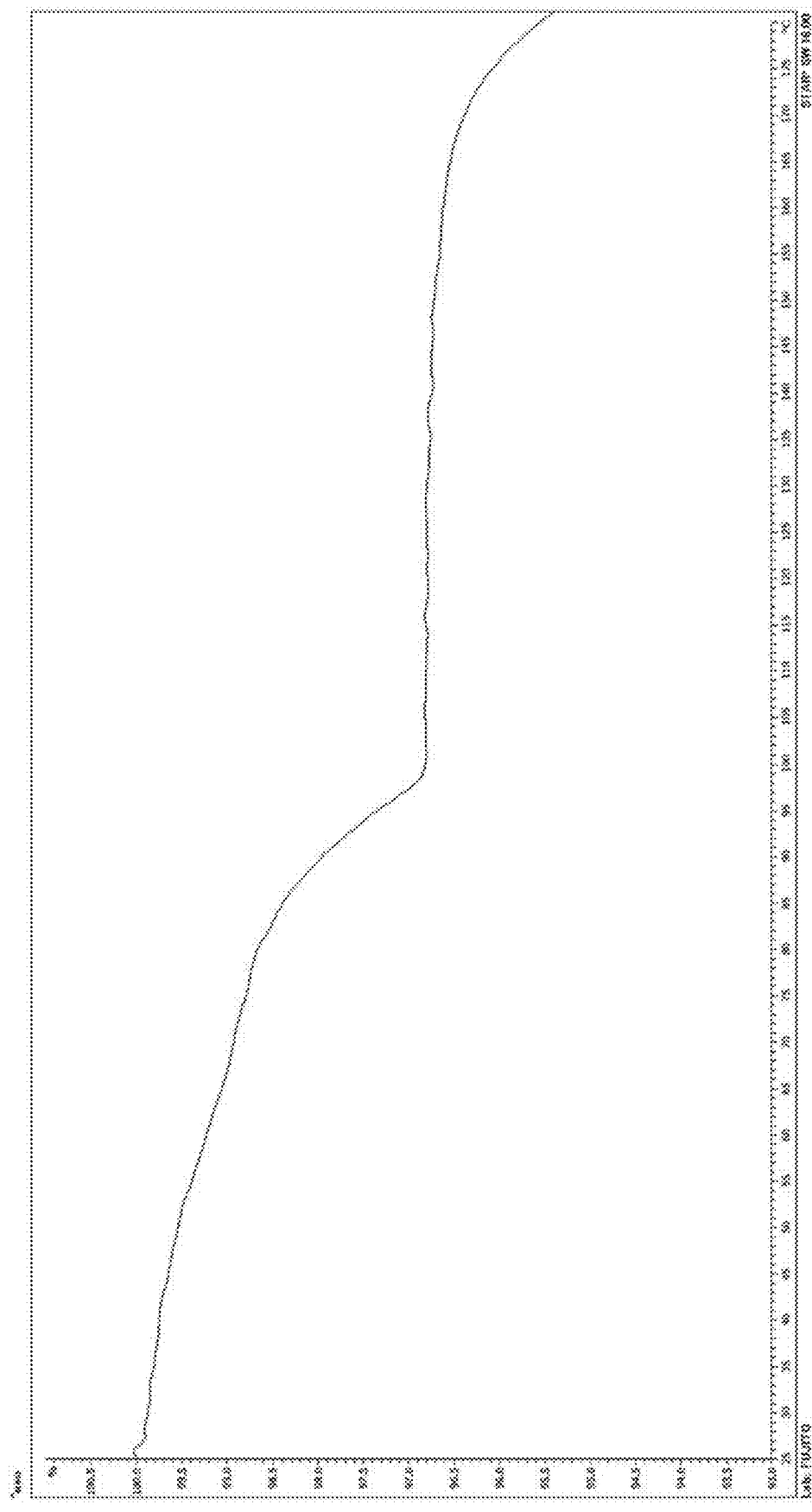
FIG. 21 represents a thermogravimetric (TG) chart of crystal B of hydrate of Compound I (vertical axis represents weight (%), and horizontal axis represents temperature (° C.)).

A powder X-ray diffraction spectrum chart, a DSC chart, and a thermogravimetric (TG) chart of the crystal measured under the following conditions are shown in FIG. 3, FIG. 4, and FIG. 21, respectively.

(1) Powder X-Ray Diffraction Spectrum

Measurement condition: Condition 1

Results of diffraction angles (2θ) (degree) and relative intensities (%) obtained by a powder X-ray diffraction spectrum method using Cu—Kα rays are shown in Table 2.

TABLE 2

| Diffraction angle (2θ) (degree) | Relative intensity (%) |
|---|---|
| 10.3 | 76 |
| 10.7 | 10 |
| 11.9 | 8 |
| 13.0 | 21 |
| 13.6 | 41 |
| 14.9 | 63 |
| 15.3 | 21 |
| 15.8 | 42 |
| 16.6 | 14 |
| 17.9 | 71 |
| 18.1 | 100 |
| 18.6 | 62 |
| 19.5 | 45 |
| 19.9 | 21 |
| 20.7 | 37 |
| 20.9 | 31 |
| 21.4 | 31 |
| 22.1 | 48 |
| 22.6 | 69 |

TABLE 2-continued

| Diffraction angle (2θ) (degree) | Relative intensity (%) |
|---|---|
| 23.1 | 25 |
| 23.4 | 40 |
| 23.6 | 23 |
| 24.4 | 43 |
| 25.3 | 21 |
| 25.5 | 13 |
| 27.0 | 19 |
| 27.6 | 10 |
| 27.9 | 8 |
| 28.6 | 11 |
| 29.6 | 14 |
| 30.0 | 8 |
| 30.4 | 8 |
| 31.1 | 8 |
| 31.5 | 6 |
| 32.2 | 7 |
| 33.9 | 9 |
| 34.8 | 7 |

(2) Differential Scanning Calorimetry (DSC)
 Measurement condition: Condition 1
 Sample amount: 1.0 mg
 Heating rate: 10° C./min (20 to 180° C.)
 First endothermic peak: onset temperature of about 80° C., peak temperature of about 97° C.
 Second endothermic peak: onset temperature of about 110° C., peak temperature of about 112° C.
(3) Thermogravimetry (TG)
 Device: TGA/DSC 3+ manufactured by Mettler Toledo
 Sample amount: 2.1 mg
 Sample cell: aluminum pan
 Nitrogen gas flow rate: 40 mL/min
 Heating rate: 10° C./min (25 to 180° C.)
 A weight loss of about 3.1% was shown from about room temperature to about 100° C.

Example 9: Crystal of monobenzoate of 1-[[(3S)-3-methyl-6-(4,4,4-trifluorobutoxy)-3,4-dihydronaphthalen-2-yl]methyl]azetidine-3-carboxylic acid (crystal A)

A mixture of the compound (1.5 g) produced in Example 7 and benzoic acid (0.48 g) was dissolved by adding methanol (7.5 mL) at room temperature, and then the mixture was concentrated under reduced pressure at 35° C. Acetonitrile (3.0 mL) was added thereto, and the mixture was stirred at room temperature for 1 hour. Suspended crystals were collected by filtration and dried at 40° C. under reduced pressure overnight to obtain 1.86 g of the title compound as a crystalline white solid having the following physical property values.

$^1$H-NMR (DMSO-$d_6$): δ 7.95, 7.62, 7.50, 6.97, 6.73-6.67, 6.21, 4.00, 3.44-3.37, 3.25-3.12, 2.95, 2.84, 2.45-2.31, 1.95-1.88, 0.85.

A powder X-ray diffraction spectrum chart and a DSC chart of the crystal measured under the following conditions are shown in FIG. 5 and FIG. 6, respectively.
(1) Powder X-Ray Diffraction Spectrum
 Measurement condition: Condition 1
 Results of diffraction angles (2θ) (degree) and relative intensities (%) obtained by a powder X-ray diffraction spectrum method using Cu—Kα rays are shown in Table 3.

TABLE 3

| Diffraction angle (2θ) (degree) | Relative intensity (%) |
|---|---|
| 9.6 | 9 |
| 11.0 | 12 |
| 11.5 | 46 |
| 14.1 | 9 |
| 14.7 | 13 |
| 16.1 | 17 |
| 16.3 | 21 |
| 16.7 | 11 |
| 17.1 | 42 |
| 17.8 | 49 |
| 18.0 | 72 |
| 18.2 | 58 |
| 18.4 | 70 |
| 18.6 | 35 |
| 19.3 | 100 |
| 19.6 | 22 |
| 20.1 | 49 |
| 20.4 | 63 |
| 21.0 | 27 |
| 21.3 | 16 |
| 21.9 | 65 |
| 22.1 | 71 |
| 22.3 | 12 |
| 23.1 | 20 |
| 24.1 | 59 |
| 24.5 | 14 |
| 25.0 | 9 |
| 25.4 | 38 |
| 26.2 | 10 |
| 26.8 | 16 |
| 27.1 | 13 |
| 27.3 | 33 |
| 28.0 | 10 |
| 28.3 | 13 |
| 28.7 | 9 |
| 29.5 | 9 |
| 29.9 | 7 |
| 30.9 | 19 |
| 31.6 | 10 |
| 32.5 | 12 |
| 33.3 | 10 |
| 34.5 | 9 |

(2) Differential Scanning Calorimetry (DSC)
 Measurement condition: Condition 2
 Sample amount: 1.8 mg
 Heating rate: 10° C./min (25 to 180° C.)
 Endothermic peak: onset temperature of about 137° C., peak temperature of about 139° C.

Example 10: Crystal of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid (Crystal A)

Acetonitrile (30 mL) was added to a mixture of the compound (3.0 g) produced in Example 7 and 4-hydroxybenzoic acid (1.08 g) at room temperature, and the mixture was stirred overnight. Thereafter, suspended crystals were collected by filtration and dried at 50° C. under reduced pressure for 3 hours to obtain 4.0 g of the title compound as a crystalline white solid having the following physical property values.

$^1$H-NMR (DMSO-$d_6$): δ 12.76-12.01, 10.46-10.00, 7.78, 6.97, 6.81, 6.75-6.65, 6.21, 4.04-3.95, 3.45-3.33, 3.25-3.09, 2.94, 2.84, 2.48-2.27, 1.96-1.85, 0.84.

A powder X-ray diffraction spectrum chart and a DSC chart of the crystal measured under the following conditions are shown in FIG. 7 and FIG. 8, respectively.

(1) Powder X-Ray Diffraction Spectrum
Measurement condition: Condition 1
Results of diffraction angles (2θ) (degree) and relative intensities (%) obtained by a powder X-ray diffraction spectrum method using Cu—Kα rays are shown in Table 4.

TABLE 4

| Diffraction angle (2θ) (degree) | Relative intensity (%) |
| --- | --- |
| 5.4 | 23 |
| 6.9 | 30 |
| 10.3 | 10 |
| 12.8 | 9 |
| 13.9 | 21 |
| 15.0 | 9 |
| 15.3 | 9 |
| 15.9 | 32 |
| 16.6 | 34 |
| 16.8 | 30 |
| 18.1 | 50 |
| 19.4 | 68 |
| 19.8 | 100 |
| 20.9 | 86 |
| 21.8 | 21 |
| 22.7 | 39 |
| 23.6 | 15 |
| 24.7 | 28 |
| 25.4 | 9 |
| 25.8 | 9 |
| 26.3 | 10 |
| 26.7 | 9 |
| 27.6 | 21 |
| 27.8 | 20 |
| 30.3 | 10 |
| 33.4 | 12 |
| 34.2 | 9 |

(2) Differential Scanning Calorimetry (DSC)
Measurement condition: Condition 2
Sample amount: 2.1 mg
Heating rate: 10° C./min (25 to 180° C.)
Endothermic peak: onset temperature of about 150° C., peak temperature of about 153° C.

Example 11: Crystal of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid (Crystal B)

Methanol (300 μL) and distilled water (30 μL) were added to a mixture of the compound (150 mg) produced in Example 7 and 4-hydroxybenzoic acid (54 mg) at room temperature, and the mixture was stirred overnight. Thereafter, the suspension was concentrated and dried under reduced pressure to obtain 204 mg of the title compound as a crystalline white solid having the following physical property values.
A powder X-ray diffraction spectrum chart and a DSC chart of the crystal measured under the following conditions are shown in FIG. 9 and FIG. 10, respectively.
(1) Powder X-Ray Diffraction Spectrum
Measurement condition: Condition 2
Results of diffraction angles (2θ) (degree) and relative intensities (%) obtained by a powder X-ray diffraction spectrum method using Cu—Kα rays are shown in Table 5.

TABLE 5

| Diffraction angle (2θ) (degree) | Relative intensity (%) |
| --- | --- |
| 5.6 | 39 |
| 7.0 | 6 |
| 7.9 | 5 |
| 11.3 | 28 |
| 12.3 | 3 |
| 13.2 | 15 |
| 13.9 | 4 |
| 15.9 | 21 |
| 16.9 | 37 |
| 17.4 | 6 |
| 17.9 | 15 |
| 18.4 | 25 |
| 18.8 | 100 |
| 19.4 | 8 |
| 19.9 | 11 |
| 20.4 | 8 |
| 21.0 | 23 |
| 21.2 | 16 |
| 21.9 | 5 |
| 22.7 | 39 |
| 23.2 | 11 |
| 23.4 | 20 |
| 24.2 | 69 |
| 25.2 | 11 |
| 26.5 | 4 |
| 27.5 | 13 |
| 29.1 | 3 |
| 29.8 | 9 |
| 30.5 | 5 |
| 34.1 | 7 |

(2) Differential Scanning Calorimetry (DSC)
Measurement condition: Condition 2
Sample amount: 3.0 mg
Heating rate: 10° C./min (25 to 180° C.)
Endothermic peak: onset temperature of about 154° C., peak temperature of about 158° C.

Example 12: Crystal of hydrate of mono(4-hydroxybenzoate) of 1-[[(3S)-3-methyl-6-(4,4,4-trifluorobutoxy)-3,4-dihydronaphthalen-2-yl]methyl] azetidine-3-carboxylic acid (Crystal C)

Figure 22:
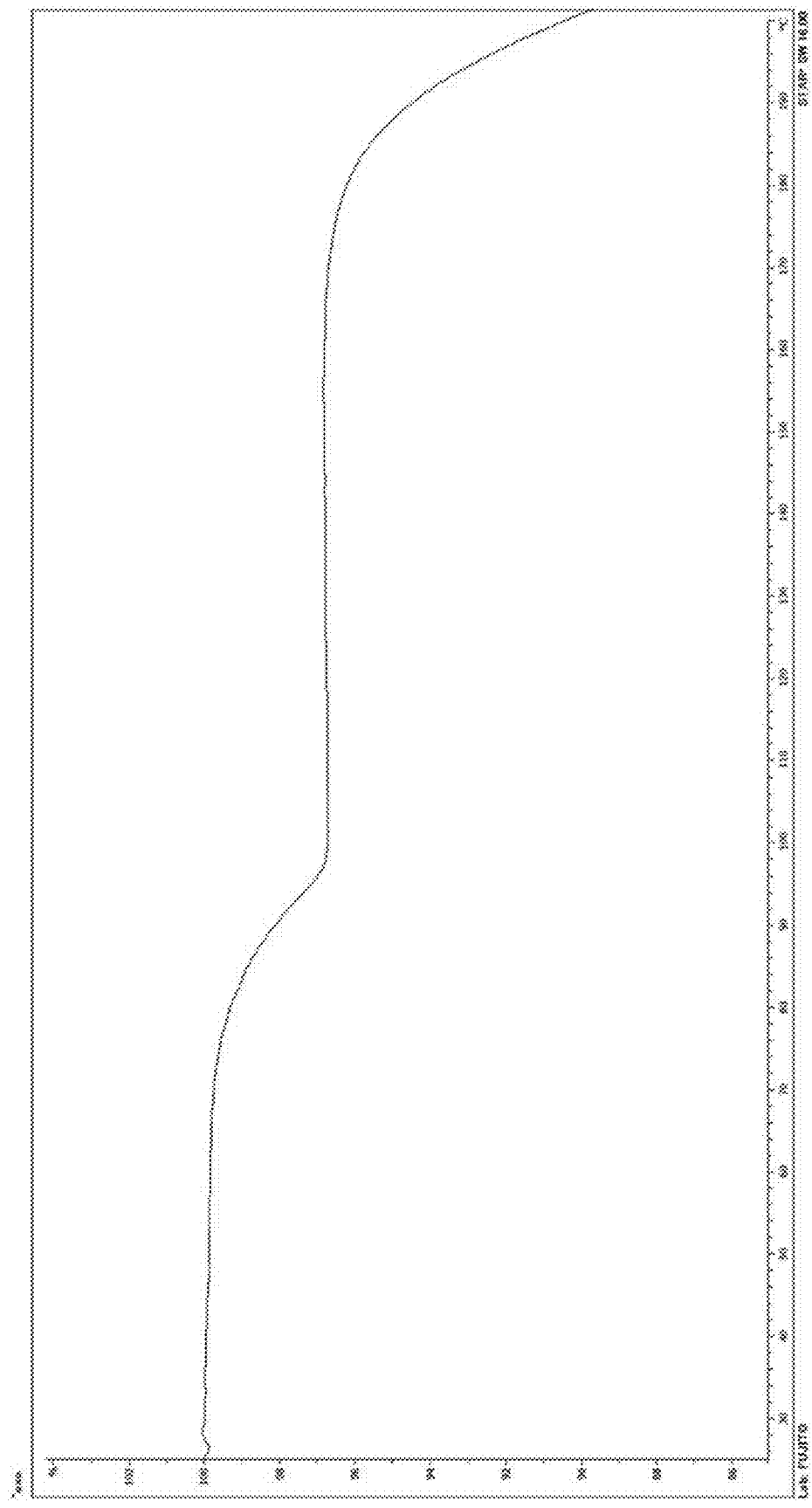
FIG. 22 represents a thermogravimetric (TG) chart of crystal C of hydrate of mono(4-hydroxybenzoate) of Compound I (vertical axis represents weight (%), and horizontal axis represents temperature (° C.)).

Distilled water (30 mL) was added to a mixture of the compound (3.0 g) produced in Example 7 and 4-hydroxybenzoic acid (1.08 g) at room temperature, and the mixture was stirred overnight. Thereafter, suspended crystals were collected by filtration and dried at room temperature under reduced pressure for 3 hours to obtain 4.14 g of the title compound as a crystalline white solid having the following physical property values.
A powder X-ray diffraction spectrum chart, a DSC chart, and a TG chart of the crystal measured under the following conditions are shown in FIG. 11, FIG. 12, and FIG. 22, respectively.
(1) Powder X-Ray Diffraction Spectrum
Measurement condition: Condition 1
Results of diffraction angles (2θ) (degree) and relative intensities (%) obtained by a powder X-ray diffraction spectrum method using Cu—Kα rays are shown in Table 6.

TABLE 6

| Diffraction angle (2θ) (degree) | Relative intensity (%) |
| --- | --- |
| 5.0 | 32 |
| 8.6 | 6 |
| 10.1 | 5 |
| 10.3 | 6 |
| 12.3 | 35 |

TABLE 6-continued

| Diffraction angle (2θ) (degree) | Relative intensity (%) |
|---|---|
| 14.1 | 6 |
| 14.4 | 43 |
| 15.0 | 49 |
| 15.1 | 16 |
| 16.0 | 58 |
| 16.7 | 50 |
| 17.4 | 43 |
| 18.4 | 7 |
| 19.1 | 45 |
| 19.7 | 9 |
| 20.3 | 100 |
| 20.8 | 48 |
| 21.2 | 17 |
| 21.5 | 25 |
| 21.8 | 17 |
| 22.2 | 8 |
| 22.5 | 40 |
| 23.5 | 23 |
| 23.9 | 76 |
| 24.8 | 73 |
| 25.4 | 16 |
| 26.1 | 9 |
| 27.2 | 7 |
| 28.6 | 6 |
| 28.9 | 24 |
| 29.2 | 23 |
| 29.4 | 9 |
| 30.3 | 5 |
| 34.9 | 6 |

(2) Differential Scanning Calorimetry (DSC)
Measurement condition: Condition 2
Sample amount: 2.2 mg
Heating rate: 10° C./min (25 to 200° C.)
First endothermic peak: onset temperature of about 78° C., peak temperature of about 93° C.
Second endothermic peak: onset temperature of about 105° C., peak temperature of about 114° C.
Third endothermic peak: onset temperature of about 152° C., peak temperature of about 155° C.
First exothermic peak: onset temperature of about 114° C., peak temperature of about 120° C.
Second exothermic peak: onset temperature of about 159° C., peak temperature of about 165° C.
(3) Thermogravimetry (TG)
Device: TGA/DSC 3+ manufactured by Mettler Toledo
Sample amount: 2.2 mg
Sample cell: aluminum pan
Nitrogen gas flow rate: 40 mL/min
Heating rate: 10° C./min (25 to 200° C.)
A weight loss of about 3.1% was shown from about room temperature to about 100° C.

Example 13: Crystal of hemisulfate of 1-[[(3S)-3-methyl-6-(4,4,4-trifluorobutoxy)-3,4-dihydronaphthalen-2-yl]methyl]azetidine-3-carboxylic acid (Crystal B)

1 mL of methanol was added to the compound (150 mg) produced in Example 6, and the mixture was stirred. Under an ice bath, 0.39 mL of a 0.5 mol/L sulfuric acid aqueous solution was added dropwise to this solution little by little, and the mixture was stirred for 5 minutes. The solvent was distilled off under reduced pressure and dried under reduced pressure at room temperature for 15 minutes. Thereto was added 1.5 mL of acetonitrile, and the mixture was irradiated with ultrasonic waves and then stirred at room temperature for 21 hours. 1.0 mL of acetonitrile was added thereto, and the mixture was stirred at room temperature overnight. The solid was collected by filtration and dried at room temperature under reduced pressure to obtain 114 mg of the title compound as a crystalline white solid having the following physical property values.

$^1$H-NMR (DMSO-$d_6$): δ 13.38-12.76, 11.03-10.33, 7.06, 6.81-6.73, 6.53, 4.42-4.23, 4.22-4.11, 4.11-3.92, 3.91-3.78, 3.75-3.57, 2.92, 2.61-2.34, 1.98-1.87, 0.84.

A powder X-ray diffraction spectrum chart and a DSC chart of the crystal measured under the following conditions are shown in FIG. 13 and FIG. 14, respectively.
(1) Powder X-Ray Diffraction Spectrum
Measurement condition: Condition 1
Results of diffraction angles (2θ) (degree) and relative intensities (%) obtained by a powder X-ray diffraction spectrum method using Cu—Kα rays are shown in Table 7.

TABLE 7

| Diffraction angle (2θ) (degree) | Relative intensity (%) |
|---|---|
| 5.7 | 85 |
| 8.6 | 27 |
| 11.3 | 36 |
| 12.6 | 32 |
| 14.4 | 31 |
| 15.1 | 52 |
| 16.1 | 43 |
| 16.7 | 62 |
| 17.3 | 59 |
| 18.9 | 84 |
| 20.0 | 44 |
| 20.2 | 44 |
| 21.0 | 100 |
| 21.5 | 63 |
| 21.8 | 47 |
| 23.1 | 63 |
| 23.8 | 43 |
| 24.6 | 37 |
| 25.4 | 24 |
| 26.0 | 23 |
| 26.6 | 24 |
| 26.9 | 24 |
| 29.0 | 20 |

(2) Differential Scanning Calorimetry (DSC)
Measurement condition: Condition 1
Sample amount: 1.0 mg
Heating rate: 10° C./min (25 to 180° C.)
Endothermic peak: onset temperature of about 161° C., peak temperature of about 166° C.

Example 14: Crystal of mono-tryptophan salt of 1-[[(3S)-3-methyl-6-(4,4,4-trifluorobutoxy)-3,4-dihydronaphthalen-2-yl]methyl]azetidine-3-carboxylic acid (crystal A)

A mixed solvent of methanol (1.5 mL) and acetonitrile (8.5 mL) was added to a mixture of the compound (0.99 g) produced in Example 7 and tryptophan (0.53 g), and the mixture was stirred at 55° C. for 3 days. Methanol (0.75 mL), acetonitrile (4.25 mL) and distilled water (1 mL) were further added thereto, and the mixture was stirred at 25° C. for 15 minutes. Suspended crystals were collected by filtration and dried under reduced pressure at room temperature overnight. Distilled water (7 mL) was added to the crystals, and the mixture was stirred at 25° C. for 1 day. Suspended crystals were collected by filtration and dried under reduced pressure at room temperature for 4 days to obtain 1.40 g of the title compound as a crystalline white solid having the following physical property values.

¹H-NMR (DMSO-d₆): δ 10.87, 7.55, 7.34, 7.19, 7.09-7.05, 7.00-6.96, 6.73-6.67, 6.21, 4.00, 3.43-3.11, 2.97-2.91, 2.87-2.81, 2.44-2.32, 1.95-1.88, 0.85.

A powder X-ray diffraction spectrum chart and a DSC chart of the crystal measured under the following conditions are shown in FIG. 15 and FIG. 16, respectively.

(1) Powder X-Ray Diffraction Spectrum

Measurement condition: Condition 1

Results of diffraction angles (2θ) (degree) and relative intensities (%) obtained by a powder X-ray diffraction spectrum method using Cu—Kα rays are shown in Table 8.

TABLE 8

| Diffraction angle (2θ) (degree) | Relative intensity (%) |
|---|---|
| 8.0 | 22 |
| 9.7 | 20 |
| 12.8 | 3 |
| 15.6 | 5 |
| 16.0 | 23 |
| 16.6 | 16 |
| 17.0 | 100 |
| 17.3 | 11 |
| 17.6 | 6 |
| 18.2 | 5 |
| 18.6 | 9 |
| 18.9 | 40 |
| 19.1 | 26 |
| 19.6 | 5 |
| 20.9 | 7 |
| 21.3 | 11 |
| 21.7 | 7 |
| 21.9 | 12 |
| 22.2 | 18 |
| 22.6 | 5 |
| 23.4 | 7 |
| 23.8 | 11 |
| 24.6 | 19 |
| 25.3 | 3 |
| 25.7 | 9 |
| 26.2 | 4 |
| 26.6 | 6 |
| 27.1 | 3 |
| 27.4 | 4 |
| 27.9 | 11 |
| 28.2 | 7 |
| 28.7 | 9 |
| 29.1 | 5 |
| 29.9 | 5 |
| 30.2 | 4 |
| 30.9 | 4 |
| 32.0 | 8 |
| 32.2 | 7 |
| 32.5 | 7 |
| 33.1 | 3 |
| 34.1 | 2 |
| 34.5 | 3 |
| 34.8 | 4 |

(2) Differential Scanning Calorimetry (DSC)

Measurement condition: Condition 1

Sample amount: 0.8 mg

Heating rate: 10° C./min (20 to 200° C.)

Endothermic peak: onset temperature of about 178° C., peak temperature of about 183° C.

Exothermic peak: onset temperature of about 185° C., peak temperature of about 187° C.

Example 15: Crystal of hemisuccinate of 1-[[(3S)-3-methyl-6-(4,4,4-trifluorobutoxy)-3,4-dihydronaphthalen-2-yl]methyl]azetidine-3-carboxylic acid (crystal A)

A mixture of the compound (1.0 g) produced in Example 7 and succinic acid (0.32 g) was dissolved in isopropanol (7 mL) at 70° C. The mixture was cooled to 25° C. and stirred for 3 days. Precipitated crystals were collected by filtration and dried at room temperature in the atmosphere for 40 minutes to obtain 1.0 g of the title compound as a crystalline white solid having the following physical property values.

¹H-NMR (DMSO-d₆): δ 12.25, 6.97, 6.73-6.68, 6.22, 4.00, 3.44-3.39, 3.24-3.14, 2.97, 2.87-2.82, 2.44-2.32, 1.93-1.89, 0.85.

A powder X-ray diffraction spectrum chart and a DSC chart of the crystal measured under the following conditions are shown in FIG. 17 and FIG. 18, respectively.

(1) Powder X-Ray Diffraction Spectrum

Measurement condition: Condition 1

Results of diffraction angles (2θ) (degree) and relative intensities (%) obtained by a powder X-ray diffraction spectrum method using Cu—Kα rays are shown in Table 9.

TABLE 9

| Diffraction angle (2θ) (degree) | Relative intensity (%) |
|---|---|
| 6.1 | 5 |
| 6.4 | 17 |
| 6.9 | 14 |
| 12.9 | 49 |
| 13.8 | 19 |
| 16.6 | 23 |
| 17.2 | 41 |
| 18.1 | 100 |
| 18.3 | 24 |
| 18.7 | 17 |
| 19.3 | 43 |
| 19.9 | 30 |
| 20.5 | 7 |
| 20.7 | 10 |
| 21.0 | 6 |
| 21.4 | 16 |
| 21.9 | 5 |
| 22.1 | 7 |
| 22.7 | 23 |
| 23.0 | 8 |
| 23.6 | 16 |
| 23.9 | 76 |
| 24.3 | 51 |
| 24.6 | 22 |
| 25.2 | 7 |
| 25.8 | 16 |
| 26.0 | 7 |
| 27.4 | 9 |
| 27.5 | 8 |
| 27.8 | 15 |
| 28.7 | 5 |
| 29.5 | 3 |
| 30.2 | 4 |
| 30.5 | 4 |
| 30.8 | 3 |
| 31.3 | 6 |
| 31.7 | 3 |
| 32.3 | 3 |
| 32.5 | 4 |
| 33.8 | 5 |
| 34.1 | 4 |
| 34.5 | 5 |
| 34.9 | 4 |

(2) Differential Scanning Calorimetry (DSC)

Measurement condition: Condition 1

Sample amount: 0.8 mg

Heating rate: 10° C./min (20 to 180° C.)

First endothermic peak: onset temperature of about 111° C., peak temperature of about 114° C.

Second endothermic peak: onset temperature of about 137° C., peak temperature of about 140° C.

Example 16: Crystal of hemiadipate of 1-[[(3S)-3-methyl-6-(4,4,4-trifluorobutoxy)-3,4-dihydronaphthalen-2-yl]methyl]azetidine-3-carboxylic acid (Crystal B)

A mixture of the compound (1.0 g) produced in Example 7 and adipic acid (0.20 g) was dissolved in ethanol (7 mL) at 45° C. The mixture was cooled to 25° C., diethyl ether (60 mL) was added thereto, the mixture was stirred for 2 days, and suspended crystals were collected by filtration and dried under reduced pressure at room temperature overnight. Adipic acid (0.084 g) and acetone (8 mL) were further added to the crystals, and the mixture was stirred for 6 days. Suspended crystals were collected by filtration and dried under reduced pressure at room temperature overnight to obtain 0.87 g of the title compound as a crystalline white solid having the following physical property values.

$^1$H-NMR (DMSO-$d_6$): δ 12.16, 6.97, 6.73-6.67, 6.21, 4.00, 3.44-3.37, 3.24-3.12, 2.95, 2.87-2.82, 2.47-2.31, 2.23-2.18, 1.95-1.88, 1.54-1.46, 0.85.

A powder X-ray diffraction spectrum chart and a DSC chart of the crystal measured under the following conditions are shown in FIG. 19 and FIG. 20, respectively.

(1) Powder X-Ray Diffraction Spectrum
    Measurement condition: Condition 1
    Results of diffraction angles (2θ) (degree) and relative intensities (%) obtained by a powder X-ray diffraction spectrum method using Cu—Kα rays are shown in Table 10.

TABLE 10

| Diffraction angle (2θ) (degree) | Relative intensity (%) |
|---|---|
| 5.8 | 10 |
| 6.4 | 8 |
| 7.0 | 17 |
| 8.6 | 31 |
| 10.8 | 13 |
| 11.6 | 4 |
| 12.8 | 5 |
| 13.1 | 5 |
| 13.2 | 6 |
| 14.1 | 8 |
| 15.5 | 17 |
| 15.9 | 33 |
| 17.4 | 100 |
| 17.7 | 11 |
| 18.6 | 56 |
| 19.4 | 21 |
| 19.6 | 5 |
| 20.3 | 11 |
| 20.4 | 13 |
| 20.7 | 20 |
| 21.1 | 12 |
| 21.4 | 30 |
| 21.7 | 10 |
| 21.9 | 15 |
| 22.3 | 31 |
| 22.5 | 32 |
| 23.3 | 14 |
| 23.4 | 17 |
| 23.6 | 13 |
| 24.2 | 49 |
| 24.7 | 15 |
| 25.2 | 13 |
| 25.5 | 11 |
| 25.9 | 6 |
| 26.4 | 21 |
| 26.7 | 6 |
| 27.0 | 11 |
| 27.3 | 7 |
| 27.8 | 8 |
| 28.2 | 7 |
| 28.4 | 11 |
| 28.9 | 5 |

TABLE 10-continued

| Diffraction angle (2θ) (degree) | Relative intensity (%) |
|---|---|
| 29.3 | 16 |
| 29.7 | 7 |
| 30.0 | 10 |
| 30.2 | 6 |
| 31.3 | 7 |
| 32.0 | 7 |
| 32.3 | 11 |
| 33.0 | 16 |
| 33.6 | 5 |
| 34.5 | 5 |

(2) Differential Scanning Calorimetry (DSC)
    Measurement condition: Condition 1
    Sample amount: 0.6 mg
    Heating rate: 10° C./min (20 to 180° C.)
    Endothermic peak: onset temperature of about 123° C., peak temperature of about 125° C.

Example 17: Crystal of 1-[[(3S)-3-methyl-6-(4,4,4-trifluorobutoxy)-3,4-dihydronaphthalen-2-yl]methyl]azetidine-3-carboxylic acid (Crystal A)

A part of the compound produced in Example 6 was purified by silica gel column chromatography (ODS, $H_2O$:$CH_3CN$=90:10→0:10). Thereafter, the mixture was concentrated and dried at 40° C. to obtain 113 mg of the title compound as a crystalline white solid having the following physical property values.

A powder X-ray diffraction spectrum chart and a DSC chart of the crystal measured under the following conditions are shown in FIG. 23 and FIG. 24, respectively.

(1) Powder X-Ray Diffraction Spectrum
    Measurement condition: Condition 2
    Results of diffraction angles (2θ) (degree) and relative intensities (%) obtained by a powder X-ray diffraction spectrum method using Cu—Kα rays are shown in Table 14.

TABLE 14

| Diffraction angle (2θ) (degree) | Relative intensity (%) |
|---|---|
| 5.8 | 24 |
| 6.4 | 21 |
| 7.9 | 17 |
| 8.9 | 20 |
| 9.6 | 18 |
| 10.0 | 13 |
| 11.2 | 13 |
| 13.3 | 16 |
| 13.9 | 18 |
| 14.6 | 33 |
| 14.9 | 35 |
| 15.4 | 39 |
| 15.9 | 98 |
| 16.5 | 54 |
| 17.0 | 100 |
| 17.6 | 64 |
| 17.9 | 69 |
| 18.4 | 73 |
| 18.6 | 78 |
| 19.3 | 85 |
| 20.1 | 63 |
| 20.6 | 84 |
| 21.3 | 38 |
| 22.0 | 64 |
| 22.8 | 92 |
| 23.6 | 44 |
| 23.9 | 39 |
| 24.7 | 29 |
| 25.3 | 35 |

TABLE 14-continued

| Diffraction angle (2θ) (degree) | Relative intensity (%) |
|---|---|
| 26.3 | 28 |
| 26.9 | 27 |
| 28.4 | 41 |
| 28.7 | 28 |
| 29.5 | 25 |
| 30.6 | 21 |
| 31.4 | 19 |
| 32.0 | 20 |
| 33.8 | 20 |

(2) Differential Scanning Calorimetry (DSC)
  Measurement condition: Condition 3
  Sample amount: 1.29 mg
  Heating rate: 10° C./min (5 to 120° C.)
  First endothermic peak: broad peak from about 50° C. to about 90° C.
  Second endothermic peak: onset temperature of about 108° C., peak temperature of about 111° C.

Example 18: Crystal of hemi(4-hydroxybenzoate) of 1-[[(3S)-3-methyl-6-(4,4,4-trifluorobutoxy)-3,4-dihydronaphthalen-2-yl]methyl]azetidine-3-carboxylic acid (Crystal D)

To 20 mg of the compound produced in Example 11, 88 µL of DMSO and 112 mL of water were added. The mixture was stirred at 40° C. for 1 week, and crystals were collected by filtration to obtain the title compound as a crystalline white solid having the following physical property values.
  $^1$H-NMR (METHANOL-d4): δ 7.81-7.74, 6.99-6.93, 6.75-6.62, 6.44, 4.24-4.04, 3.99-3.86, 3.82-3.73, 3.41-3.28, 2.93, 2.58-2.52, 2.36-2.19, 1.97-1.87, 0.85.

A powder X-ray diffraction spectrum chart of the crystal measured under the following conditions is shown in FIG. 25.
(1) Powder X-Ray Diffraction Spectrum
  Measurement condition: Condition 1
  Results of diffraction angles (2θ) (degree) and relative intensities (%) obtained by a powder X-ray diffraction spectrum method using Cu—Kα rays are shown in Table 15.

TABLE 15

| Diffraction angle (2θ) (degree) | Relative intensity (%) |
|---|---|
| 8.1 | 25 |
| 8.4 | 8 |
| 9.2 | 9 |
| 10.8 | 15 |
| 12.9 | 8 |
| 13.5 | 23 |
| 13.8 | 9 |
| 14.6 | 16 |
| 15.1 | 14 |
| 15.7 | 30 |
| 16.1 | 46 |
| 17.0 | 27 |
| 17.2 | 10 |
| 17.5 | 14 |
| 18.4 | 24 |
| 19.0 | 46 |
| 19.3 | 11 |
| 19.8 | 100 |
| 20.7 | 10 |
| 21.1 | 37 |
| 21.5 | 26 |
| 21.7 | 28 |
| 22.5 | 58 |
| 23.1 | 13 |
| 23.5 | 86 |
| 24.2 | 13 |

TABLE 15-continued

| Diffraction angle (2θ) (degree) | Relative intensity (%) |
|---|---|
| 24.8 | 16 |
| 25.2 | 14 |
| 25.6 | 96 |
| 26.1 | 12 |
| 26.5 | 8 |
| 27.8 | 23 |
| 28.2 | 13 |
| 28.9 | 7 |
| 29.4 | 12 |
| 30.5 | 10 |
| 31.0 | 10 |
| 31.7 | 8 |
| 32.6 | 14 |
| 33.0 | 7 |

Example 19: Crystal of mono(4-hydroxybenzoate) of 1-[[(3S)-3-methyl-6-(4,4,4-trifluorobutoxy)-3,4-dihydronaphthalen-2-yl]methyl]azetidine-3-carboxylic acid (Crystal E)

The compound produced in Example 12 was dried under reduced pressure conditions at 90° C. for 2 hours to obtain the title compound as a crystalline white solid having the following physical property values.

A powder X-ray diffraction spectrum chart and a DSC chart of the crystal measured under the following conditions are shown in FIG. 26 and FIG. 27, respectively.
(1) Powder X-Ray Diffraction Spectrum
  Measurement condition: Condition 1
  Results of diffraction angles (2θ) (degree) and relative intensities (%) obtained by a powder X-ray diffraction spectrum method using Cu—Kα rays are shown in Table 16.

TABLE 16

| Diffraction angle (2θ) (degree) | Relative intensity (%) |
|---|---|
| 5.1 | 21 |
| 7.3 | 9 |
| 7.7 | 9 |
| 8.9 | 13 |
| 9.9 | 7 |
| 10.1 | 9 |
| 10.5 | 10 |
| 11.8 | 5 |
| 12.5 | 16 |
| 14.4 | 22 |
| 14.6 | 22 |
| 15.3 | 28 |
| 15.7 | 9 |
| 16.5 | 36 |
| 16.9 | 18 |
| 17.5 | 22 |
| 18.0 | 14 |
| 18.4 | 16 |
| 19.3 | 32 |
| 19.6 | 25 |
| 19.8 | 33 |
| 20.4 | 100 |
| 21.1 | 25 |
| 22.1 | 53 |
| 22.6 | 16 |
| 23.0 | 16 |
| 23.3 | 22 |
| 23.8 | 16 |
| 24.2 | 34 |
| 25.0 | 15 |
| 25.4 | 15 |
| 25.8 | 18 |
| 26.5 | 17 |
| 27.3 | 12 |
| 27.9 | 9 |
| 28.4 | 12 |

TABLE 16-continued

| Diffraction angle (2θ) (degree) | Relative intensity (%) |
|---|---|
| 29.2 | 15 |
| 29.7 | 12 |
| 30.1 | 8 |
| 30.8 | 8 |
| 31.0 | 7 |
| 31.8 | 9 |
| 32.4 | 6 |
| 34.2 | 7 |

(2) Differential Scanning Calorimetry (DSC)
  Measurement condition: Condition 2
  Sample amount: 2.05 mg
  Heating rate: 10° C./min (35 to 185° C.)
  First endothermic peak: onset temperature of about 104° C., peak temperature of about 113° C.
  Second endothermic peak: onset temperature of about 147° C., peak temperature of about 153° C.
  First exothermic peak: onset temperature of about 117° C., peak temperature of about 121° C.

Example 20: Crystal of 1-[[(3S)-3-methyl-6-(4,4,4-trifluorobutoxy)-3,4-dihydronaphthalen-2-yl]methyl] azetidine-3-carboxylic acid-4-hydroxybenzoic acid (1:1) monohydrate (Crystal I)

(Monohydrate of Cocrystal of Compound I and 4-hydroxybenzoic acid (1:1) (Crystal I))

20 mg of the compound produced in Example 10 was dissolved in 800 μL of isopropanol. The solution was aliquoted into 100 μL (solution A) and 150 μL (solution B) and concentrated in air for 1 day. Seed crystals obtained from the solution obtained by concentrating the solution A were put into the solution obtained by concentrating the solution B, and left for several hours to obtain the title compound as a crystalline solid having the following physical property values.

Results of single crystal X-ray measurement of the crystals are shown below.

(1) Crystallographic Data
  Measurement condition: Condition 1
  Lattice constant: a=6.1374 (2) Å
  b=12.8245 (3) Å
  c=17.8596 (5) Å
  α=72.297 (2)°
  β=85.002 (3)°
  γ=79.591 (3)°
  V=1316.35 (7) Å$^3$
  Space group: P1 (#1)
  Factor R: 0.0475
  Flack value: −0.04 (7)

(2) Positional Parameters (Partial Atomic Coordinates)
  Measurement condition: Condition 1

Results of positional parameters (partial atomic coordinates) obtained by single crystal X-ray diffraction using Cu—Kα rays are shown in Table 17 (×10$^4$). Note that Atom numbers in Table 17 are not related to Atom numbers in Table 18.

TABLE 17-1

| Atom | x | y | z | Atom | x | y | z |
|---|---|---|---|---|---|---|---|
| O12 | 32433 (5) | −12514 (2) | 9622.8 (16) | C30 | 23961 (6) | −3866 (3) | 8310 (2) |
| O9 | 23642 (5) | −4521 (2) | 8945.4 (17) | C42 | 19197 (7) | −2487 (3) | 7320 (2) |
| O13 | 27413 (5) | −7579 (2) | 8244.4 (17) | C33 | 20236 (6) | −3144 (3) | 6905 (2) |
| O11 | 35037 (4) | −11515 (2) | 9645.9 (17) | C34 | 19590 (7) | −2953 (3) | 6068 (2) |
| O3 | −3447 (5) | 8634 (2) | 3642.0 (16) | C39 | 14017 (7) | −363 (3) | 7178 (2) |
| O8 | 28698 (5) | −5753 (2) | 8298.6 (18) | C23 | −19565 (7) | 20513 (3) | 1048 (2) |
| O14 | 38140 (5) | −13236 (2) | 9931.2 (17) | C6 | −11515 (7) | 12723 (3) | 2970 (2) |
| O10 | 11903 (5) | 684 (2) | 6012.5 (16) | C31 | 23947 (7) | −5548 (3) | 8358 (3) |
| F1 | 994 (6) | 5264 (3) | 4786.2 (18) | C27 | −22220 (7) | 19569 (3) | 730 (2) |
| F2 | 2835 (5) | 5328 (3) | 3701 (2) | C15 | −9892 (7) | 12417 (3) | 2501 (2) |
| O4 | −24981 (5) | 21543 (3) | 236.1 (19) | C13 | −6262 (8) | 11253 (4) | 2332 (2) |
| O5 | −22400 (5) | 22546 (2) | 283 (2) | C7 | −11732 (7) | 12066 (3) | 3827 (2) |
| F6 | 3956 (5) | 2990 (3) | 5659 (2) | C11 | −4961 (7) | 9576 (3) | 3320 (2) |
| N2 | 22395 (5) | −4467 (2) | 8048 (2) | C12 | −4647 (7) | 10335 (4) | 2600 (2) |
| O7 | −28143 (5) | 23230 (3) | 75 (2) | C25 | −18914 (7) | 18525 (3) | 1388 (2) |
| O1 | −18918 (5) | 15718 (3) | 1752 (2) | C10 | −6876 (7) | 9738 (3) | 3774 (2) |
| O6 | −17575 (6) | 17579 (3) | 1743 (2) | C9 | −8503 (7) | 10663 (3) | 3513 (2) |
| F3 | 95 (7) | 4429 (3) | 4013 (3) | F5 | 4034 (11) | 4080 (6) | 6323 (3) |
| O2 | −18430 (6) | 14476 (3) | 1100 (3) | C24 | −18244 (7) | 19513 (4) | 1387 (2) |
| N1 | −12688 (6) | 14516 (3) | 1929 (2) | C29 | 25205 (6) | −4998 (3) | 8795 (2) |
| C48 | 33004 (6) | −11610 (3) | 9496 (2) | C17 | 46 (7) | 7440 (4) | 3615 (3) |
| C52 | 28843 (6) | −8515 (3) | 8539 (2) | C43 | 10338 (8) | 1188 (4) | 6490 (2) |
| C36 | 17074 (6) | −1239 (3) | 6189 (2) | C26 | −20874 (8) | 18557 (3) | 1057 (2) |
| C54 | 29557 (6) | −10498 (3) | 8860 (2) | C1 | −17758 (7) | 15165 (3) | 1344 (3) |
| C21 | −22951 (7) | 21633 (3) | 395 (2) | C8 | −10653 (7) | 10844 (3) | 3968 (2) |
| F4 | 6079 (7) | 4175 (3) | 5284 (4) | C2 | −15367 (7) | 15338 (3) | 1140 (2) |
| C38 | 13680 (7) | −45 (3) | 6377 (2) | C32 | 21909 (6) | −4166 (3) | 7208 (2) |
| C50 | 32252 (6) | −9537 (3) | 9145 (2) | C16 | −1448 (7) | 8484 (4) | 3176 (2) |
| C28 | 27711 (6) | −5121 (3) | 8679 (2) | C18 | −762 (8) | 6388 (4) | 3626 (3) |
| C53 | 28202 (7) | −9519 (3) | 8547 (2) | C44 | 8636 (8) | 2008 (4) | 5954 (3) |
| C37 | 15230 (7) | −484 (3) | 5884 (2) | C19 | 771 (9) | 5357 (4) | 4036 (3) |
| C40 | 15842 (7) | −1127 (3) | 7483 (2) | C5 | −13075 (8) | 13818 (3) | 2738 (2) |
| C14 | −8203 (7) | 11429 (3) | 2775 (2) | C3 | −14164 (7) | 15642 (3) | 1734 (3) |
| C51 | 30868 (7) | −8538 (3) | 8833 (2) | C20 | −14161 (7) | 12111 (3) | 4132 (2) |
| C22 | −21556 (7) | 20559 (3) | 717 (2) | C46 | 5285 (11) | 3463 (5) | 5938 (4) |
| C49 | 31597 (6) | −10531 (3) | 9167 (2) | C47 | 17771 (8) | −3626 (4) | 6058 (3) |
| C41 | 17379 (6) | −1588 (3) | 7003 (2) | C4 | −13669 (8) | 14271 (4) | 1270 (3) |
| C35 | 18824 (7) | −1720 (3) | 5684 (2) | C45 | 7065 (13) | 2653 (7) | 6409 (4) |

TABLE 17-2

| Atom | x | y | z | Atom | x | y | z |
|---|---|---|---|---|---|---|---|
| O12 | 32433 (5) | -12514 (2) | 9622.8 (16) | C30 | 23961 (6) | -3866 (3) | 8310 (2) |
| O9 | 28642 (5) | -4521 (2) | 8945.4 (17) | C42 | 19197 (7) | -2487 (3) | 7320 (2) |
| O13 | 27413 (5) | -7579 (2) | 8244.4 (17) | C33 | 20236 (6) | -3144 (3) | 6905 (2) |
| O11 | 35037 (4) | -11515 (2) | 9645.9 (17) | C34 | 19590 (7) | -2953 (3) | 6068 (2) |
| O3 | -3447 (5) | 8634 (2) | 3642.0 (16) | C39 | 14017 (7) | -363 (3) | 7178 (2) |
| O8 | 28698 (5) | -5753 (2) | 8298.6 (18) | C23 | -19565 (7) | 20513 (3) | 1048 (2) |
| O14 | 38140 (5) | -13236 (2) | 9931.2 (17) | C6 | -11515 (7) | 12723 (3) | 2970 (2) |
| O10 | 11903 (5) | 684 (2) | 6012.5 (16) | C31 | 23947 (7) | -5548 (3) | 8358 (3) |
| F1 | 994 (6) | 5264 (3) | 4786.2 (18) | C27 | -22220 (7) | 19569 (3) | 730 (2) |
| F2 | 2835 (5) | 5328 (3) | 3701 (2) | C15 | -9892 (7) | 12417 (3) | 2501 (2) |
| O4 | -24981 (5) | 21543 (3) | 236.1 (19) | C13 | -6262 (8) | 11253 (4) | 2332 (2) |
| O5 | -22400 (5) | 22546 (2) | 283 (2) | C7 | -11732 (7) | 12066 (3) | 3827 (2) |
| F6 | 3956 (5) | 2990 (3) | 5859 (2) | C11 | -4961 (7) | 9576 (3) | 3320 (2) |
| N2 | 22395 (5) | -4467 (2) | 8048 (2) | C12 | -4647 (7) | 10335 (4) | 2600 (2) |
| O7 | -28143 (5) | 23230 (3) | 75 (2) | C25 | -18914 (7) | 18525 (3) | 1388 (2) |
| O1 | -18918 (5) | 15718 (3) | 1752 (2) | C10 | -6876 (7) | 9738 (3) | 3774 (2) |
| O6 | -17575 (6) | 17579 (3) | 1743 (2) | C9 | -8503 (7) | 10663 (3) | 3513 (2) |
| F3 | 95 (7) | 4429 (3) | 4013 (3) | F5 | 4034 (11) | 4080 (6) | 6323 (3) |
| O2 | -18430 (6) | 14476 (3) | 1100 (3) | C24 | -18244 (7) | 19513 (4) | 1387 (2) |
| N1 | -12688 (6) | 14516 (3) | 1929 (2) | C29 | 25205 (6) | -4998 (3) | 8795 (2) |
| C48 | 33004 (6) | -11610 (3) | 9496 (2) | C17 | 46 (7) | 7440 (4) | 3615 (3) |
| C52 | 28843 (6) | -8515 (3) | 8539 (2) | C43 | 10338 (8) | 1188 (4) | 6490 (2) |
| C36 | 17074 (6) | -1239 (3) | 6189 (2) | C26 | -20874 (8) | 18557 (3) | 1057 (2) |
| C54 | 29557 (6) | -10498 (3) | 8860 (2) | C1 | -17758 (7) | 15165 (3) | 1344 (3) |
| C21 | -22951 (7) | 21633 (3) | 395 (2) | C8 | -10653 (7) | 10844 (3) | 3968 (2) |
| F4 | 6079 (7) | 4175 (3) | 5284 (4) | C2 | -15367 (7) | 15338 (3) | 1140 (2) |
| C38 | 13680 (7) | -45 (3) | 6377 (2) | C32 | 21909 (6) | -4166 (3) | 7208 (2) |
| C50 | 32252 (6) | -9537 (3) | 9145 (2) | C16 | -1448 (7) | 8484 (4) | 3176 (2) |
| C28 | 27711 (6) | -5121 (3) | 8679 (2) | C18 | -762 (8) | 6388 (4) | 3626 (3) |
| C53 | 28202 (7) | -9519 (3) | 8547 (2) | C44 | 8636 (8) | 2008 (4) | 5954 (3) |
| C37 | 15230 (7) | -484 (3) | 5884 (2) | C19 | 771 (9) | 5357 (4) | 4036 (3) |
| C40 | 15842 (7) | -1127 (3) | 7483 (2) | C5 | -13075 (8) | 13818 (3) | 2738 (2) |
| C14 | -8203 (7) | 11429 (3) | 2775 (2) | C3 | -14164 (7) | 15642 (3) | 1734 (3) |
| C51 | 30868 (7) | -8538 (3) | 8833 (2) | C20 | -14161 (7) | 12111 (3) | 4132 (2) |
| C22 | -21556 (7) | 20559 (3) | 717 (2) | C46 | 5285 (11) | 3463 (5) | 5938 (4) |
| C49 | 31597 (6) | -10531 (3) | 9167 (2) | C47 | 17771 (8) | -3626 (4) | 6058 (3) |
| C41 | 17379 (6) | -1588 (3) | 7003 (2) | C4 | -13669 (8) | 14271 (4) | 1270 (3) |
| C35 | 18824 (7) | -1720 (3) | 5684 (2) | C45 | 7065 (13) | 2653 (7) | 6409 (4) |

(3) Calculated Powder X-Ray Diffraction Spectrum

A powder X-ray diffraction spectrum chart calculated from the positional parameters (partial atomic coordinates) measured under Condition 1 is shown in FIG. 28.

(4) Crystallographic Data

Measurement condition: Condition 2
Lattice constant: a=6.1599 (2) Å
b=12.9850 (6) Å
c=18.1997 (10) Å
α=71.547 (5)°
β=86.306 (4)°
γ=80.124 (4)°
V=1360.33 (12) Å$^3$
Space group: P1 (#1)
Factor R: 0.0760
Flack value: 0.09 (14)

(5) Positional Parameters (Partial Atomic Coordinates)

Measurement condition: Condition 2

Results of positional parameters (partial atomic coordinates) obtained by single crystal X-ray diffraction using Cu—Kα rays are shown in Table 18 (×10$^4$). Note that Atom numbers in Table 18 are not related to Atom numbers in Table 17.

TABLE 18

| Atom | x | y | z | Atom | x | y | z |
|---|---|---|---|---|---|---|---|
| O1 | 27347 (9) | -7576 (4) | 8310 (4) | C22 | 15884 (14) | -1209 (6) | 7559 (4) |
| O2 | 28590 (7) | -4534 (4) | 8950 (3) | C23 | 23904 (11) | -3926 (6) | 8391 (5) |
| O3 | 28632 (7) | -5760 (4) | 8351 (4) | C24 | -19580 (11) | 20466 (6) | 1120 (5) |
| O4 | 34955 (8) | -11499 (4) | 9667 (4) | C25 | 18834 (15) | -1608 (8) | 5781 (5) |
| O5 | -22477 (10) | 22492 (5) | 393 (4) | C26 | -8094 (13) | 11506 (6) | 2796 (4) |
| O6 | 32376 (8) | -12462 (4) | 9607 (3) | C27 | -18873 (12) | 18533 (6) | 1403 (4) |
| O7 | 38098 (8) | -13198 (4) | 9870 (3) | C28 | 19191 (13) | -2488 (6) | 7387 (4) |
| N1 | 22368 (9) | -4472 (4) | 8087 (4) | C29 | -6256 (16) | 11290 (7) | 2363 (5) |
| O9 | -25039 (8) | 21536 (4) | 305 (4) | C30 | 19569 (14) | -2841 (7) | 6125 (5) |
| O10 | 11995 (11) | 721 (6) | 6112 (3) | C31 | 30785 (11) | -8557 (5) | 8907 (5) |
| C1 | 28786 (11) | -8516 (5) | 8601 (4) | C32 | -18260 (13) | 19485 (7) | 1423 (5) |
| O11 | -3535 (14) | 8684 (6) | 3691 (4) | F3 | 4331 (19) | 3126 (11) | 5624 (8) |
| O8 | -28153 (9) | 23231 (5) | 143 (4) | F5 | 4050 (30) | 3863 (17) | 6454 (9) |
| O13 | 32946 (9) | -11571 (5) | 9510 (4) | C33 | -9700 (14) | 12491 (7) | 2521 (5) |
| O12 | -18770 (9) | 15752 (5) | 1691 (4) | C34 | 10415 (17) | 1153 (8) | 6582 (5) |
| C2 | 28117 (11) | -9494 (5) | 8603 (4) | C35 | -12761 (19) | 13942 (8) | 2715 (6) |
| N2 | -12539 (9) | 14565 (5) | 1919 (4) | C36 | 20233 (12) | -3099 (6) | 6957 (4) |

TABLE 18-continued

| Atom | x | y | z | Atom | x | y | z |
|---|---|---|---|---|---|---|---|
| C4 | 23919 (11) | −5561 (5) | 8388 (5) | C37 | 5360 (30) | 3350 (14) | 6101 (9) |
| O13 | −18401 (10) | 14542 (5) | 1068 (5) | C38 | −15268 (11) | 15305 (6) | 1136 (5) |
| O14 | −17504 (11) | 17594 (5) | 1713 (4) | C39 | −4710 (17) | 10347 (7) | 2639 (5) |
| C5 | 31517 (10) | −10512 (5) | 9204 (4) | C40 | 21886 (14) | −4104 (7) | 7241 (5) |
| C6 | −20898 (12) | 18558 (6) | 1082 (4) | C41 | −8375 (15) | 10756 (7) | 3534 (5) |
| C7 | 29491 (11) | −10470 (5) | 8902 (4) | C42 | 8769 (18) | 1991 (9) | 6070 (6) |
| C8 | 27674 (10) | −5150 (5) | 8703 (4) | C43 | −6769 (16) | 9829 (7) | 3809 (5) |
| C9 | −21629 (12) | 20535 (6) | 789 (4) | C44 | −14051 (12) | 15663 (7) | 1699 (6) |
| C10 | −22246 (11) | 19562 (5) | 783 (4) | C45 | −1620 (30) | 8465 (14) | 3237 (8) |
| C11 | 17392 (12) | −1604 (5) | 7091 (4) | C46 | −11412 (16) | 12174 (8) | 3823 (5) |
| C12 | 25190 (11) | −5063 (6) | 8827 (5) | C47 | −13644 (13) | 14251 (8) | 1341 (6) |
| C13 | 13764 (13) | −38 (6) | 6471 (4) | C48 | −10476 (17) | 10960 (8) | 3970 (5) |
| C14 | 32155 (11) | −9534 (5) | 9199 (4) | C49 | −90 (60) | 7423 (19) | 3740 (12) |
| C15 | 17105 (13) | −1191 (6) | 6280 (4) | C50 | 17846 (19) | −3509 (10) | 6080 (7) |
| F4 | 6230 (20) | 4156 (9) | 5587 (13) | C51 | −13880 (20) | 12250 (11) | 4126 (7) |
| C16 | −23012 (12) | 21608 (6) | 483 (4) | C52 | 7020 (30) | 2493 (15) | 6511 (8) |
| C17 | 15252 (15) | −417 (7) | 5990 (4) | C53 | −200 (70) | 6640 (18) | 3612 (14) |
| C18 | −11256 (15) | 12834 (7) | 2976 (5) | F1 | 3190 (30) | 5488 (13) | 3732 (10) |
| C19 | 14045 (13) | −437 (6) | 7268 (4) | F2 | 1680 (20) | 5519 (13) | 4737 (8) |
| C20 | −4995 (17) | 9629 (7) | 3363 (5) | C54 | 1430 (70) | 5610 (30) | 4080 (20) |
| C21 | −17655 (12) | 15199 (6) | 1300 (5) | F4 | 640 (60) | 4724 (18) | 3997 (19) |

(6) Calculated Powder X-Ray Diffraction Spectrum

A powder X-ray diffraction spectrum chart calculated from the positional parameters (partial atomic coordinates) measured under Condition 2 is shown in FIG. 29.

Comparative Example: (S)-3-Fluoro-1-[(6-methoxy-3-methyl-3,4-dihydronaphthalen-2-yl)methyl]azetidine-3-carboxylic acid $^1$H-NMR (DMSO-d$_6$): δ 6.99, 6.71, 6.68, 6.27, 3.82-3.64, 3.63-3.35, 3.30-3.15, 2.86, 2.52, 2.36, 0.85;

LCMS: retention time 0.65 min.

Effect of Compound I can be demonstrated by the following experiments, but is not limited thereto.

(1) Biological Experimental Example 1: Evaluation of S1P Receptor Agonist Activity of Compounds of the Present Invention by Monitoring Intracellular Calcium Concentration Chinese hamster ovary (CHO) cells in which human S1P$_1$ (EDG-1) or human S1P$_5$ (EDG-8) genes were overexpressed were cultured in Ham's F-12 medium containing 10% FBS (fetal bovine serum), penicillin/streptomycin, and geneticin (0.25 mg/mL). The medium was changed one day before the calcium assay was performed and on the day of the assay. Four hours after medium exchange, medium was removed and washed once with phosphate buffered saline. 0.05% Trypsin EDTA was added thereto to exfoliate the cells, and then a medium was added to recover the cells. The collected cell suspension was centrifuged to remove the supernatant, and suspended in phosphate buffered saline to count the number of cells. The cells were suspended in a Hanks solution containing Calcium 6 Assay Reagent (manufactured by Molecular Devices), 20 mM HEPES and 2.5 mM Probenecid so as to be 1.1×10$^6$ cells/mL, and incubated at 37° C. for about 1 hour. Thereafter, the supernatant was removed by centrifugation, and the cells were suspended in a Hanks solution containing 20 mM HEPES, 2.5 mM Probenecid and 0.1% BSA so as to be 2.2×10$^6$ cells/mL. The suspension was seeded in a 96 well plate at 80 μL/well. A plate was set in a fluorescent drug screening system (FDSS6000), Compound I or a comparative compound, and S1P were sequentially added, and an increase in intracellular calcium concentration before and after addition was measured at an excitation wavelength of 480 nm and a fluorescence wavelength of 540 nm. The increase in intracellular calcium concentration was evaluated by signal intensity at a fluorescence wavelength, and the agonist activity of each compound was calculated with the signal intensity when S1P was added instead of the compound as 100% activity.

Results

The agonist activities (EC$_{50}$ values) of Compound I and comparative compounds against S1P$_1$ receptor or S1P$_5$ receptor were shown in Table 11.

As the comparative compounds, in addition to the comparative example described in the present specification, 1-{[1-methyl-6-(octyloxy)-3,4-dihydro-2-naphthalenyl]methyl}-3-azetidine carboxylic acid hydrochloride described in Example 31 (58) of Patent Literature 1 was used as Comparative Compound A, and 1-({6-[(2-methoxy-4-propylbenzyl)oxy]-1-methyl-3,4-dihydro-2-naphthalenyl}methyl)-3-azetidine carboxylic acid described in Example 37 of Patent Literature 2 was used as Comparative Compound B.

Comparative examples did not have S1P$_1$ and S1P$_5$ receptor agonist activities. Comparative Compound A and Comparative Compound B had both S1P$_1$ and S1P$_5$ receptor agonist activities, with S1P$_1$ receptor agonist activity being stronger than S1P$_5$ receptor agonist activity.

In contrast, it was found that Compound I had selective agonist activity on the S1P$_5$ receptor, and a balance of agonist activity of the S1P$_5$ receptor for the S1P$_1$ receptor had been improved.

TABLE 11

| Compound | agonistic activity EC$_{50}$ (nmol/L) | |
|---|---|---|
|  | S1P$_1$ | S1P$_5$ |
| Example 6 | >3000 | 20 |
| Comparative Example | >10000 | >10000 |
| Comparative Compound A | <3 | 3 |
| Comparative Compound B | 0.2 | 2 |

(2) Biological Experimental Example 2:
Measurement of Clearance in Rats

A solution of Compound I was tail-intravenously administered to male SD rats under fasted conditions. After administration, rats were retained by a manual method at regular time intervals, and blood was collected from the jugular vein with sodium heparin.

The blood was centrifuged at 10,000 g, 3 min, 4° C. to obtain plasma. Concentration of Compound I in the plasma was measured by LC/MS/MS. Clearance was calculated from the plasma concentration transition using pharmacokinetic analysis software Phoenix WinNonlin (Certara USA, Inc.).

Results

Since Compound I has a low clearance, high bioavailability can be expected.

(3) Biological Experimental Example 3:
Measurement of Inhibitory Action of Comparative Compound C on Binding of [$^{33}$P]S1P to S1P$_5$ (EDG-8)

Using a Chinese hamster ovary (CHO) cell membrane fraction in which human S1P$_1$ (EDG-1) or human S1P$_5$ gene was overexpressed, a reaction was performed in a 96 well assay plate using a membrane fraction of 60 pg protein/mL. To each well, 100 μL of a vehicle (DMSO) solution diluted with Binding Buffer (50 mmol/L, Tris pH 7.5, 5 mmol/L, MgCl$_2$, 0.5% BSA, Complete EDTA free (1 tablet/50 mL)) or a compound solution having 2 times the concentration and 50 μL of 0.16 nmol/L [$^{33}$P]-S1P (manufactured by American Radiolabeled Chemicals) diluted with Binding Buffer were added, then a membrane fraction solution (50 μL) was added thereto, and the mixture was reacted at room temperature for 60 minutes. After the reaction, the mixture was subjected to suction filtration using a 96 well UNIFIL-TER, washed with washing buffer (50 mmol/L, Tris pH 7.5, 0.5% BSA) (150 mL), and then dried at 50 to 60° C. for 30 to 60 minutes. MicroScint (trade name) 20 (50 μL/well) was added thereto, and the plate was covered with TopSeal-A, then radioactivity was measured by TopCount (manufactured by Perkin Elmer).

[Evaluation]

A compound concentration at which 50% of specific binding of [$^{33}$P]-S1P to human S1P$_1$ and human S1P$_5$ was replaced (IC$_{50}$ value) was used as an evaluation item. Specific binding amount was determined by subtracting [$^{33}$P]-S1P non-specific binding amount (cpm) from an average value (cpm) of [$^{33}$P]-S1P total binding amount (cpm) and [$^{33}$P]-S1P binding amount (cpm) in vehicle or compound treatment. The specific binding amount of [$^{33}$P]-SP was assumed to be 100%, and a relative value (%) of the specific binding amount at each concentration of the compound was calculated. Among the treatment concentrations of the vehicle or the compound exhibiting a relative value (%) of 25 to 75%, a treatment concentration at which a relative value closest to 50% was exhibited was selected, and IC$_{50}$ value was calculated by substituting the relative value (%) and the treatment concentration for Y and X, respectively, in the following formula.

$$Y=100/(1+10^{X-logIC50})$$

Results

As Comparative Compound C, 3-({[6-(3-cyclohexyl-propoxy)-1-methyl-3,4-dihydro-2-naphthalenyl]methyl} amino)propanoic acid hydrochloride described in Example 31 (45) of Patent Literature 1 was used. Comparative Compound C showed an inhibitory activity (IC$_{50}$ value) of 1.0 nmol/L or 8.5 nmol/L for binding of [$^{33}$P]-S1P to S1P$_1$ or S1P$_5$, respectively.

(4) Biological Experimental Example 4:
Effectiveness in Mouse Experimental Autoimmune Encephalomyelitis Model Female C57BL/J mice (Charles River Laboratories Japan, Inc., age at start of experiment: 7 or 8 weeks of age) were used. Myelin Oligodendrocyte Glycoprotein [sequence 35-55 MEVGWYRSPFSRVVHLYRNGK (AnaSpec, Inc., hereinafter MOG35-55)] was dissolved in physiological saline (Otsuka Pharmaceutical Factory, Inc.) to prepare a 2 mg/mL solution. The 2 mg/mL solution of MOG35-55 and an equal amount of FCA H37Ra (Difco Laboratories) were mixed to prepare an emulsion, and the emulsion was used as an inducing agent. Immunization was performed by subcutaneously administering 0.2 mL of the inducing agent into the mouse flank using a glass syringe equipped with a 26G injection needle. The day of immunization was defined as day 0 of immunization, and 0.2 mL of a 1 μg/mL solution of Pertussis toxin (List Biological Laboratories) was intravenously administered into the tail vein on day 0 and day 2 of immunization (see Cell Mol Immunol, Vol. 2, pp. 439-448, 2005).

On the day before the immunization, the body weight was measured, and the mice were evenly divided into groups so that no significant difference was observed in the average value of the body weight of each group. After dividing into groups, administration of a test substance (Compound I), a positive control compound (FTY720; fingolimod), or a vehicle (water for injection) was started on the same day, and each test substance was repetitively orally administered once a day for 30 days from the day before the immunization to day 28 of immunization. The amount of the solution to be administered was calculated based on the individual body weight on the day of administration.

In evaluation of neurological symptom, the degree of paralysis was assigned a score which was used as a neurological symptom score (0: normal, 1: flaccid tail, 2: paresis of hind limbs, 3: paralysis of hind limbs, 4: quadriplegia, 5: near-death). The observation period was determined to be the day before immunization and every day from day 5 to day 29 of immunization, and observation was carried out before administration of the test substance or the like (see Proc. Natl. Acad. Sci. USA, Vol. 103, pp. 13451-13456, 2006).

Results

Compound I shows effectiveness in this model.

(5) Chemical Stability Test

Stability of the salts and/or crystal forms of the present invention was studied under the storage conditions of Condition 1 or Condition 2. After storage, the residual rate (%) of the stored sample under each condition was calculated by HPLC based on the area percentage of the sample stored at −20° C.

<Storage Conditions and Periods>

Condition 1 60° C.: 1 month: pulverized
Condition 2 80° C.: 1 week: unpulverized
Comparison object of each sample was stored at −20° C.

Results

Residual rates (%) of the compounds of the present invention after storage under Condition 1 are shown in Table 12, and residual rates (%) of the compounds of the present invention after storage under Condition 2 are shown in Table 13.

TABLE 12

| Compound | Residual rate (%)<br>60° C.: 1 month: pulverized |
|---|---|
| Example 10 | 99.4 |
| Example 7 | 99.1 |
| Example 14 | 99.1 |
| Example 9 | 97.9 |
| Example 8 | 97.8 |
| Example 13 | 97.1 |
| Example 12 | 95.3 |

TABLE 13

| Compound | Residual rate (%)<br>80° C.: 1 week: unpulverized |
|---|---|
| Example 10 | 99.6 |
| Example 11 | 99.6 |
| Example 14 | 99.6 |
| Example 15 | 99.1 |
| Example 16 | 95.8 |

It was found that the compound of the present invention is excellent in chemical stability. A compound having a residual rate of 99% or more after storage under Condition 1 and/or Condition 2 is particularly preferable as a drug substance of a pharmaceutical.

PREPARATION EXAMPLES

Preparation Example 1

By mixing the following components in a conventional manner and then tableting, about 10,000 tablets each containing 10 mg of an active ingredient are obtained.
Crystal D of 1-[[(3S)-3-methyl-6-(4,4,4-trifluorobutoxy)-3,4-dihydronaphthalen-2-yl]methyl]azetidine-3-carboxylic acid . . . 100 g
Carboxymethylcellulose calcium (disintegrant) . . . 20 g
Magnesium stearate (lubricant) . . . 10 g
Microcrystalline cellulose . . . 870 g Preparation Example 2

After mixing the following components in a conventional manner, then the mixture is filtered through a dust filter, and 5 ml aliquots are charged into ampules, and the ampules are heat-sterilized in an autoclave to obtain about 10,000 ampules each containing 20 mg of an active ingredient.
Crystal D of 1-[[(3S)-3-methyl-6-(4,4,4-trifluorobutoxy)-3,4-dihydronaphthalen-2-yl]methyl]azetidine-3-carboxylic acid . . . 200 g
Mannitol . . . 20 g
Distilled water . . . 50 L

INDUSTRIAL APPLICABILITY

Compound I has selective $S1P_5$ receptor agonist activity and is therefore useful in treatment of $S1P_5$-mediated diseases, for example, neurodegenerative diseases and the like. In addition, the salts and/or crystal forms of the present invention are useful as drug substances of pharmaceuticals.

The invention claimed is:

1. A compound that is a salt of 1-[[(3S)-3-methyl-6-(4,4,4-trifluorobutoxy)-3,4-dihydronaphthalen-2-yl]methyl]azetidine-3-carboxylic acid, wherein the salt is a mono(4-hydroxybenzoate) salt, a mono-tryptophan salt, or a hemisuccinate salt.

2. The compound according to claim 1, which is in crystal form.

3. The compound according to claim 2, wherein the salt is the mono(4-hydroxybenzoate) salt and the compound has, in a powder X-ray diffraction spectrum, diffraction peaks at diffraction angles (2θ) of at least about 6.9, about 12.8, about 13.9, and about 24.7 degrees.

4. The compound according to claim 2, wherein the salt is the mono(4-hydroxybenzoate) salt and the compound has, in a powder X-ray diffraction spectrum, diffraction peaks at diffraction angles (2θ) of at least about 5.4, about 6.9, about 13.9, about 18.1, about 19.4, about 19.8, about 20.9, and about 24.7 degrees.

5. The compound according to claim 3, wherein the salt is the mono(4-hydroxybenzoate) salt and the compound has, in a powder X-ray diffraction spectrum, no diffraction peak at diffraction angles (2θ) of about 11.3 and about 14.4 degrees.

6. The compound according to claim 2, wherein the salt is the mono(4-hydroxybenzoate) salt and the compound has, in a powder X-ray diffraction spectrum, diffraction peaks at diffraction angles (2θ) of about 5.4, about 6.9, about 10.3, about 12.8, about 13.9, about 15.0, about 15.3, about 15.9, about 16.6, about 16.8, about 18.1, about 19.4, about 19.8, about 20.9, about 21.8, about 22.7, about 23.6, about 24.7, about 25.4, about 25.8, about 26.3, about 26.7, about 27.6, about 27.8, about 30.3, about 33.4, and about 34.2 degrees.

7. The compound according to claim 2, wherein the salt is the mono(4-hydroxybenzoate) salt and the compound is characterized by a powder X-ray diffraction spectrum chart shown in FIG. 7.

8. The compound according to claim 2, wherein the salt is the mono(4-hydroxybenzoate) salt and the compound has an endothermic peak with an onset temperature of about 150° C. or a peak temperature of about 153° C. in differential scanning calorimetry.

9. The compound according to claim 2, wherein the salt is the mono(4-hydroxybenzoate) salt and the compound is characterized by a differential scanning calorimetry chart shown in FIG. 8.

10. The compound according to claim 2, wherein the salt is the mono(4-hydroxybenzoate) salt and the compound has, in a powder X-ray diffraction spectrum, a diffraction peak at a diffraction angle (2θ) of about 11.3 degrees.

11. The compound according to claim 2, wherein the salt is the mono(4-hydroxybenzoate) salt and the compound has, in a powder X-ray diffraction spectrum, diffraction peaks at diffraction angles (2θ) of about 5.6, about 11.3, about 13.2, about 15.9, about 16.9, about 18.8, about 22.7, and about 24.2 degrees.

12. The compound according to claim 2, wherein the salt is the mono(4-hydroxybenzoate) salt and the compound has, in a powder X-ray diffraction spectrum, diffraction peaks at diffraction angles (2θ) of about 5.6, about 7.0, about 7.9, about 11.3, about 12.3, about 13.2, about 13.9, about 15.9, about 16.9, about 17.4, about 17.9, about 18.4, about 18.8, about 19.4, about 19.9, about 20.4, about 21.0, about 21.2, about 21.9, about 22.7, about 23.2, about 23.4, about 24.2, about 25.2, about 26.5, about 27.5, about 29.1, about 29.8, about 30.5, and about 34.1 degrees.

13. The compound according to claim 2, wherein the salt is the mono(4-hydroxybenzoate) salt and the compound is characterized by a powder X-ray diffraction spectrum chart shown in FIG. 9.

14. The compound according to claim 2, wherein the salt is the mono(4-hydroxybenzoate) salt and the compound has an endothermic peak with an onset temperature of about 154° C. or a peak temperature of about 158° C. in differential scanning calorimetry.

15. The compound according to claim 2, wherein the salt is the mono(4-hydroxybenzoate) salt and the compound is characterized by a differential scanning calorimetry chart shown in FIG. 10.

16. The compound according to claim 2, wherein the salt is the mono-tryptophan salt and the compound has, in a powder X-ray diffraction spectrum, diffraction peaks at diffraction angles (2θ) of at least about 8.0, about 9.7, about 16.0, about 17.0, about 18.9, about 19.1, about 22.2, and about 24.6 degrees.

17. The compound according to claim 2, wherein the salt is the mono-tryptophan salt and the compound has, in a powder X-ray diffraction spectrum, diffraction peaks at diffraction angles (2θ) of about 8.0, about 9.7, about 12.8, about 15.6, about 16.0, about 16.6, about 17.0, about 17.3, about 17.6, about 18.2, about 18.6, about 18.9, about 19.1, about 19.6, about 20.9, about 21.3, about 21.7, about 21.9, about 22.2, about 22.6, about 23.4, about 23.8, about 24.6, about 25.3, about 25.7, about 26.2, about 26.6, about 27.1, about 27.4, about 27.9, about 28.2, about 28.7, about 29.1, about 29.9, about 30.2, about 30.9, about 32.0, about 32.2, about 32.5, about 33.1, about 34.1, about 34.5, and about 34.8 degrees.

18. The compound according to claim 2, wherein the salt is the mono-tryptophan salt and the compound is characterized by a powder X-ray diffraction spectrum chart shown in FIG. 15.

19. The compound according to claim 2, wherein the salt is the mono-tryptophan salt and the compound has an endothermic peak with an onset temperature of about 178° C. or a peak temperature of about 183° C. in differential scanning calorimetry.

20. The compound according to claim 2, wherein the salt is the mono-tryptophan salt and the compound has an exothermic peak with an onset temperature of about 185° C. or a peak temperature of about 187° C. in differential scanning calorimetry.

21. The compound according to claim 2, wherein the salt is the mono-tryptophan salt and the compound is characterized by a differential scanning calorimetry chart shown in FIG. 16.

22. The compound according to claim 2, wherein the salt is the hemisuccinate salt and the compound has in a powder X-ray diffraction spectrum, diffraction peaks at diffraction angles (2θ) of at least about 6.4, about 6.9, about 12.9, about 13.8, about 17.2, about 18.1, about 19.3, about 23.9, and about 24.3 degrees.

23. The compound according to claim 2, wherein the salt is the hemisuccinate salt and the compound has, in a powder X-ray diffraction spectrum, diffraction peaks at diffraction angles (2θ) of about 6.1, about 6.4, about 6.9, about 12.9, about 13.8, about 16.6, about 17.2, about 18.1, about 18.3, about 18.7, about 19.3, about 19.9, about 20.5, about 20.7, about 21.0, about 21.4, about 21.9, about 22.1, about 22.7, about 23.0, about 23.6, about 23.9, about 24.3, about 24.6, about 25.2, about 25.8, about 26.0, about 27.4, about 27.5, about 27.8, about 28.7, about 29.5, about 30.2, about 30.5, about 30.8, about 31.3, about 31.7, about 32.3, about 32.5, about 33.8, about 34.1, about 34.5, and about 34.9 degrees.

24. The compound according to claim 2, wherein the salt is the hemisuccinate salt and the compound is characterized by a powder X-ray diffraction spectrum chart shown in FIG. 17.

25. The compound according to claim 2, wherein the salt is the hemisuccinate salt and the compound has an endothermic peak with an onset temperature of about 111° C. or a peak temperature of about 114° C. in differential scanning calorimetry.

26. The compound according to claim 2, wherein the salt is the hemisuccinate salt and the compound has an endothermic peak with an onset temperature of about 137° C. or a peak temperature of about 140° C. in differential scanning calorimetry.

27. The compound according to claim 2, wherein the salt is the hemisuccinate salt and the compound is characterized by a differential scanning calorimetry chart shown in FIG. 18.

28. A pharmaceutical composition comprising the compound according to claim 1 and a pharmaceutically acceptable carrier.

29. The pharmaceutical composition according to claim 28, which is a therapeutic agent for a S1P$_5$-mediated disease.

30. The pharmaceutical composition according to claim 29, wherein the S1P$_5$-mediated disease is a neurodegenerative disease.

31. The pharmaceutical composition according to claim 30, wherein the neurodegenerative disease is multiple system atrophy or Parkinson's disease.

32. A method for treating a S1P$_5$-mediated disease, comprising administering to a mammal an effective amount of the compound according to claim 1 to a mammal.

33. The method according to claim 32, wherein the S1P$_5$-mediated disease is a neurodegenerative disease.

34. The method according to claim 33, wherein the neurodegenerative disease is multiple system atrophy or Parkinson's disease.

\* \* \* \* \*